(12) United States Patent
Yasuda

(10) Patent No.: US 12,537,256 B2
(45) Date of Patent: Jan. 27, 2026

(54) POWER SUPPLY DEVICE AND POWER SUPPLY SYSTEM

(71) Applicant: MAKITA CORPORATION, Anjo (JP)

(72) Inventor: Isao Yasuda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 762 days.

(21) Appl. No.: 17/942,675

(22) Filed: Sep. 12, 2022

(65) Prior Publication Data

US 2023/0111417 A1    Apr. 13, 2023

(30) Foreign Application Priority Data

Sep. 29, 2021    (JP) .................... 2021-159912

(51) Int. Cl.
*H01M 50/244* (2021.01)
*H01M 50/247* (2021.01)
*H01M 50/256* (2021.01)

(52) U.S. Cl.
CPC ....... *H01M 50/244* (2021.01); *H01M 50/247* (2021.01); *H01M 50/256* (2021.01); *H01M 2220/30* (2013.01)

(58) Field of Classification Search
None
See application file for complete search history.

(56) References Cited

U.S. PATENT DOCUMENTS

| 2013/0043826 A1 * | 2/2013 | Workman ........... H01M 10/465 307/18 |
| 2014/0191705 A1 | 7/2014 | Takao et al. |
| 2019/0296290 A1 | 9/2019 | Hansen et al. |
| 2020/0119318 A1 | 4/2020 | Okuoka et al. |
| 2021/0360803 A1 * | 11/2021 | Semon ................ H02J 7/0044 |

FOREIGN PATENT DOCUMENTS

| JP | 2000164182 A | 6/2000 |
| JP | 201345690 A | 3/2013 |
| JP | 2013045690 A * | 3/2013 |
| JP | 2014180208 A | 9/2014 |
| JP | 2020061311 A | 4/2020 |

OTHER PUBLICATIONS

Machine translation of JP2013045690, printed Jul. 25, 2025 (Year: 2025).*
Apr. 15, 2025 Office Action issued in Japanese Patent Application No. 2021-159912.

* cited by examiner

*Primary Examiner* — Maria Laios
(74) *Attorney, Agent, or Firm* — Oliff PLC

(57) ABSTRACT

A power supply device may include a body case, a first device-side engaging part disposed on the body case, a first output part disposed on the body case; and a device-side connector configured to be connected with a battery-side connector of a first battery unit. The body case may include a bottom surface, and an upper surface configured to allow the first battery unit to be placed thereon. The first device-side engaging part may be configured to be engaged with a first engaged part of the first battery unit. The first output part may be configured to output power supplied from the first battery unit to a first external apparatus different from the first battery unit.

17 Claims, 40 Drawing Sheets

POWER SUPPLY DEVICE AND POWER SUPPLY SYSTEM

CROSS-REFERENCE TO RELATED APPLICATION

This application claims priority to Japanese Patent Application No. 2021-159912 filed on Sep. 29, 2021, the contents of which are hereby incorporated by reference into the present application.

TECHNICAL FIELD

The art disclosed herein relates to a power supply device and a power supply system.

BACKGROUND ART

Japanese Patent Application Publication No. 2020-61311 describes a battery unit configured to accommodate therein a plurality of battery packs.

SUMMARY

The above literature did not provide any consideration to using one or more battery packs being jointed with a power supply device.

The present disclosure provides art configured to allow a power supply device to use power supplied from a battery unit and output the power to a first external apparatus.

A power supply device disclosed herein may comprise: a body case; a first device-side engaging part disposed on the body case; a first output part disposed on the body case; and a device-side connector configured to be connected with a battery-side connector of a first battery unit, wherein the body case comprises: a bottom surface; and an upper surface configured to allow the first battery unit to be placed thereon, the first device-side engaging part is configured to be engaged with a first engaged part of the first battery unit, and the first output part is configured to output power supplied from the first battery unit to a first external apparatus different from the first battery unit.

In addition, a power supply system disclosed herein may comprise: a power supply device; and a first battery unit. The first battery unit may comprise: a battery case; a battery-side connector; and a first unit-side engaged part. The power supply device may comprise: a body case; a first device-side engaging part disposed on the body case and configured to be engaged with the first unit-side engaged part; a first output part disposed on the body case and configured to output power supplied from the first battery unit to a first external apparatus different from the first battery unit; and a device-side connector configured to be connected with the battery-side connector.

According to the above feature, the first device-side engaging part of the power supply device and the first unit-side engaged part of the first battery unit are engaged in a state where the first battery unit is placed on the upper surface of the power supply device. Due to this, the power supply device and the first battery unit are coupled. Further, when the first external apparatus is electrically connected to the first output part in a state where the battery-side connector and the device-side connector are connected, power supplied from the first battery unit is outputted to the first external apparatus via the power supply device. Accordingly, the power supply device can output power to the first external apparatus by using the power supplied from the first battery unit.

DETAILED DESCRIPTION

Figure 1:
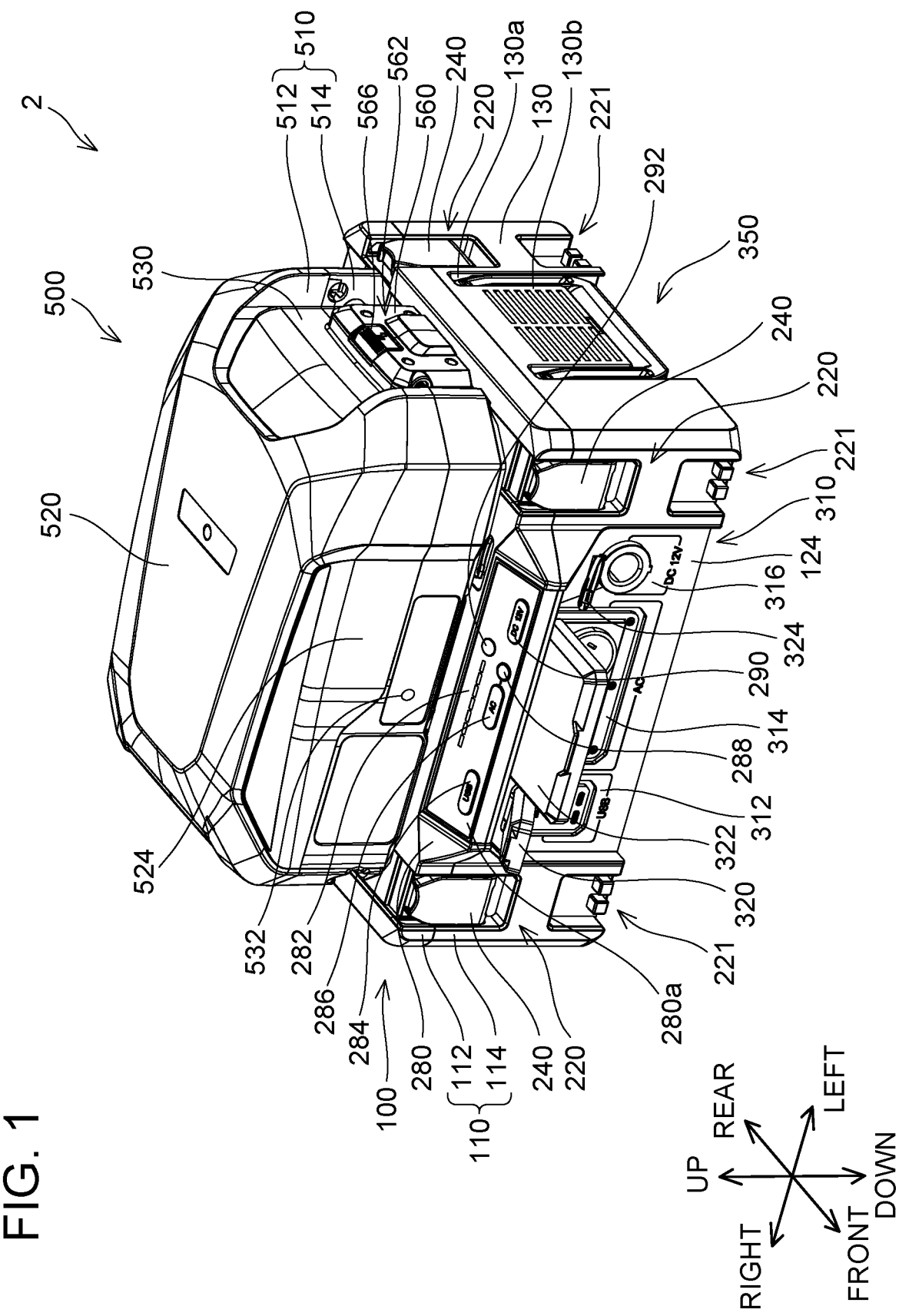
FIG. 1 illustrates a perspective view seeing a power supply system 2 comprising a power supply device 100 and a battery unit 500 from a front left upper side in an embodiment.

Representative, non-limiting examples of the disclosure herein will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved power supply devices and power supply systems, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a power supply device may comprise: a body case; a first device-side engaging part disposed on the body case; a first output part disposed on the body case; and a device-side connector configured to be connected with a battery-side connector of a first battery unit, wherein the body case comprises: a bottom surface; and an upper surface configured to allow the first battery unit to be placed thereon, the first device-side engaging part is configured to be engaged with a first engaged part of the first battery unit, and the first output part is configured to output power supplied from the first battery unit to a first external apparatus different from the first battery unit.

In one or more embodiments, the upper surface of the body case may be configured to allow a second external apparatus different from the first battery unit to be placed thereon, and/or the body case may be configured to be placed on an upper surface of the second external apparatus.

According to the above feature, when the power supply device is placed on the upper surface of the second external apparatus and/or the first battery unit is not placed on the upper surface of the body case, the second external apparatus can be placed on the upper surface of the body case. In this case, the power supply device and the second external apparatus can be carried and/or stored away in a state of being stacked on one another in the up down direction. Thus, user convenience can be improved.

In one or more embodiments, the power supply device may further comprise a second device-side engaging part configured to be engaged with an apparatus-side engaged part of the second external apparatus and different from the first device-side engaging part; and/or a device-side engaged part configured to be engaged with an apparatus-side engaging part of the second external apparatus.

According to the above feature, the power supply device and the second external apparatus can be coupled by the second device-side engaging part and the apparatus-side engaged part being engaged and/or by the apparatus-side engaging part and the device-side engaged part being engaged. Due to this, the power supply device and the second external apparatus can be suppressed from being displaced relative to each other when the power supply device and the second external apparatus are carried in the state of being stacked on one another in the up-down direction.

In one or more embodiments, the upper surface of the body case may comprise a first groove part configured to accommodate the first device-side engaging part. The first device-side engaging part may be configured to move between a first state of protruding upward from the upper surface of the body case and a second state of being accommodated in the first groove part. The first device-side engaging part may be configured to be engaged with the first unit-side engaged part of the first battery unit when the first device-side engaging part is in the first state, and the first device-side engaging part may be configured to be in the second state when the second external apparatus is placed on the upper surface of the body case.

For example, if the second external apparatus is placed on the upper surface of the body case in a configuration where the first device-side engaging part is fixed in the first state of protruding upward from the upper surface of the body case, the first device-side engaging part and the lower surface of the second external apparatus may contact each other, thereby the lower surface of the second external apparatus may be damaged. According to the above feature, the first device-side engaging part is accommodated in the first groove part when the second external apparatus is placed on the upper surface of the body case. Thus, the lower surface of the second external apparatus can be suppressed from being damaged.

In one or more embodiments, the power supply device may further comprise a biasing member biasing the first device-side engaging part from the second state to the first state.

According to the above feature, a user does not have to perform an operation for switching the first device-side engaging part from the second state to the first state upon attempting to couple the power supply device and the first battery unit. Thus, user convenience can be improved.

In one or more embodiments, the power supply device may further comprise a third device-side engaging part configured to be engaged with a second unit-side engaged part of a second battery unit different from the first battery unit, the third device-side engaging part being different from the first device-side engaging part.

According to the above feature, the power supply device can be coupled with the second battery unit different in shape from the first battery unit by using the third device-side engaging part. Thus, user convenience can be improved.

In one or more embodiments, the upper surface may comprise a first groove part configured to accommodate the first device-side engaging part and a second groove part configured to accommodate the third device-side engaging part. The first device-side engaging part may be configured to move between a first state of protruding upward from the upper surface and a second state of being accommodated in the first groove part. The third device-side engaging part may be configured to move between a third state of protruding upward from the upper surface and a fourth state of being accommodated in the second groove part. The first device-side engaging part may be configured to be engaged with the first unit-side engaged part of the first battery unit when the first device-side engaging part is in the first state. The third device-side engaging part may be configured to be engaged with the second unit-side engaged part of the second battery unit when the third device-side engaging part is in the third state, and the third device-side engaging part may be configured to be in the fourth state when the first device-side engaging part is engaged with the first unit-side engaged part of the first battery unit.

For example, if the first battery unit is placed on the upper surface of the body case in a configuration where the third device-side engaging part is fixed in the third state of protruding upward from the upper surface of the body case, the third device-side engaging part and the lower surface of the first battery unit may contact each other, thereby the lower surface of the first battery unit may be damaged. According to the above feature, the third device-side engaging part is accommodated in the second groove part when the first battery unit is placed on the upper surface of the body case. Thus, the lower surface of the first battery unit can be suppressed from being damaged.

In one or more embodiments, the power supply device may further comprise a biasing member biasing the first device-side engaging part from the second state to the first state.

According to the above feature, the user does not have to perform an operation for switching the first device-side engaging part from the second state to the first state upon attempting to couple the power supply device and the first battery unit. Thus, user convenience can be improved.

In one or more embodiments, the power supply device may further comprise a first conversion circuit connected to the first output part and configured to convert the power supplied from the first battery unit; a second output part different from the first output part; and a second conversion circuit connected to the second output part and configured to convert the power supplied from the first battery unit, the second conversion circuit being different from the first conversion circuit.

According to the above feature, plural types of electrical apparatuses can be operated by using power outputted from the power supply device. Thus, user convenience can be improved.

In one or more embodiments, the power supply device may further comprise a first conversion circuit connected to the first output part and configured to convert direct current supplied from the first battery unit to alternating current.

According to the above feature, the user is able to use an electrical apparatus configured to operate with AC power by using the power supply device. Thus, user convenience can be improved.

In one or more embodiments, the body case may further comprise a first side surface disposed between the upper surface and the bottom surface. The device-side connector may be disposed on the first side surface.

For example, if the device-side connector is disposed on the upper surface of the body case, the first battery unit placed on the upper surface of the body case becomes an obstacle, which makes it difficult to connect the device-side connector and the battery-side connector. According to the above feature, the user can easily connect the device-side connector and the battery-side connector.

In one or more embodiments, in a top view of the power supply device seen from above under a state where the battery-side connector of the first battery unit is connected to the device-side connector, the battery-side connector may be disposed inside an outer peripheral edge of the body case.

If the battery-side connector is placed outside the outer peripheral edge of the body case in a top view of the power supply device seen from above, the battery-side connector may collide with a wall for example and be damaged. According to the above feature, the battery-side connector may be suppressed from colliding with a wall or the like. Thus, the battery-side connector may be suppressed from being damaged.

In one or more embodiments, the body case may further include a cable accommodating part mounted on the first side surface and configured to accommodate a cable extending from the battery-side connector.

When the power supply device is carried for example with the power supply device and the first battery unit being coupled, the cable of the first battery unit sometimes may contact the user. According to the above feature, the cable can be accommodated in the cable accommodating part with the power supply device and the first battery unit being coupled. Thus, the cable of the first battery unit can be suppressed from contacting the user while the user is carrying the power supply device.

In one or more embodiments, the body case may further comprise: a second side surface disposed between the upper surface and the bottom surface; and a handle disposed on the second side surface and configured to be gripped by a user. A handle accommodating part recessed inward of the body case and configured to accommodate the handle may be disposed on the second side surface. The handle may be configured to move between an accommodated state of being accommodated in the handle accommodating part and a non-accommodated state of being not accommodated in the handle accommodating part.

According to the above feature, the user is able to move the handle to the non-accommodated state when the user carries the power supply device, and the user is able to move the handle to the accommodated state when the power supply device is placed on a ground, for example. In the accommodated state, the handle is accommodated in the handle accommodating part on the second side surface. Thus, the handle can be suppressed from contacting the user while the power supply device is placed on the ground, for example.

In one or more embodiments, a vent hole may be defined on the second side surface of the body case. As the power supply is viewed along a direction orthogonal to the second side surface, the vent hole may be defined on an inner side of the handle.

According to the above feature, flow of air discharged outward from the body case is not hindered by the handle. Thus, the air can be easily discharged outward from the body case.

In one or more embodiments, the power supply device may comprise an inclined part protruding in a first direction from a first end of the upper surface. The inclined part may be inclined such that an end on a first direction side of the inclined part is inclined downward. A display unit and an output operation unit for operating the first output part may be disposed on the inclined part.

Visibility of the display unit by the user can be improved with the configuration where the display unit is disposed on the inclined part than with a configuration where the display unit is disposed on the upper surface of the body case or a side surface perpendicular to the upper surface. Further, operability of the output operation unit by the user can be improved with the configuration where the output operation unit is disposed on the inclined part than with a configuration where the output operation unit is disposed on the upper surface of the body case or a side surface perpendicular to the upper surface.

In one or more embodiments, the power supply device may comprise a third side surface extending downward from the first end of the upper surface. The first output part may be disposed on the third side surface. The first output part may be disposed lower than the display unit and the output operation unit.

According to the above feature, the inclined part is located higher than the first output part. The inclined part also protrudes more in the first direction than the first output part does. Thus, the inclined part may suppress water from above of the power supply device from reaching the first output part.

In one or more embodiments, under a state where the first battery unit is placed on the upper surface of the body case, a power operation part of the first battery unit may be disposed on a battery side surface on the first direction side of the first battery unit. Power may be supplied from the first battery unit to the power supply device when the power operation part is operated by the user.

According to the above feature, when the battery unit is placed on the upper surface of the body case, both of the output operation unit of the power supply device and the power operation part of the first battery unit are disposed on the first direction side. Thus, user convenience can be improved.

In one or more embodiments, the first output part may comprise a protecting part for protecting the first output part.

According to the above feature, water can be suppressed from reaching the output part.

EMBODIMENTS

Figure 2:
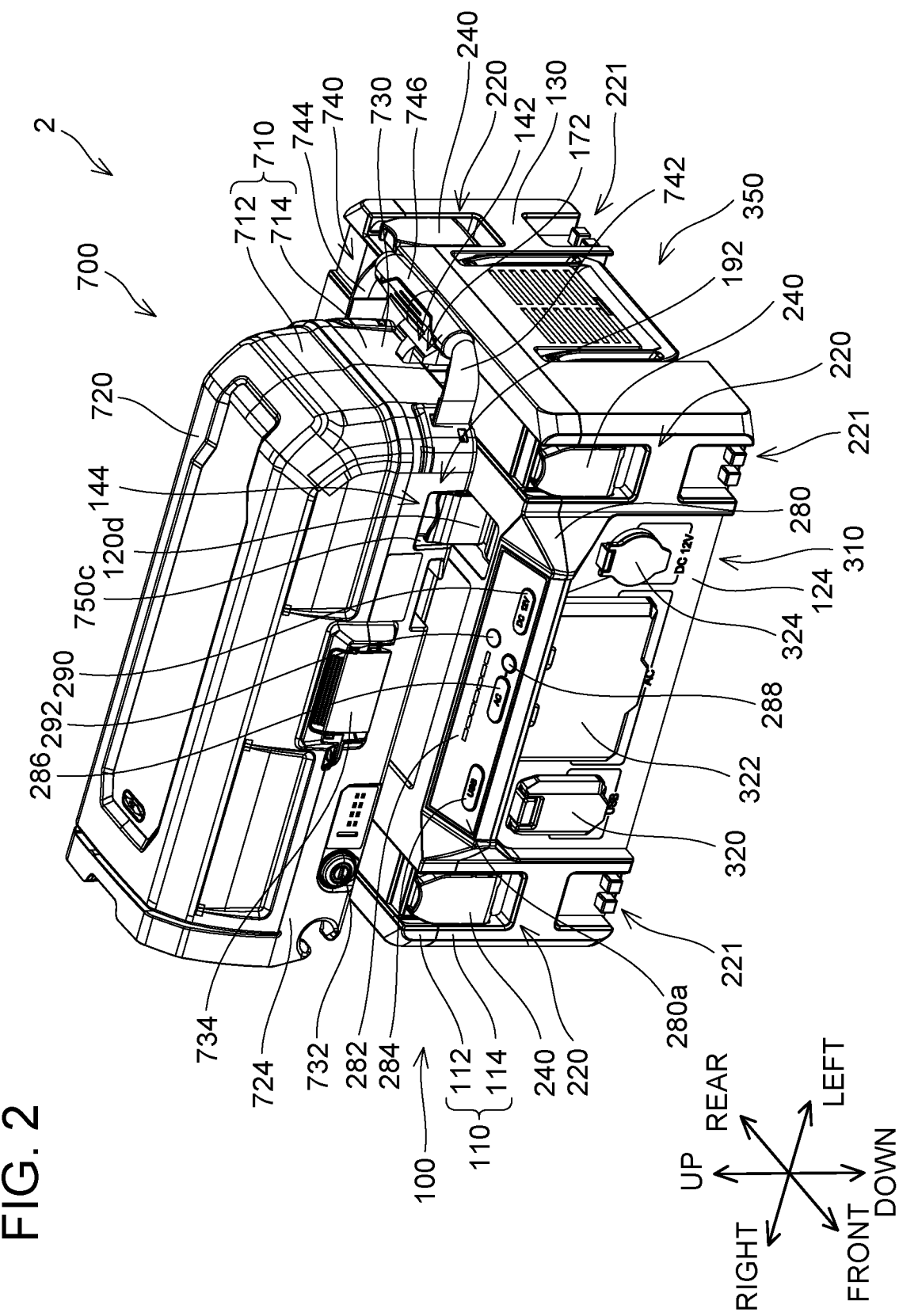
FIG. 2 illustrates a perspective view seeing the power supply system 2 comprising the power supply device 100 and a battery unit 700 from the front left upper side in an embodiment.

A power supply system 2 of a present embodiment and shown in FIGS. 1, 2 is a device configured to supply power to a power tool, for example. The power supply system 2 is composed by removably attaching one of a battery unit 500 shown in FIG. 1 and a battery unit 700 shown in FIG. 2 to a power supply device 100 shown in FIG. 3.

(Configuration of Power Supply Device 100)

Figure 3:
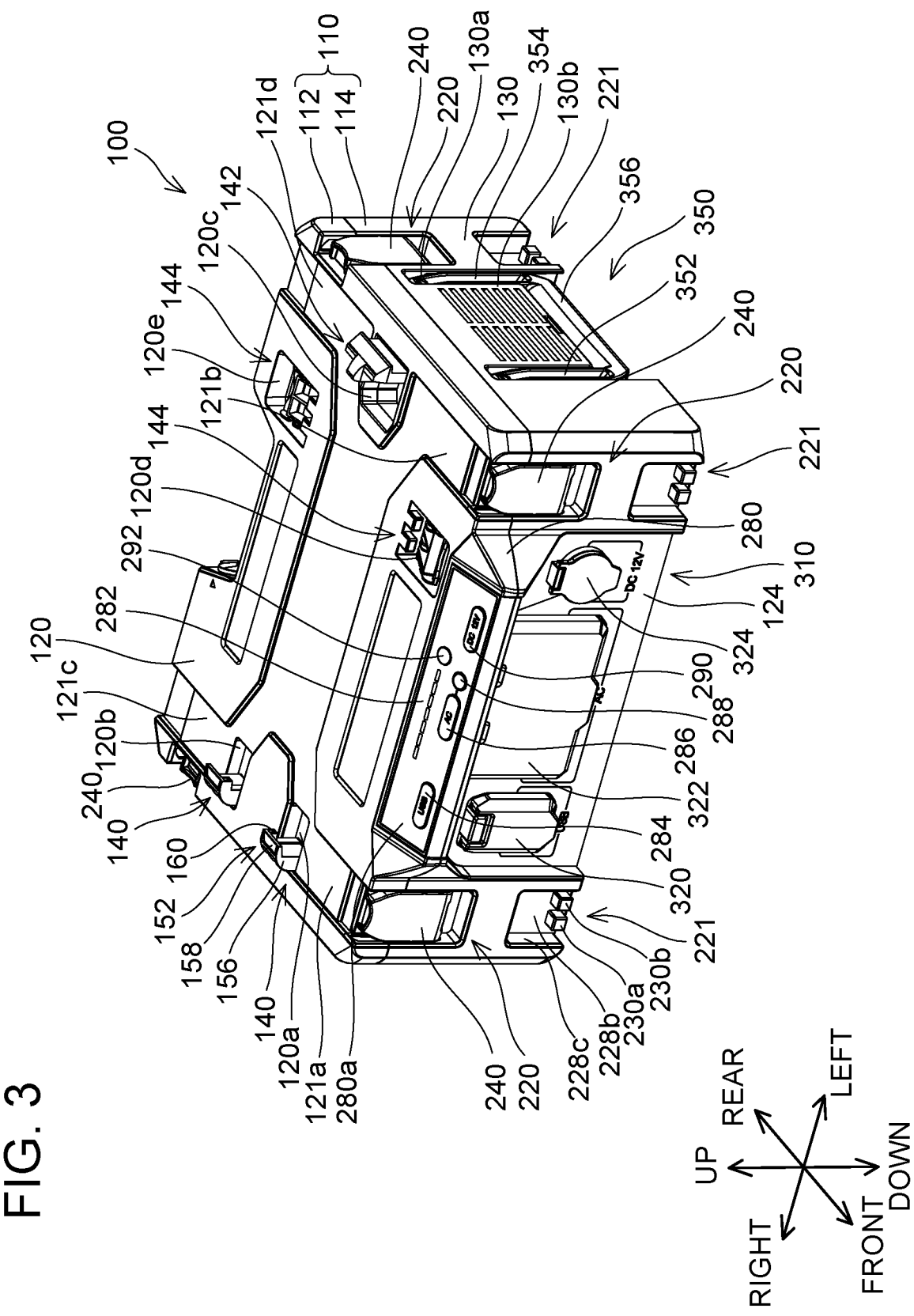
FIG. 3 illustrates a perspective view seeing a power supply device 100 according to the embodiment from the front left upper side.
Figure 4:
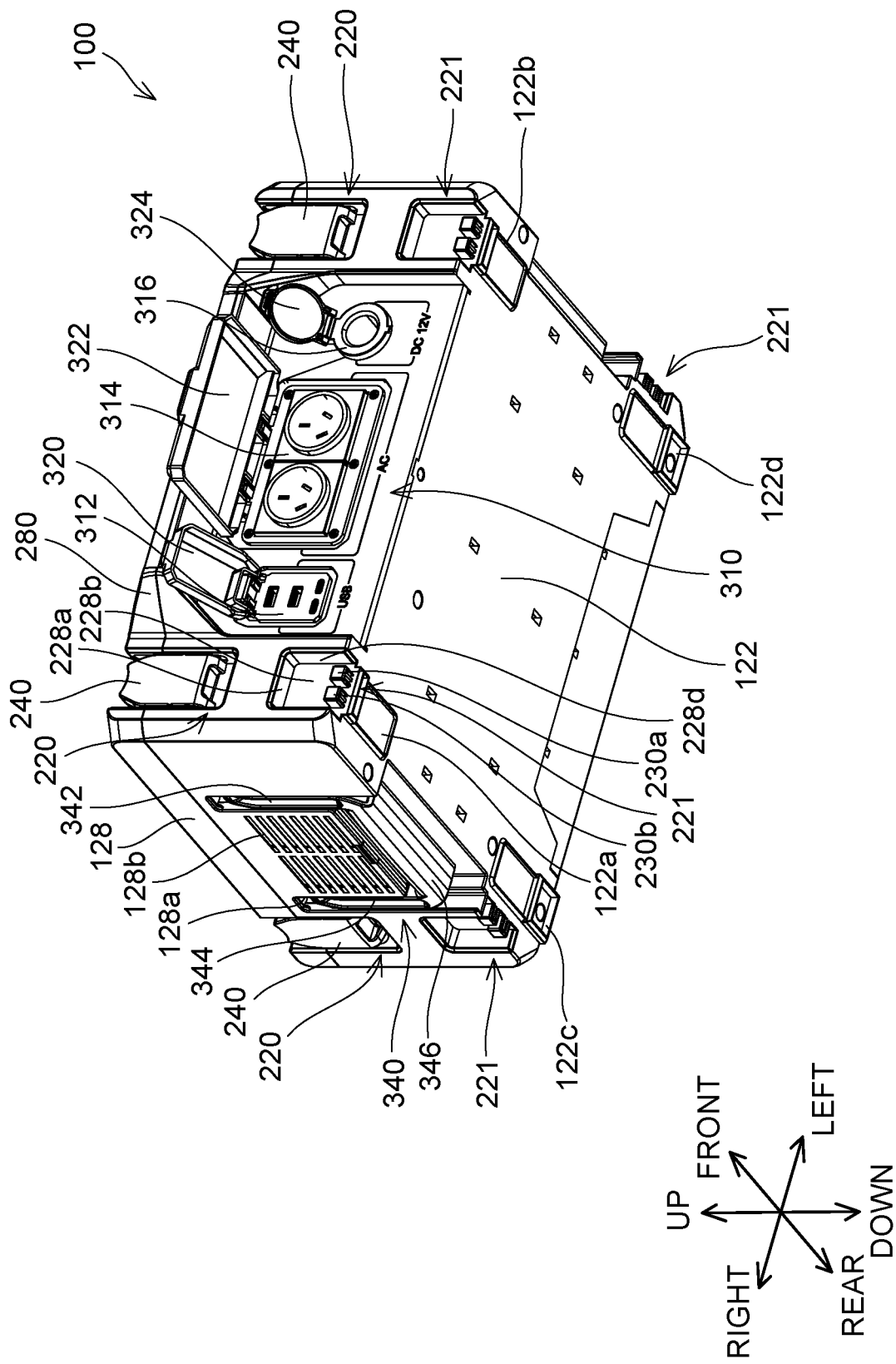
FIG. 4 illustrates a perspective view seeing the power supply device 100 according to the embodiment from a front right lower side.

As shown in FIG. 3, the power supply device 100 comprises a body case 110. The body case 110 is shaped in substantially cuboid in its entirety, and divided into an upper case 112 and a lower case 114. The upper case 112 and the lower case 114 are fixed to each other by screws (not shown). The body case 110 comprises an upper surface 120, a bottom surface 122 (see FIG. 4), a front surface 124, a rear surface 126 (see FIG. 5), a right surface 128 (see FIG. 4), and a left surface 130. At four corners of the upper surface 120, four recessed parts 121a to 121d recessed downward are arranged. Two first coupling mechanisms 140, a second coupling mechanism 142, and two third coupling mechanisms 144 are disposed on the upper surface 120. The two first coupling mechanisms 140 are arranged at a right end of the upper surface 120. The first coupling mechanism 140 on a front side is disposed closer to a front end of the upper surface 120 than a center of the upper surface 120 in a front-rear direction, while the first coupling mechanism 140 on a rear side is disposed closer to a rear end of the upper surface 120 than the center of the upper surface 120 in the front-rear direction. The second coupling mechanism 142 is disposed on a left end of the upper surface 120. The second coupling mechanism 142 is disposed on the center of the upper surface 120 in the front-rear direction. The two third coupling mechanisms 144 are disposed at both opposing ends of the upper surface 120 in the front-rear direction. The two third coupling mechanisms 144 are disposed closer to the left end of the upper surface 120 than a center of the upper surface 120 in a left-right direction. On the upper surface 120, openings 120a to 120e penetrating the upper case 112 in the up-down direction are defined at positions respectively corresponding to the two first coupling mechanisms 140, the second coupling mechanism 142, and the two third coupling mechanisms 144. As shown in FIG. 4, four protrusions 122a to 122d protruding downward are disposed at four corners of the bottom surface 122. The four protrusions 122a to 122d are respectively below the four recessed parts 121a to 121d of the upper surface 120. The four protrusions 122a to 122d have shapes respectively corresponding to the four recessed parts 121a to 121d of the upper surface 120.

(Configuration of First Coupling Mechanisms 140)

Figure 6:
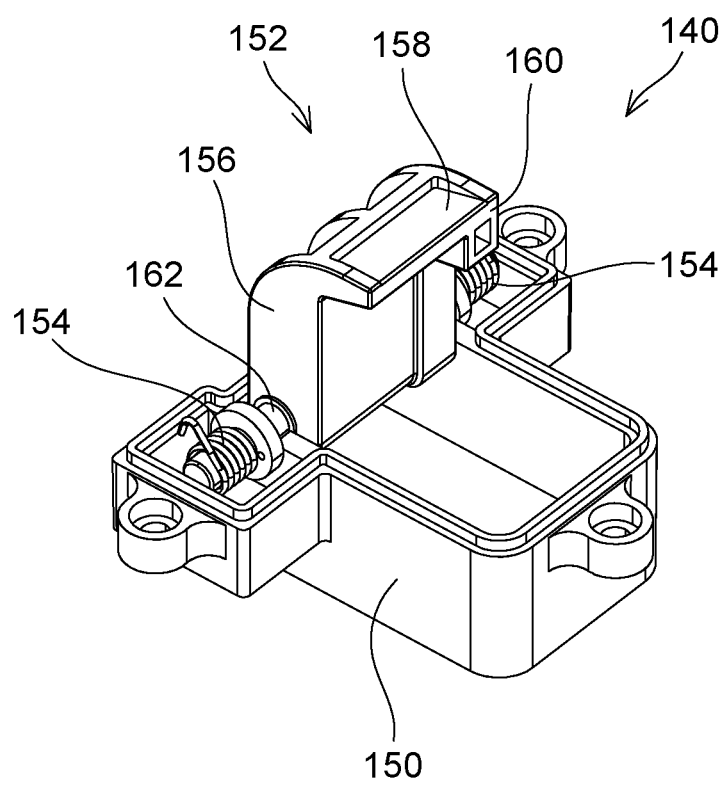
FIG. 6 illustrates a perspective view seeing a first coupling mechanism 140 according to the embodiment from the front left upper side.
Figure 6:
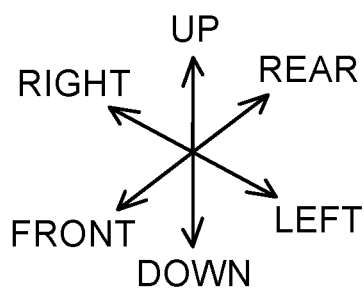
Figure 7:
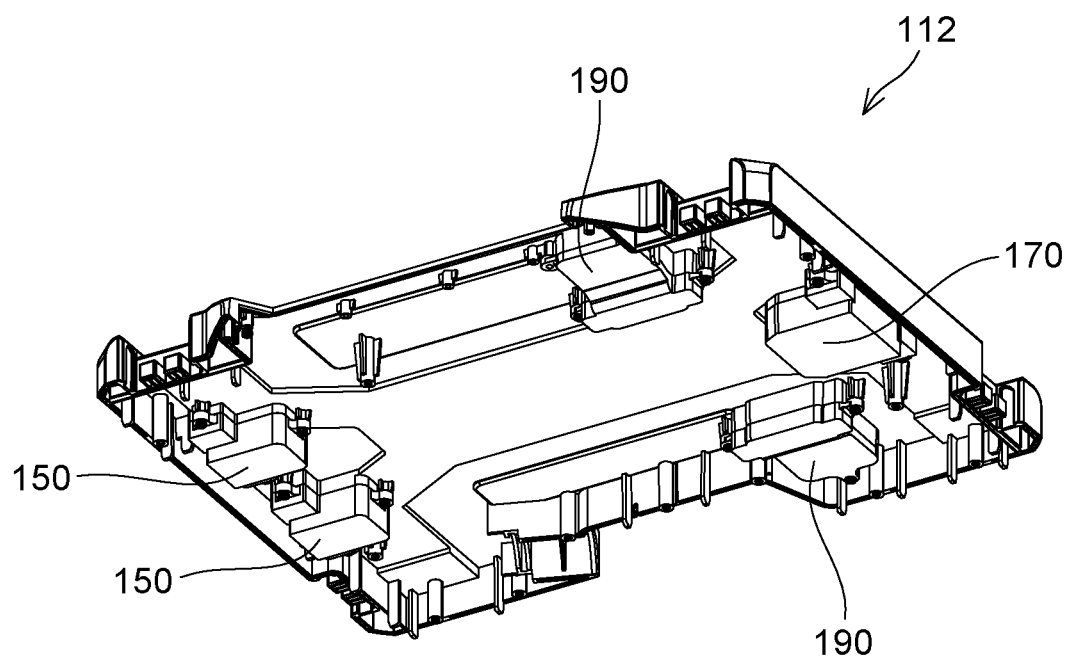
FIG. 7 illustrates a perspective view seeing an upper case 112 according to the embodiment from a front left lower side.
Figure 7:
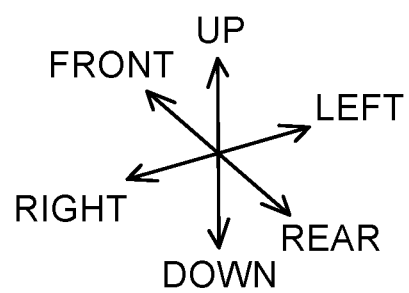

The first coupling mechanism 140 on the front side and the first coupling mechanism 140 on the rear side in FIG. 3 are positioned symmetrically relative to the front-rear direction and have shapes symmetrical relative to the front-rear direction. As shown in FIG. 6, the first coupling mechanism 140 on the front side comprises a first coupling case 150, a first engaging mechanism 152, and two torsion springs 154. As shown in FIG. 7, the first coupling cases 150 are fixed to the upper case 112 by being screwed from below. As shown in FIG. 6, the first engaging mechanism 152 comprises a base portion 156, a first projection 158 extending leftward from an upper portion of the base portion 156, a second projection 160 protruding downward from a lower end of the first projection 158, and a rotation axis 162. The rotation axis 162 extends frontward from a front end of a lower portion of the base portion 156 as well as extends rearward from a rear end of the lower portion of the base portion 156. The first engaging mechanism 152 is held by the first coupling case 150 rotatably around the rotation axis 162. The first engaging mechanism 152 is configured to move between an accommodated state of being accommodated in the opening 120a (see FIG. 3) and a non-accommodated state of protruding upward from the upper surface 120 (see FIG. 3). The two torsion springs 154 are respectively disposed at opposing ends of the rotation axis 162 in the front-rear direction. The first engaging mechanism 152 is biased from the accommodated state to the non-accommodated state by biasing force of the torsion springs 154. As shown in FIG. 3, a right part of the base portion 156 is in contact with the body case 110.

(Configuration of Second Coupling Mechanism 142)

Figure 8:
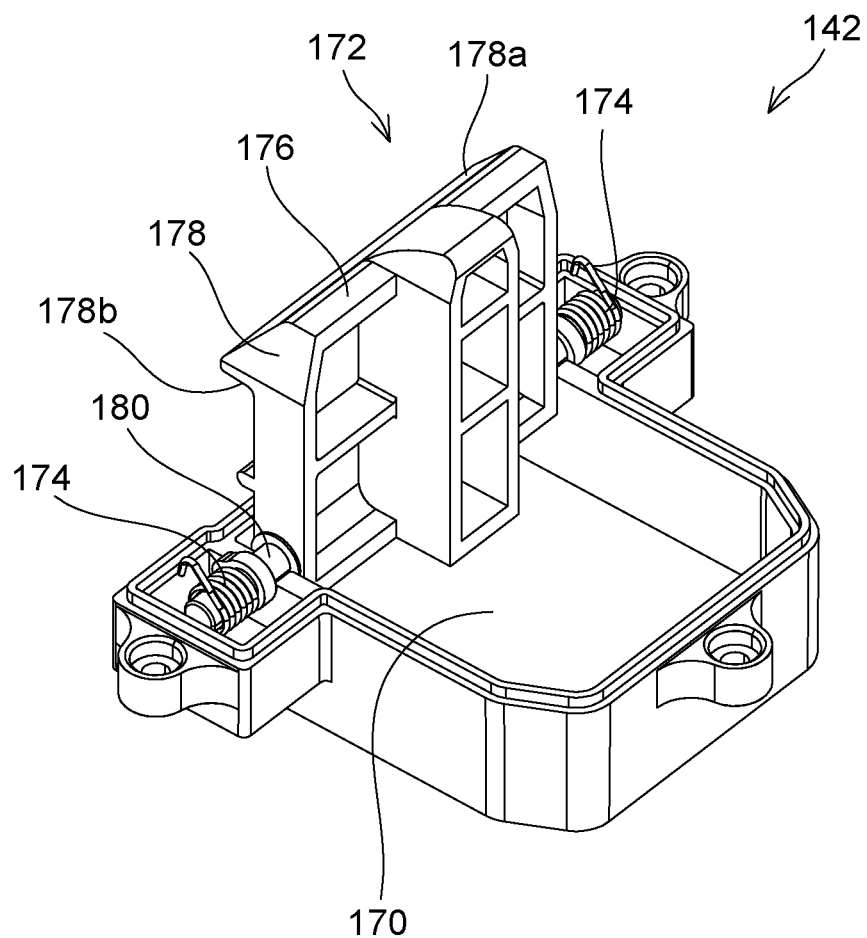
FIG. 8 illustrates a perspective view seeing a second coupling mechanism 142 according to the embodiment from a rear right upper side.

As shown in FIG. 8, the second coupling mechanism 142 comprises a second coupling case 170, a second engaging mechanism 172, and two torsion springs 174. As shown in FIG. 7, the second coupling case 170 is fixed to the upper case 112 by being screwed from below. As shown in FIG. 8, the second engaging mechanism 172 comprises a base portion 176 extending in the up-down direction, a projection 178 extending leftward from an upper portion of the base portion 176, and a rotation axis 180. A left side of an upper surface 178a of the projection 178 is inclined downward. A lower surface 178b of the projection 178 is parallel to a plane including the up-down direction and the left-right direction. The rotation axis 180 extends frontward from a front end of a lower portion of the base portion 176 as well as extends rearward from a rear end of the lower portion of the base portion 176. The second engaging mechanism 172 is held by the second coupling case 170 rotatably about the rotation axis 180. The second engaging mechanism 172 is configured to move between an accommodated state of being accommodated in the opening 120c (see FIG. 3) and a non-accommodated state of protruding upward from the upper surface 120 (see FIG. 3). The two torsion springs 174 are respectively disposed at opposing ends of the rotation axis 180 in the front-rear direction. The second engaging mechanism 172 is biased from the accommodated state to the non-accommodated state by biasing force of the torsion springs 174.

(Configuration of Third Coupling Mechanisms 144)

Figure 9:
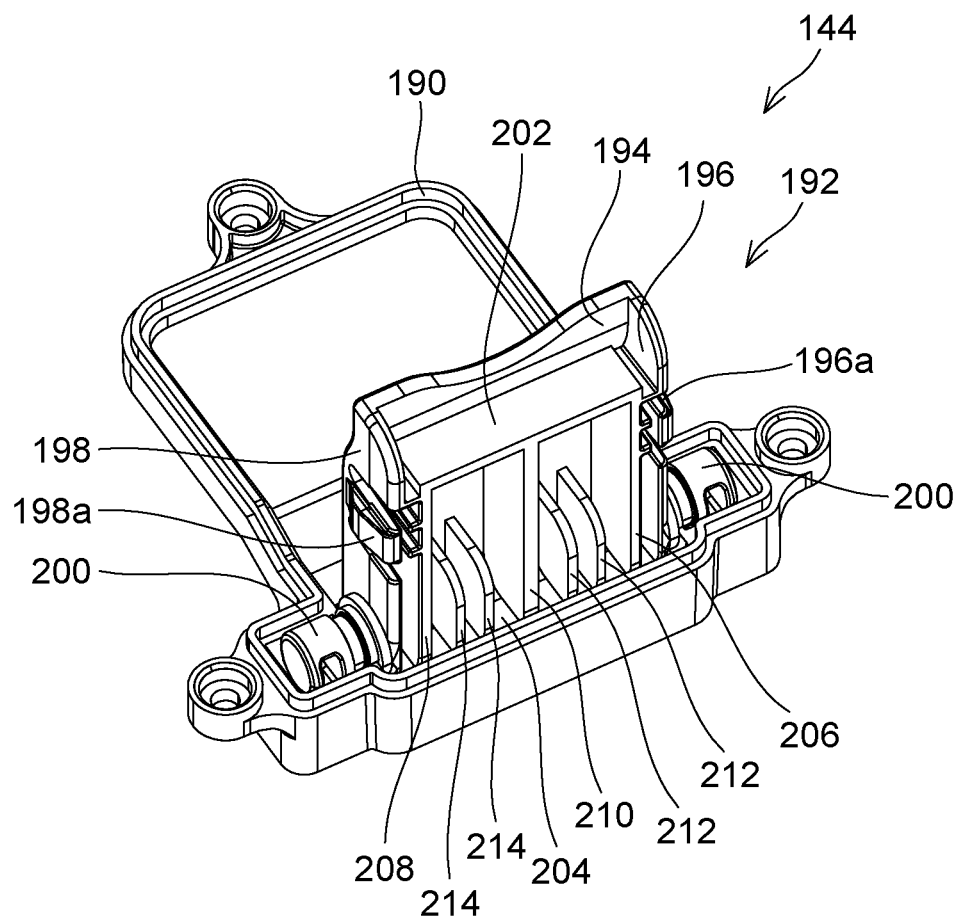
FIG. 9 illustrates a perspective view seeing a third coupling mechanism 144 according to the embodiment from the rear left upper side.
Figure 9:
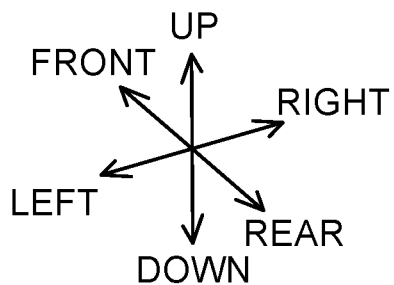

The third coupling mechanism 144 on the front side and the third coupling mechanism 144 on the rear side in FIG. 3 are positioned symmetrically relative to the front-rear direction and have shapes symmetrical relative to the front-rear direction. As shown in FIG. 9, the third coupling mechanism 144 disposed on the front side of the body case 110 comprises a third coupling case 190 and a third engaging mechanism 192. As shown in FIG. 7, the third coupling cases 190 are fixed to the upper case 112 by being screwed from below. As shown in FIG. 9, the third engaging mechanism 192 comprises a front plate portion 194 extending in the up-down direction, a first right plate portion 196 extending rearward from a right end of the front plate portion 194, a first left plate portion 198 extending rearward from a left end of the front plate portion 194, a rotation axis 200, and a bottom plate portion 204 extending rearward from a lower end of the front plate portion 194. The first right plate portion 196 has an engaging convex portion 196a protruding rightward therefrom, and the first left plate portion 198 has an engaging convex portion 198a protruding leftward therefrom. The engaging convex portions 196a, 198a are configured elastically deformable. The rotation axis 200 extends rightward from a lower portion of the first right plate portion 196 as well as extends leftward from a lower portion of the first left plate portion 198. The third engaging mechanism 192 is held by the third coupling case 190 rotatably about the rotation axis 200. The third engaging mechanism 192 is configured to move between an accommodated state of being accommodated in the opening 120d (see FIG. 3) and a non-accommodated state of protruding upward from the upper surface 120 (see FIG. 3). The third engaging mechanism 192 further comprises an upper plate portion 202, a second right plate portion 206, a second left plate portion 208, and a central plate portion 210. The upper plate portion 202 is disposed lower than an upper end of the front plate portion 194 and extends rearward from the front plate portion 194. The second right plate portion 206 is disposed on the left side relative to the first right plate portion 196. The second right plate portion 206 extends rearward from the front plate portion 194 and connects a right end of the upper plate portion 202 and the bottom plate portion 204. The second left plate portion 208 is disposed on the right side relative to the first left plate portion 198. The second left plate portion 208 extends rearward from the front plate portion 194, and connects a left end of the upper plate portion 202 and the bottom plate portion 204. The central plate portion 210 extends rearward from the front plate portion 194, and connects the upper plate portion 202 and the bottom plate portion 204 at a center of the upper plate portion 202 in the left-right direction. Between the second right plate portion 206 and the central plate portion 210, two protruding plate portions 212 extending upward from an upper surface of the bottom plate portion 204 and extending rearward from a rear surface of the front plate portion 194 are disposed. Between the second left plate portion 208 and the central plate portion 210, two protruding plate portions 214 extending upward from the upper surface of the bottom plate portion 204 and extending rearward from the rear surface of the front plate portion 194 are disposed.

(Configurations of Upper Coupling Parts 220, Lower Coupling Parts 221)

As shown in FIGS. 3, 4, the body case 110 has four upper coupling parts 220 disposed on an upper end of the body case 110 and four lower coupling parts 221 disposed on a lower end of the body case 110. As shown in FIG. 3, the four upper coupling parts 220 are respectively located at opposing left-right ends of the front surface 124, at a rear end of the right surface 128 (see FIG. 4), and at a rear end of the left surface 130. The four upper coupling parts 220 have a same shape although their arranged positions and orientations vary. The four lower coupling parts 221 are respectively arranged below the four upper coupling parts 220. The four lower coupling parts 221 have a same shape although their arranged positions and orientations vary.

Figure 10:
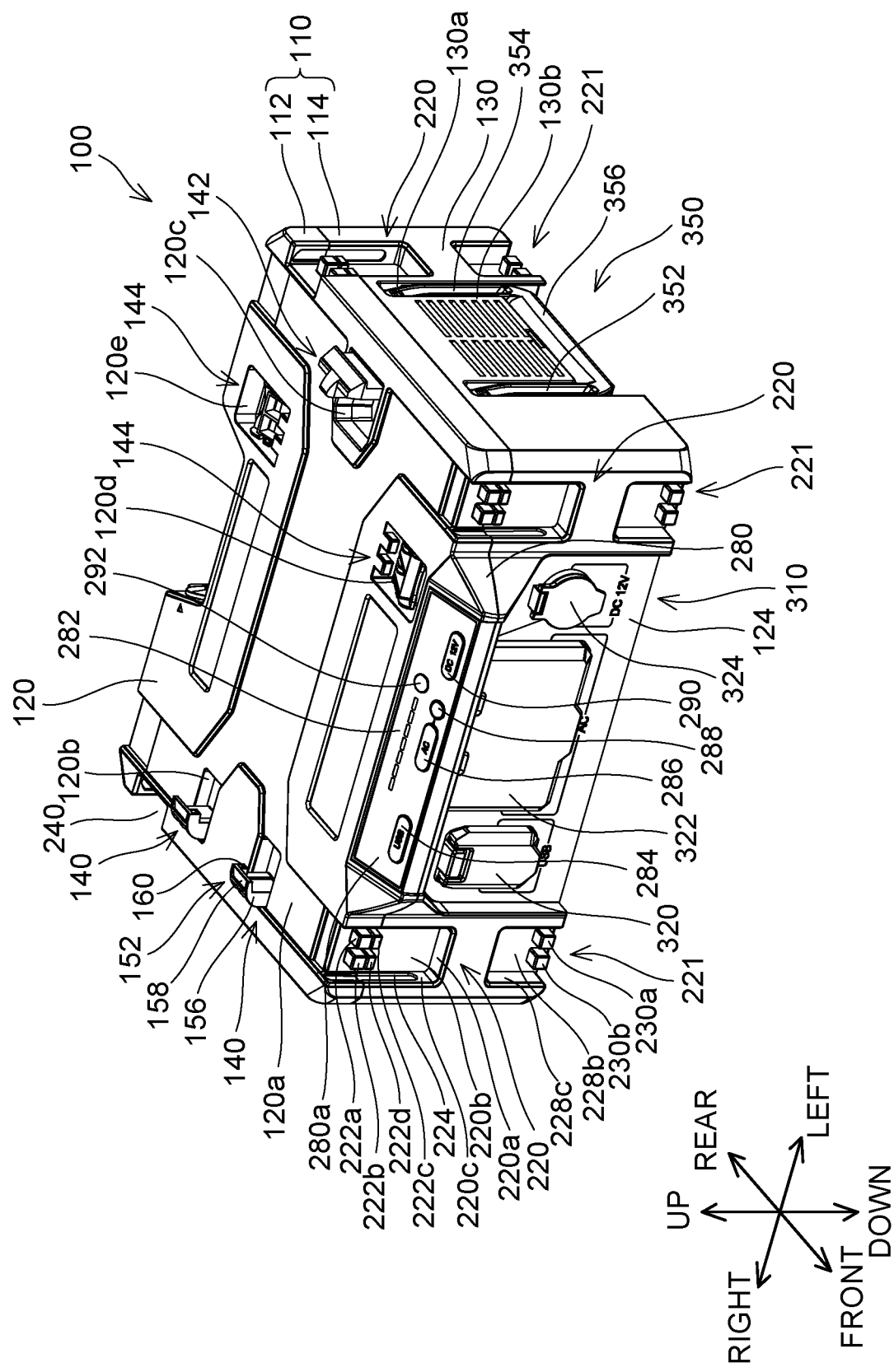
FIG. 10 illustrates a perspective view seeing from the front left upper side the power supply device 100 according to the embodiment with fourth engaging mechanisms 240 detached therefrom.
Figure 11:
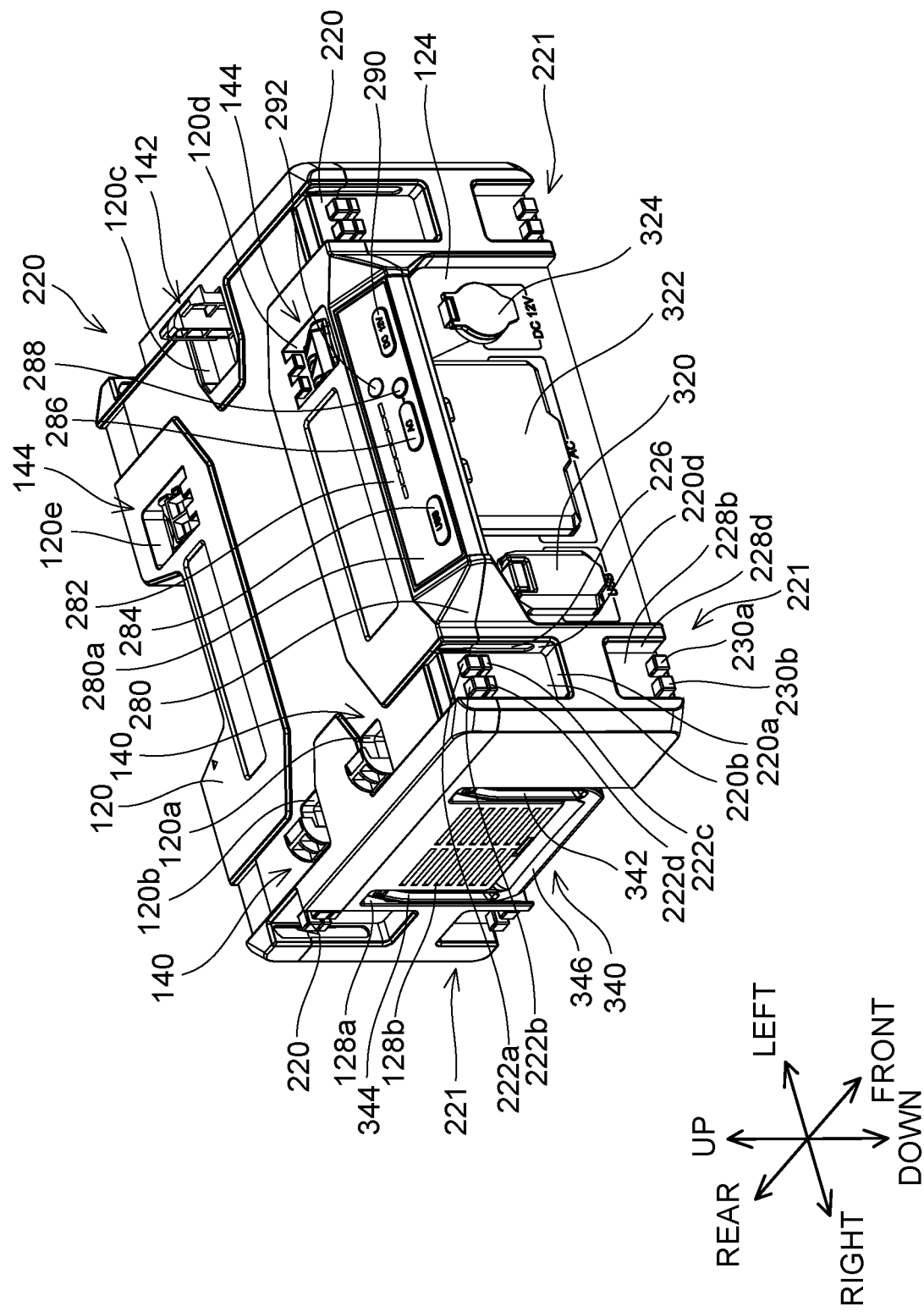
FIG. 11 illustrates a perspective view seeing from a front right upper side the power supply device 100 according to the embodiment with the fourth engaging mechanisms 240 detached therefrom.

As shown in FIG. 10, the upper coupling part 220 arranged at the right end of the front surface 124 of the body case 110 has a concave shape of which front portion and upper portion are open. The upper coupling part 220 comprises a bottom surface 220a, a rear surface 220b, a right surface 220c, and a left surface 220d (see FIG. 11). The bottom surface 220a is along the front-rear direction and the left-right direction and faces upward. The rear surface 220b is along the up-down direction and the left-right direction and faces frontward. The right surface 220c is along the front-rear direction and the up-down direction and faces leftward. As shown in FIG. 11, the left surface 220d is along the front-rear direction and the up-down direction and faces rightward. Four projections 222a to 222d protruding frontward are disposed on the rear surface 220b. The projection 222a and the projection 222b are aligned in the left-right direction. The projection 222a and the projection 222c are aligned in the up-down direction. The projection 222d is aligned with the projection 222b in the up-down direction and aligned with the projection 222c in the left-right direction. The left surface 220d has a left groove part 226 extending in the up-down direction and recessed leftward defined therein. As shown in FIG. 10, the right surface 220c has a right groove part 224 extending in the up-down direction and recessed rightward defined therein.

The lower coupling part 221 disposed at the right end of the front surface 124 of the body case 110 has a recessed shape of which front portion and lower portion are open. The lower coupling part 221 comprises an upper surface 228a (see FIG. 4), a rear surface 228b, a right surface 228c, and a left surface 228d (see FIG. 11). As shown in FIG. 4, the upper surface 228a is along the front-rear direction and the left-right direction and faces upward. As shown in FIG. 10, the tear surface 228b is along the up-down direction and the left-right direction, and faces frontward. The right surface 228c is along the front-rear direction and the up-down direction, and faces leftward. As shown in FIG. 11, the left surface 228d is along the front-rear direction and the up-down direction, and faces rightward. Two projections 230a, 230b protruding frontward are disposed on the rear surface 228b. The two projections 230a, 230b are arranged aligned in the left-right direction.

(Configuration of Fourth Engaging Mechanisms 240)

Figure 12:
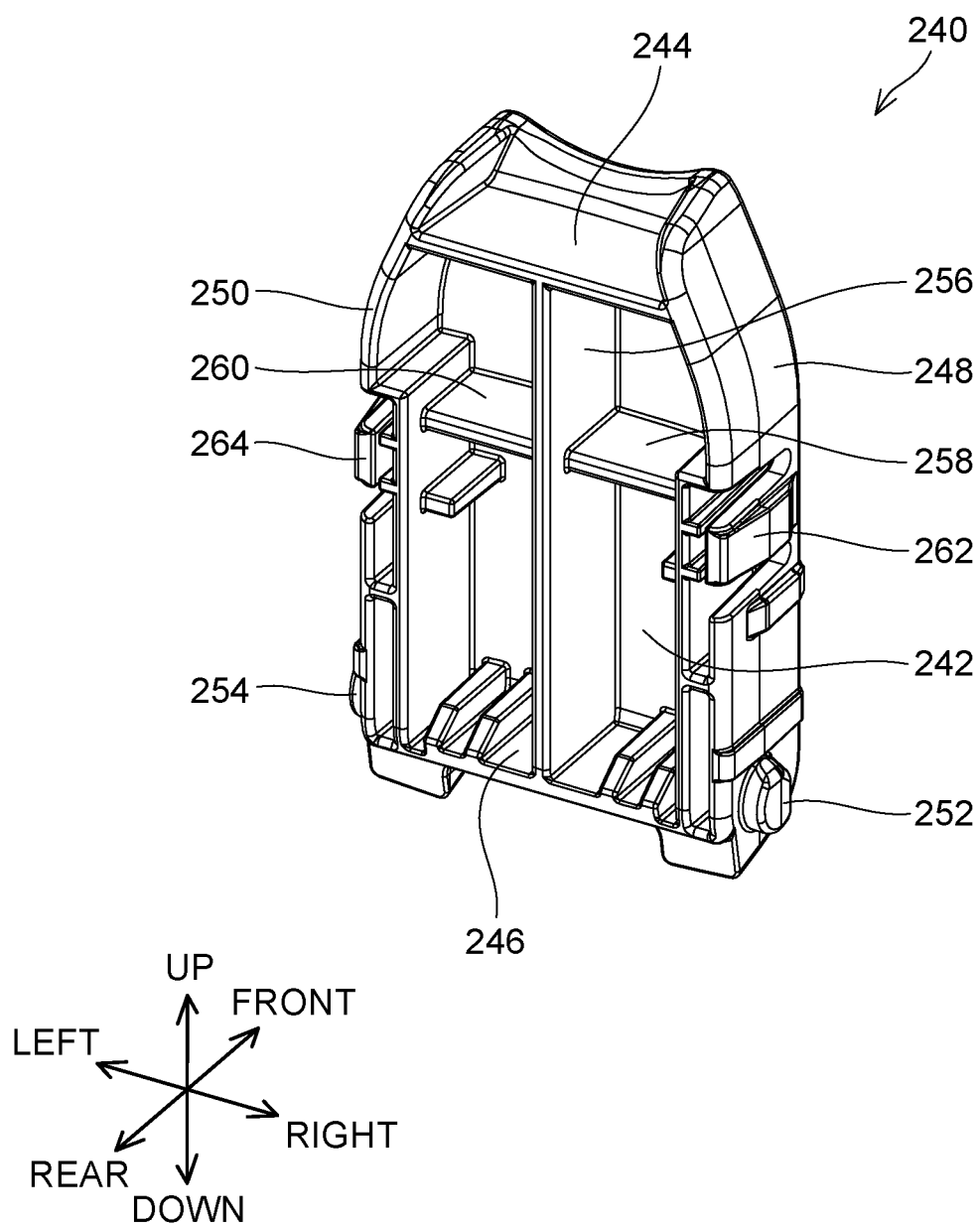
FIG. 12 illustrates a perspective view seeing the fourth engaging mechanism 240 according to the embodiment from the rear right upper side.

As shown in FIG. 3, a fourth engaging mechanism 240 is attached to each of the four upper coupling parts 220. The four fourth engaging mechanisms 240 all have a same shape although their arranged positions and orientations vary. As shown in FIG. 12, the fourth engaging mechanism 240 to be attached to the upper coupling part 220 at the right end of the front surface 124 of the body case 110 comprises a front plate portion 242 extending in the up-down direction, an upper plate portion 244 extending rearward from an upper portion of the front plate portion 242, a bottom plate portion 246 extending rearward from a lower portion of the front plate portion 242, a right plate portion 248 extending rearward from a right end of the front plate portion 242, a left plate portion 250 extending rearward from a left end of the front plate portion 242, a first rotation axis 252, and a second rotation axis 254. The first rotation axis 252 extends rightward from a lower portion of the right plate portion 248. The second rotation axis 254 extends leftward from a lower portion of the left plate portion 250. The first rotation axis 252 is disposed in the right groove part 224 (see FIG. 10) of the upper coupling part 220, and the second rotation axis 254 is disposed in the left groove part 226 (see FIG. 11) of the upper coupling part 220. The fourth engaging mechanism 240 is configured to rotate around the first rotation axis 252 and the second rotation axis 254, and is held by the body case 110 movably along the right groove part 224 and the left groove part 226 in the up-down direction. The fourth engaging mechanism 240 further comprises a central plate portion 256 connecting the upper plate portion 244 and the bottom plate portion 246 in the up-down direction at the center of the upper plate portion 244 in the left-right direction, a first connecting plate portion 258 connecting the central plate portion 256 and the right plate portion 248 in the left-right direction, and a second connecting plate portion 260 connecting the central plate portion 256 and the left plate portion 250 in the left-right direction. A width of the central plate portion 256 in the left-right direction is smaller than a distance between the projection 222a and the projection 222b of the upper coupling part 220 (see FIG. 10). A distance between the upper plate portion 244 and the first connecting plate portion 258 in the up-down direction is greater than a distance between an upper end of the projection 222a and a lower end of the projection 222c of the upper coupling part 220 (see FIG. 10). The right plate portion 248 includes a right convex portion 262 elastically deformable, and the left plate portion 250 includes a left convex portion 264 elastically deformable. When the right convex portion 262 of the fourth engaging mechanism 240 contacts the right surface 220c (see FIG. 10) of the upper coupling part 220, and a part of the right convex portion 262 fits into the right groove part 224 (see FIG. 10) of the right surface 220c, the right convex portion 262 elastically deforms leftward. Further, when the left convex portion 264 of the fourth engaging mechanism 240 contacts the left surface 220d (see FIG. 11) of the upper coupling part 220, and a part of the left convex portion 264 fits into the left groove part 226 of the left surface 220d (see FIG. 11), the left convex portion 264 elastically deforms rightward. With the right convex portion 262 and the left convex portion 264 elastically deformed, the fourth engaging mechanism 240 is fixed to the upper coupling part 220 (see FIG. 10).

(Configuration of Waterproof Wall 280) As shown in FIG. 3, a waterproof wall 280 extending frontward from a front end of the front surface 124 is connected to the front surface 124 of the body case 110. An upper surface 280a of the waterproof wall 280 is inclined such that its front side is inclined downward. An inclination angle of the upper surface 280a is for example substantially 20 degrees. The upper surface 280a has a display unit 282, a USB power supply switch 284, an AC power supply switch 286, a frequency shifter switch 288, a DC power supply switch 290, and a buzzer switch 292 disposed thereon. The display unit 282 is configured to display a magnitude of power outputted from the power supply device 100. The USB power supply switch 284 is a switch configured to switch ON/OFF of a USB output part 312 to be described later (see FIG. 4). The AC power supply switch 286 is a switch configured to switch ON/OFF of an AC output part 314 to be described later (see FIG. 4). The frequency shifter switch 288 is a switch configured to switch a frequency of power outputted by the AC output part 314 to be described later (see FIG. 4). A user is able to switch the frequency of the power outputted by the AC output part 314 (see FIG. 4) to be described later between 50 Hz and 60 Hz, by operating the frequency shifter switch 288. The DC power supply switch 290 is a switch configured to switch on/off of a DC output part 316 (see FIG. 4) to be described later. The buzzer switch 292 is a switch configured to switch operation of a buzzer 294 (see FIG. 13). In the present embodiment, the buzzer 294 (see FIG. 13) is configured to operate when capacity of the attached battery unit 500, 700 (see FIG. 1, FIG. 2) is equal to or less than a predetermined capacity, or when power outputted by the power supply device 100 is equal to or greater than a predetermined power (for example, 1400 W). Meanwhile, the power supply device 100 does not comprise a main power switch for switching on/off of the power supply device 100.

(Configuration of Output Unit 310)

As shown in FIG. 4, an output unit 310 is disposed below the waterproof wall 280 on the front surface 124 of the body case 110. The output unit 310 comprises the USB output part 312, the AC output part 314, and the DC output part 316. The USB output part 312 includes four USB ports configured to be connected with plural types of USB cables (e.g., type a, or type c). The AC output part 314 includes two outlets. The DC output part 316 includes a cigar socket. The front surface 124 of the body case 110 comprises a USB protector part 320 configured to protect the USB output part 312, an AC protector part 322 configured to protect the AC output part 314, and a DC protector part 324 configured to protect the DC output part 316, disposed thereon. The USB protector part 320, the AC protector part 322, and the DC protector part 324 are held by the body case 110 rotatably relative to the body case 110. Each of the USB protector part 320, the AC protector part 322, and the DC protector part 324 is configured to move between a protecting state (see FIG. 3) of covering a corresponding one of the USB output part 312, the AC output part 314, and the DC output part 316 and a non-protecting state (see FIG. 4) of not covering the corresponding one of the USB output part 312, the AC output part 314, and the DC output part 316. Each of the USB protector part 320, the AC protector part 322, and the DC protector part 324 can be rotated to a position at which an angle between itself and the front surface 124 of the body case 110 is substantially 90 degrees. The waterproof wall 280, the USB protector part 320, the AC protector part 322, and the DC protector part 324 may suppress water from reaching the USB output part 312, the AC output part 314, and the DC output part 316.

(Configurations of Right Handle 340 and Left Handle 350)

Figure 14:
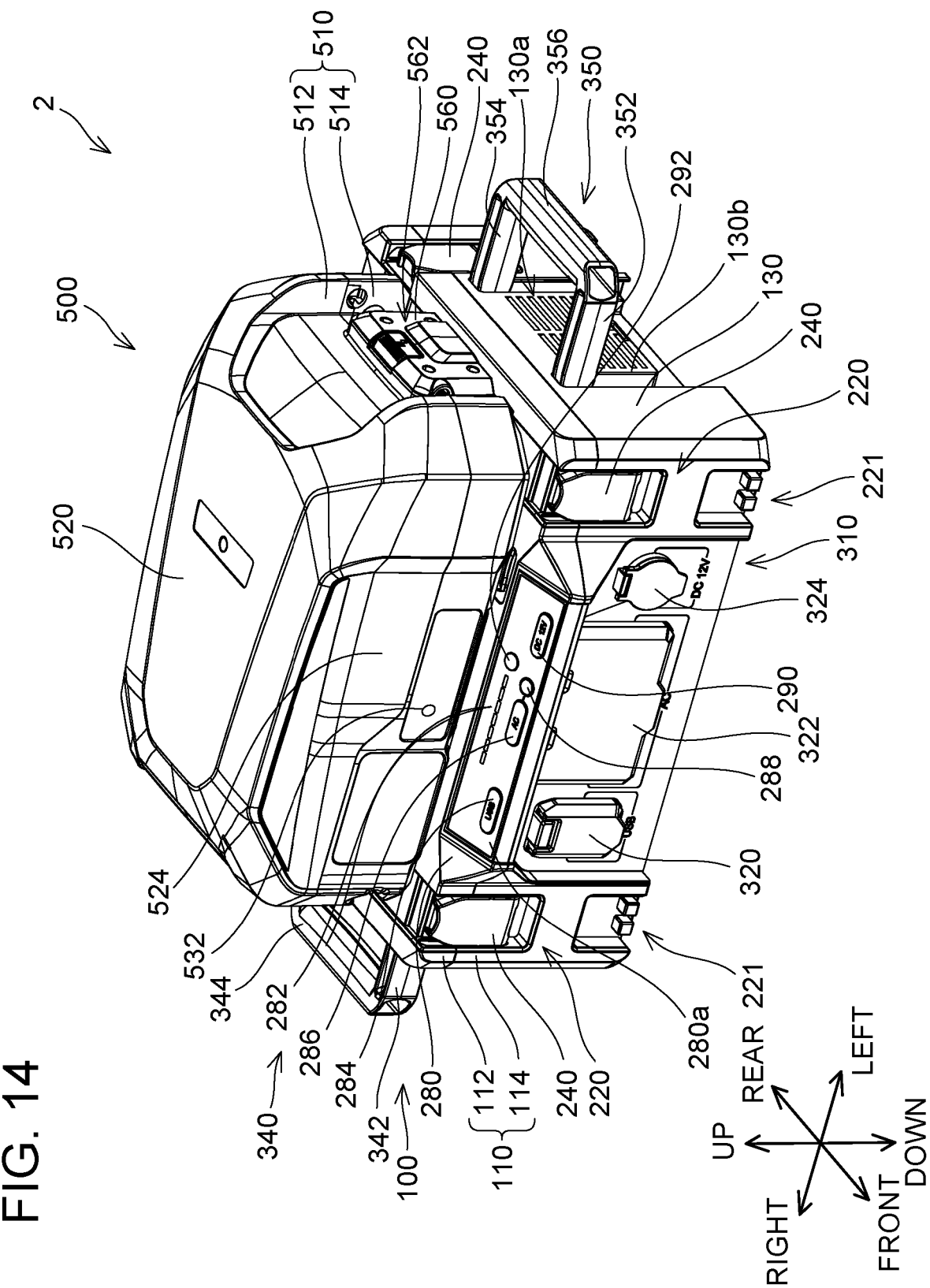
FIG. 14 illustrates a schematic view seeing from the front left upper side the power supply system 2 with a right handle 340 and a left handle 350 being in a non-accommodated state in the embodiment.

As shown in FIG. 4, the right handle 340 is disposed on the right surface 128 of the body case 110. The right handle 340 comprises a front support portion 342, a rear support portion 344, and a grip portion 346. The front support portion 342 and the rear support portion 344 extend in the up-down direction. An upper end of the front support portion 342 and an upper end of the rear support portion 344 are attached to the body case 110 rotatably around a rotation axis (not shown) extending in the front-rear direction within the body case 110. The grip portion 346 extends in the front-rear direction, and connects a lower end of the front support portion 342 and a lower end of the rear support portion 344. A right handle accommodating part 128a recessed leftward is defined in the right surface 128 of the body case 110. The right handle accommodating part 128a has a shape corresponding to the right handle 340. The right handle 340 is configured to move between an accommodated state of being accommodated in the right handle accommodating part 128a and a non-accommodated state of not being accommodated in the right handle accommodating part 128a (see FIG. 14). As shown in FIG. 14, the right handle 340 can be pulled up to a position that is substantially 90 degrees relative to the right surface 128.

As shown in FIG. 3, a left handle 350 is disposed on the left surface 130 of the body case 110. The left handle 350 comprises a front support portion 352, a rear support portion 354, and a grip portion 356. The front support portion 352 and the rear support portion 354 extend in the op-down direction. An upper end of the front support portion 352 and an upper end of the rear support portion 354 are attached to the body case 110 rotatably around a rotation axis (not shown) extending in the front-rear direction within the body case 110. The grip portion 356 extends in the front-rear direction, and connects a lower end of the front support portion 352 and a lower end of the rear support portion 354. A left handle accommodating part 130a recessed rightward is arranged on the left surface 130 of the body case 110. The left handle accommodating part 130a has a shape corresponding to the left handle 350. The left handle 350 is configured to move between an accommodated state of being accommodated in the left handle accommodating part 130a and a non-accommodated state of not being accommodated in the left handle accommodating part 130a (see FIG. 14). As shown in FIG. 14, the left handle 350 can be pulled up to a position that is substantially 90 degrees relative to the left surface 130.

Figure 15:
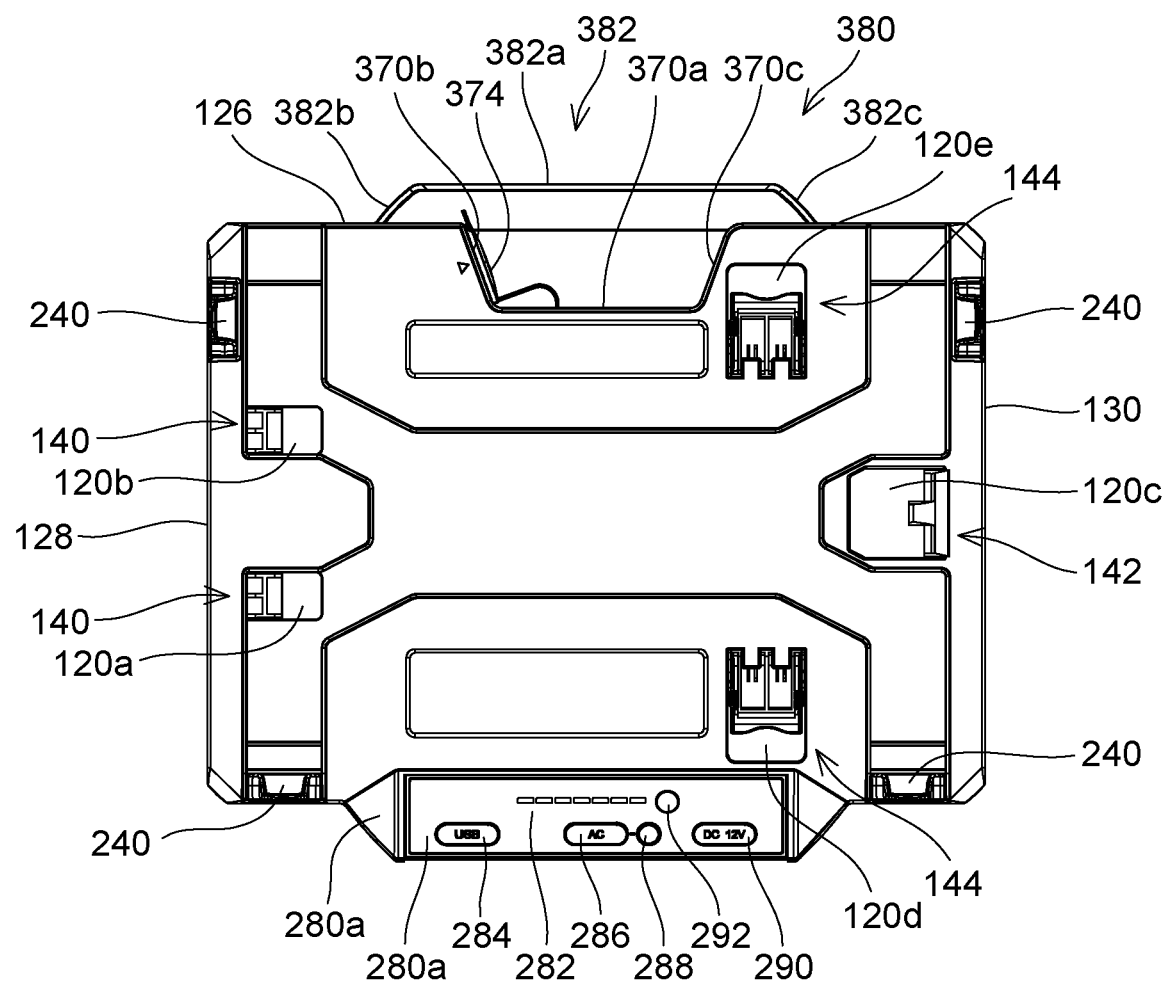
FIG. 15 illustrates a top view of the power supply device 100 according to the embodiment from above.
Figure 15:
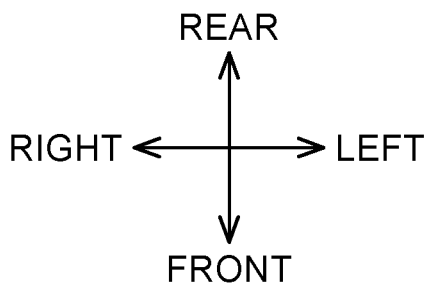

As shown in FIG. 15, in a state where the right handle 340 and the left handle 350 are in the accommodated state, the right handle 340 and the left handle 350 are not visible in a top view of the power supply device 100 seen from above. That is, in the accommodated state, a right end of the right handle 340 is positioned on the left side from the right surface 128 of the body case 110, and a left end of the left handle 350 is positioned on the right side from the left surface 130 of the body case 110.

(Configuration of Socket IF Part 370)

Figure 5:
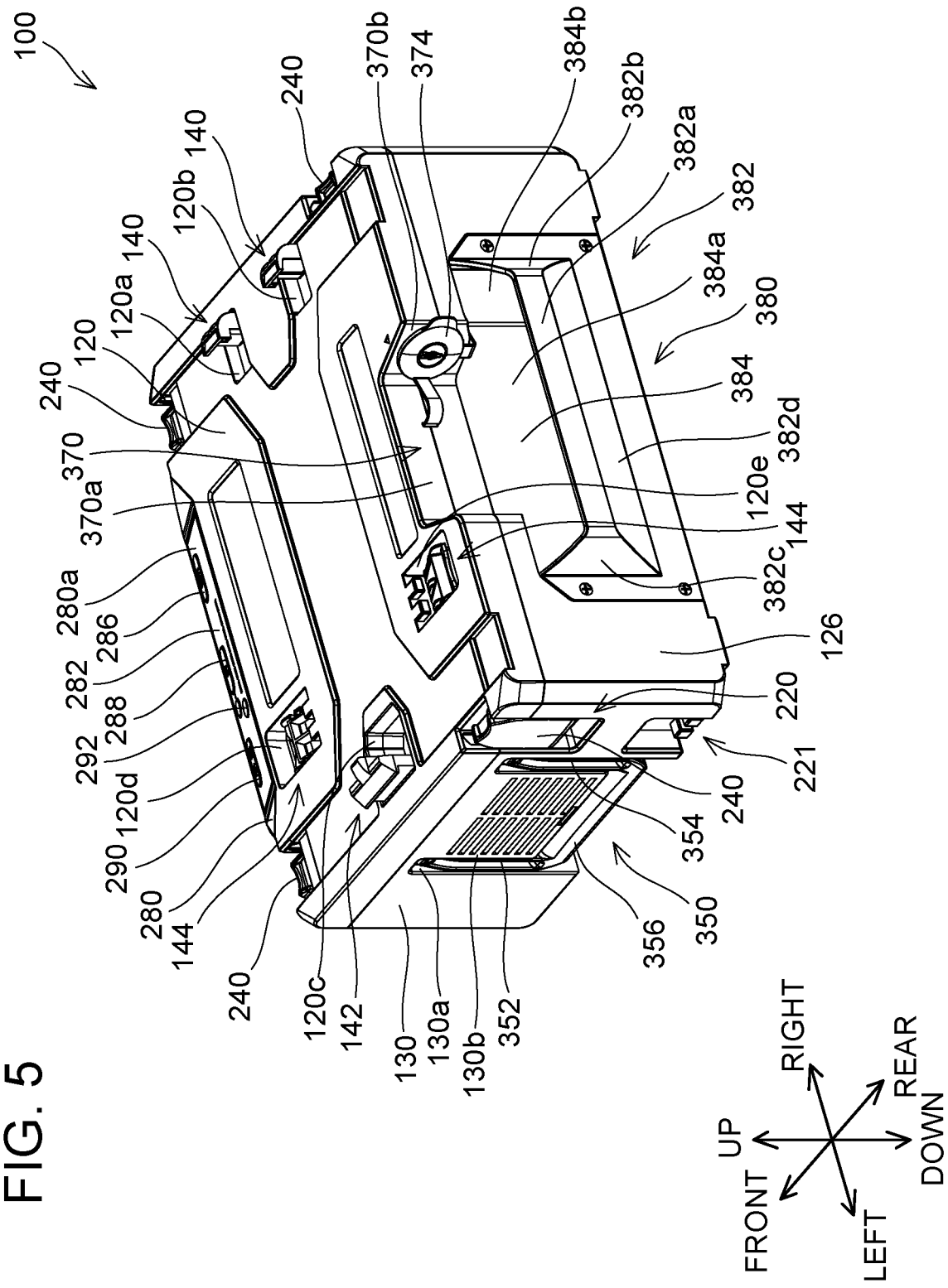
FIG. 5 illustrates a perspective view seeing the power supply device 100 according to the embodiment from a rear left upper side.
Figure 16:
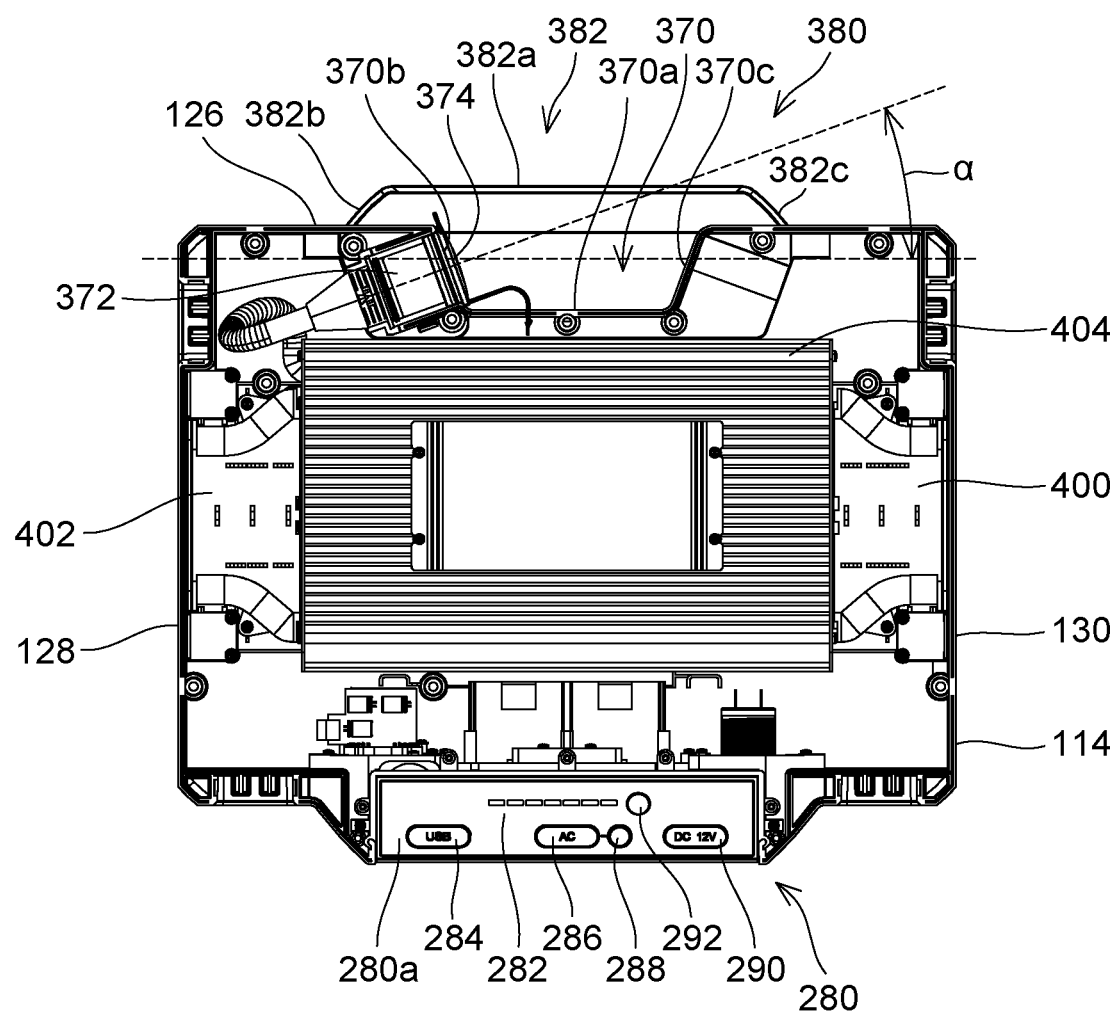
FIG. 16 illustrates a top view of a lower case 114 according to the embodiment from above.
Figure 17:
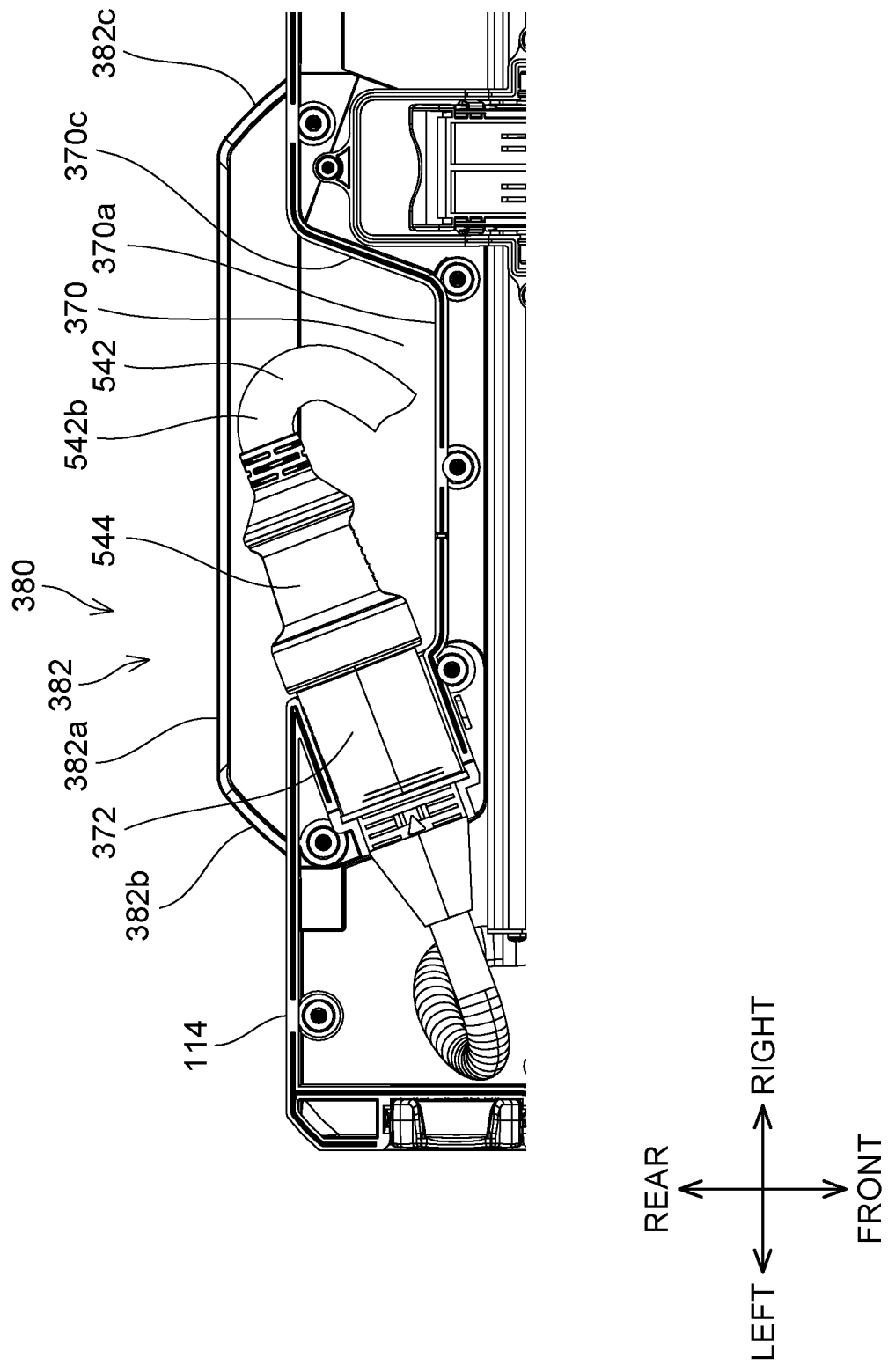
FIG. 17 illustrates a top view of the power supply system 2 with a device-side socket part 372 and a battery-side socket part 544 connected in the embodiment from above.

As shown in FIG. 5, a socket IF part 370 is disposed on an upper portion of the rear surface 126 of the body case 110. The socket IF part 370 comprises a front surface 370a, a right surface 370b, and a left surface 370c (see FIG. 15). The front surface 370a is along the up-down direction and the left-right direction, and faces rearward. The right surface 370b is along the up-down direction, and its rear side is inclined rightward, and faces left-rearward. As shown in FIG. 15, the left surface 370c is along the up-down direction, its rear side is inclined leftward, and faces right-rearward. As shown in FIG. 16, a device-side socket part 372 is disposed on the right surface 370b. A center axis 372a of the device-side socket part 372 is inclined rearward by a predetermined angle α in the left-right direction in a top view of the power supply device 100 seen from above. In the present embodiment, the predetermined angle α is for example substantially 20 degrees. As shown in FIG. 17, by having such an angle, a space for a user to attach/detach a battery-side socket part 544 of the battery unit 500 (to be described later) to/from the device-side socket part 372 can be secured. As shown in FIG. 15, a socket protector part 374 configured to protect the device-side socket part 372 is disposed on the right surface 370b. The socket protector part 374 is configured to move between a protecting state of covering the device-side socket part 372 and a non-protecting state of not protecting the device-side socket part 372 (not shown).

(Configuration of Cable Accommodating Part 380)

Figure 18:
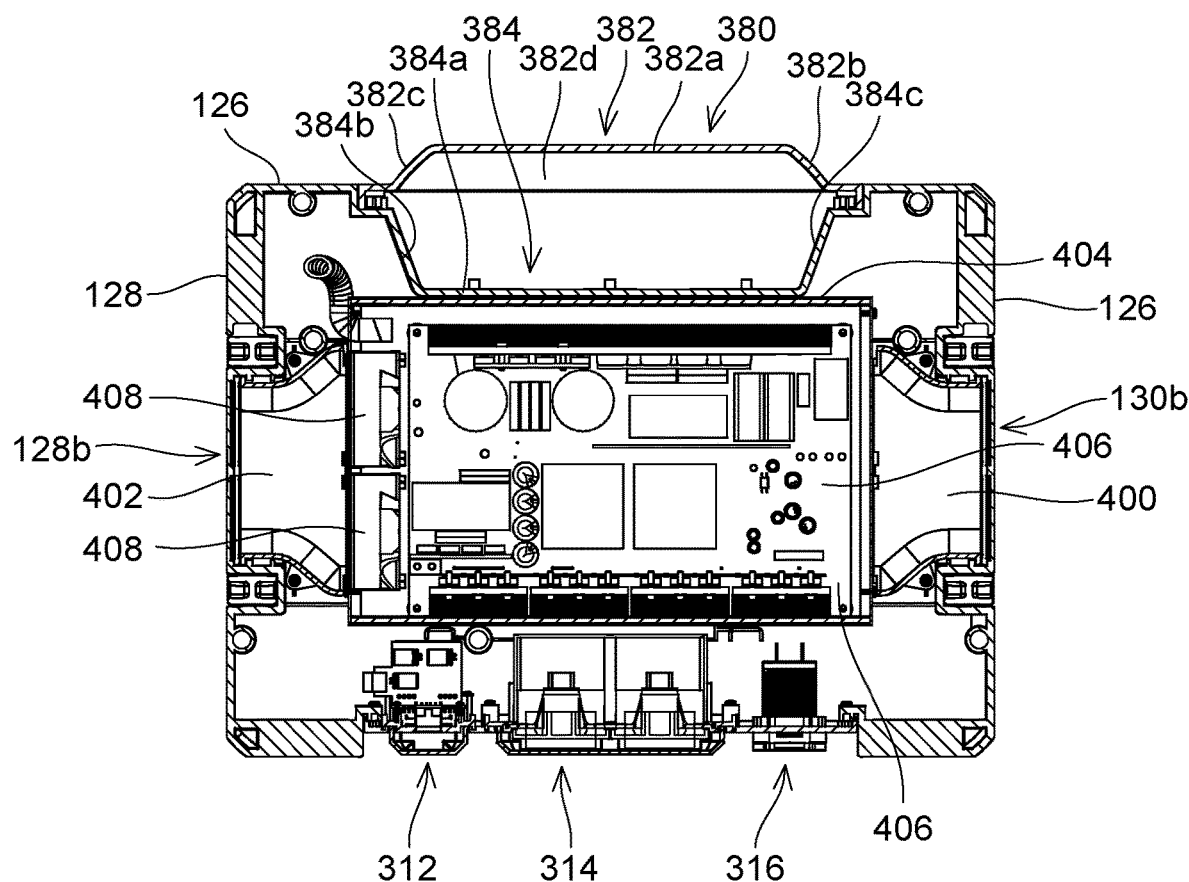
FIG. 18 illustrates a top cross-sectional view of the lower case 114 according to the embodiment.
Figure 18:
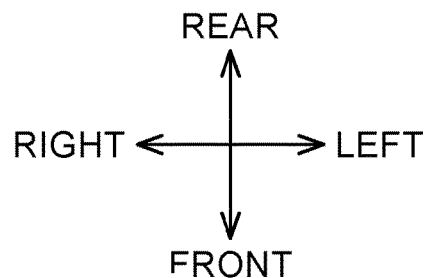

As shown in FIG. 5, a cable accommodating part 380 is further disposed on the rear surface 126 of the body case 110. The cable accommodating part 380 is disposed below the socket IF part 370. The cable accommodating part 380 is composed of a pocket 382 and a recessed part 384. The pocket 382 is fixed to the rear surface 126 of the body case 110 by screws. The pocket 382 comprises a rear plate portion 382a, a right plate portion 382b, a left plate portion 382c, and a bottom plate portion 382d. The rear plate portion 382a extends in the up-down direction and the left-right direction. The rear plate portion 382a is positioned more on the rear side than the rear surface 126 of the body case 110 is. The right plate portion 382b is along the up-down direction, and has its rear side inclined leftward. The left plate portion 382e is along the up-down direction, and has its rear side inclined rightward. The bottom plate portion 382d is along the left-right direction, and has its rear side inclined upward. As shown in FIG. 18, the recessed part 384 comprises a front surface 384a, a right surface 384b, and a left surface 384c. The front surface 384a is along the op-down direction and the left-right direction, and faces rearward. The right surface 384b is along the up-down direction, has its rear side inclined rightward, and faces left-rearward. The left surface 384c is along the up-down direction, has its rear side inclined leftward, and faces right-rearward. The front surface 384a is positioned more on the front side than the front surface 370a of the socket IF part 370 is (see FIG. 15). The right surface 384b is positioned more on the right side than the right surface 370b of the socket IF part 370 is (see FIG. 15). The left surface 384c is positioned more on the left side than the left surface 370c of the socket IF part 370 is (see FIG. 15). That is, an area of the recessed part 384 is greater than an area of the socket IF part 370 (see FIG. 15) in a top view of the power supply device 100 seen from above. According to such configuration, a size of the power supply device 100 can be made compact while also a space within the cable accommodating part 380 can be increased.

(Internal Configuration of Body Case 110)

Figure 19:
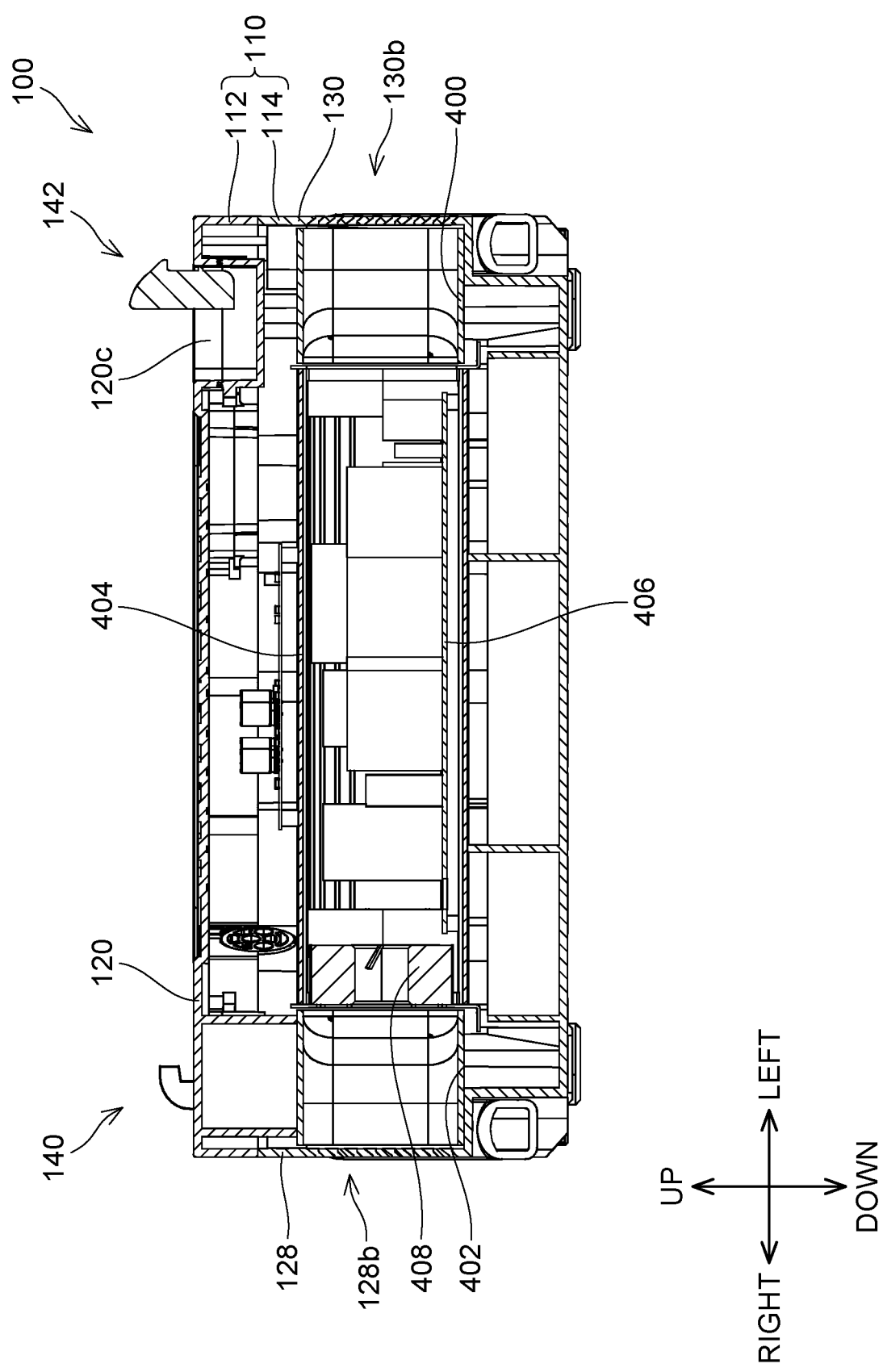
FIG. 19 illustrates a front cross-sectional view of the power supply device 100 according to the embodiment.

As shown in FIG. 16, an (air) intake duct 400, an (air) exhaust duct 402, and a substrate case 404 are accommodated within the body case 110. The intake duct 400 connects the left surface 130 of the body case 110 and a left end of the substrate case 404. The exhaust duct 402 connects the right surface 128 of the body case 110 and a right end of the substrate case 404. As shown in FIG. 18, a control board 406 and two cooling fans 408 are accommodated within the substrate case 404. As shown in FIG. 3, a plurality of intake boles 130b is defined on the left surface 130 of the body case 110. The plurality of intake holes 130b is arranged at a position facing the intake duct 400 (see FIG. 18). The plurality of intake holes 130b is arranged between the front support portion 352 and the rear support portion 354 of the left handle 350 and arranged higher than the grip portion 356. In the plurality of intake holes 130b, an upper end of the hole 130b located uppermost is lower than an upper end of the front support portion 352 and an upper end of the rear support portion 354. That is, when the left handle 350 is in the accommodated state, the plurality of intake holes 130b is located on the inner side of the left handle 350. As shown in FIG. 19, the plurality of intake holes 130b has its left side inclined downward. According to such configuration, water can be suppressed from entering the body case 110 through the plurality of intake holes 130b. As shown in FIG. 4, a plurality of exhaust holes 128b is defined on the right surface 128 of the body case 110. The plurality of exhaust holes 128b is arranged at a position facing the exhaust duct 402 (see FIG. 18). The plurality of exhaust holes 128b is arranged between the front support portion 342 and the rear support portion 344 of the right handle 340 and is arranged higher than the grip portion 346. In the plurality of exhaust holes 128b, an upper end of the hole 128b located uppermost is lower than an upper end of the front support portion 342 and an upper end of the rear support portion 344. That is, when the right handle 340 is in the accommodated state, the plurality of exhaust holes 128b is located on the inner side of the right handle 340. As shown in FIG. 19, the plurality of exhaust holes 128b has its right side inclined downward. According to such configuration, in a state where the user is holding the right handle 340 being in the non-accommodated state (see FIG. 14), air (e.g., hot air) discharged from the plurality of exhaust holes 128b can be suppressed from hitting a hand of the user holding the right handle 340.

(Configuration of Control Circuit 420)

Figure 13:
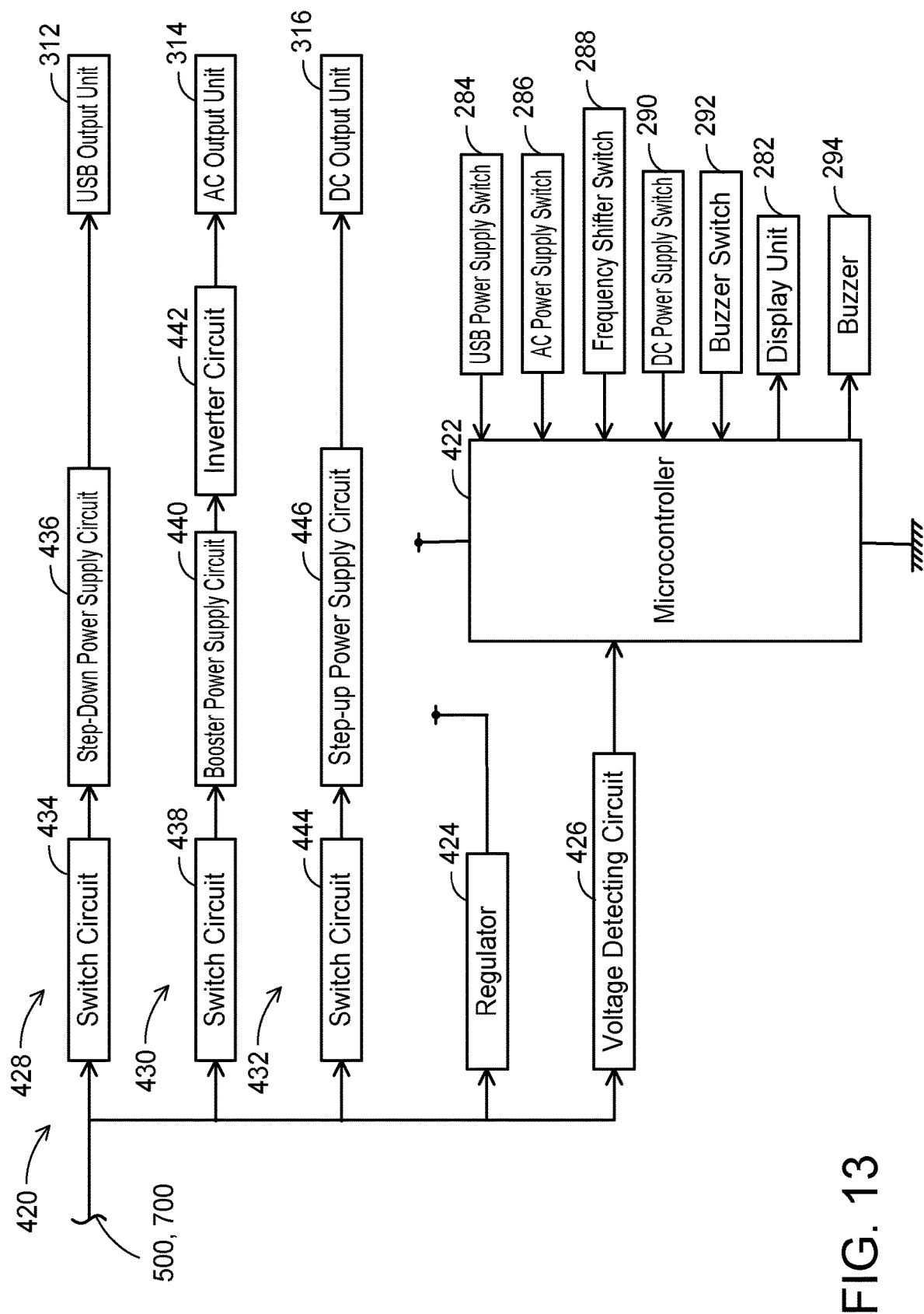
FIG. 13 illustrates a schematic view of a control circuit of the power supply system 2 according to the embodiment.

With reference to FIG. 13, a control circuit 420 mounted on the control board 406 accommodated in the body case 110 (see FIG. 18) will be described. The control circuit 420 has plural electrical components arranged on the control board 406. Hereafter, although the configuration of the control circuit 420 will be described, this does not limit the configuration of the control circuit 420. The configuration of the control circuit 420 may suitably be modified.

The control circuit 420 is configured to be electrically connected to the battery unit 500, 700. The control circuit 420 comprises a microcomputer 422, a regulator 424, a voltage detecting circuit 426, a USB circuit portion 428, an AC circuit portion 430, and a DC circuit portion 432. The regulator 424, the voltage detecting circuit 426, the USB circuit portion 428, the AC circuit portion 430, and the DC circuit portion 432 are connected to the battery unit 500, 700.

The regulator 424 is configured to convert a voltage of DC power inputted from the battery unit 500, 700 to 5V. The DC power generated by the regulator 424 is supplied to the microcomputer 422. Due to this, the microcomputer 422 is activated. The voltage detecting circuit 426 is configured to detect the voltage of the battery unit 500, 700 and output the same to the microcomputer 422.

The microcomputer 422 has the display unit 282, the USB power supply switch 284, the AC power supply switch 286, the frequency shifter switch 288, the DC power supply switch 290, the buzzer switch 292, and the buzzer 294 connected thereto. Although these are not illustrated, the microcomputer 422 is further connected with the USB circuit portion 428, the AC circuit portion 430, and the DC circuit portion 432. The microcomputer 422 is configured to control operation of the USB circuit portion 428 based on a signal inputted from the USB power supply switch 284, control operation of the AC circuit portion 430 based on signals inputted from the AC power supply switch 286 and the frequency shifter switch 288, and control operation of the DC circuit portion 432 based on a signal inputted from the DC power supply switch 290. Further, the microcomputer 422 is configured to control operation of the buzzer 294 based on the voltage inputted from the voltage detecting circuit 426 and the signal inputted from the buzzer switch 292.

The USB circuit portion 428 comprises the switch circuit 434, a step-down power supply circuit 436, and the USB output part 312. Operations of the switch circuit 434 and the step-down power supply circuit 436 are controlled by the microcomputer 422. The switch circuit 434 is a circuit for switching on/off of the USB circuit portion 428. The step-down power supply circuit 436 is a circuit configured to step-down DC power supplied from the battery unit 500, 700 to a predetermined voltage (e.g., 5V). The DC power converted by the step-down power supply circuit 436 is supplied to the USB output part 312. In a variant, the USB circuit portion 428 may comprise two step-down power supply circuits. Further, in another variant, the USB circuit portion 428 may comprise a step-up/step-down power supply circuit instead of the step-down power supply circuit 436.

The AC circuit portion 430 comprises a switch circuit 438, a step-up power supply circuit 440, an inverter circuit 442, and the AC output part 314. Operations of the switch circuit 438, the step-up power supply circuit 440, and the inverter circuit 442 are controlled by the microcomputer 422. The switch circuit 438 is a circuit for switching on/off of the AC circuit portion 430. The step-up power supply circuit 440 is a circuit configured to step up DC power supplied from the battery unit 500, 700 to a predetermined voltage (e.g., 100V). The inverter circuit 442 is a circuit configured to convert DC power to AC power. AC power converted by the step-up power supply circuit 440 and the inverter circuit 442 is supplied to the AC output part 314.

The DC circuit portion 432 comprises a switch circuit 444, a step-down power supply circuit 446, and the DC output part 316. Operations of the switch circuit 444 and the step-down power supply circuit 446 are controlled by the microcomputer 422. The switch circuit 444 is a circuit configured to switch on/off of the DC circuit portion 432. The step-down power supply circuit 446 is a circuit configured to step down DC power supplied from the battery unit 500, 700 to a predetermined voltage (e.g., 12V). The DC power converted by the step-down power supply circuit 446 is supplied to the DC output part 316. In a variant, the DC circuit portion 432 may comprise a step-up/step-down power supply circuit instead of the step-down power supply circuit 446.

(Configuration of Battery Unit 500)

As shown in FIG. 1, the battery unit 500 comprises a battery case 510. A plurality of battery cells is accommodated within the battery case 510. The battery unit 500 has an output voltage of 36V, for example. The battery case 510 is divided into an upper case 512 and a lower case 514. The upper case 512 and the lower case 514 are fixed to each other by screws (not shown). The battery case 510 comprises an upper surface 520, a bottom surface 522 (see FIG. 20), a front surface 524, a rear surface 526 (see FIG. 20), a right surface 528 (see FIG. 20), and a left surface 530.

A main power switch 532 is disposed on the front surface 524 of the battery case 510. The main power switch 532 is a switch for switching on/off of the battery unit 500. By the power of the battery unit 500 being switched on, the microcomputer 422 (see FIG. 13) is activated. That is, in the power supply system 2, the main power switch 532 functions as a switch for switching powers of both the battery unit 500 and the power supply device 100.

Figure 20:
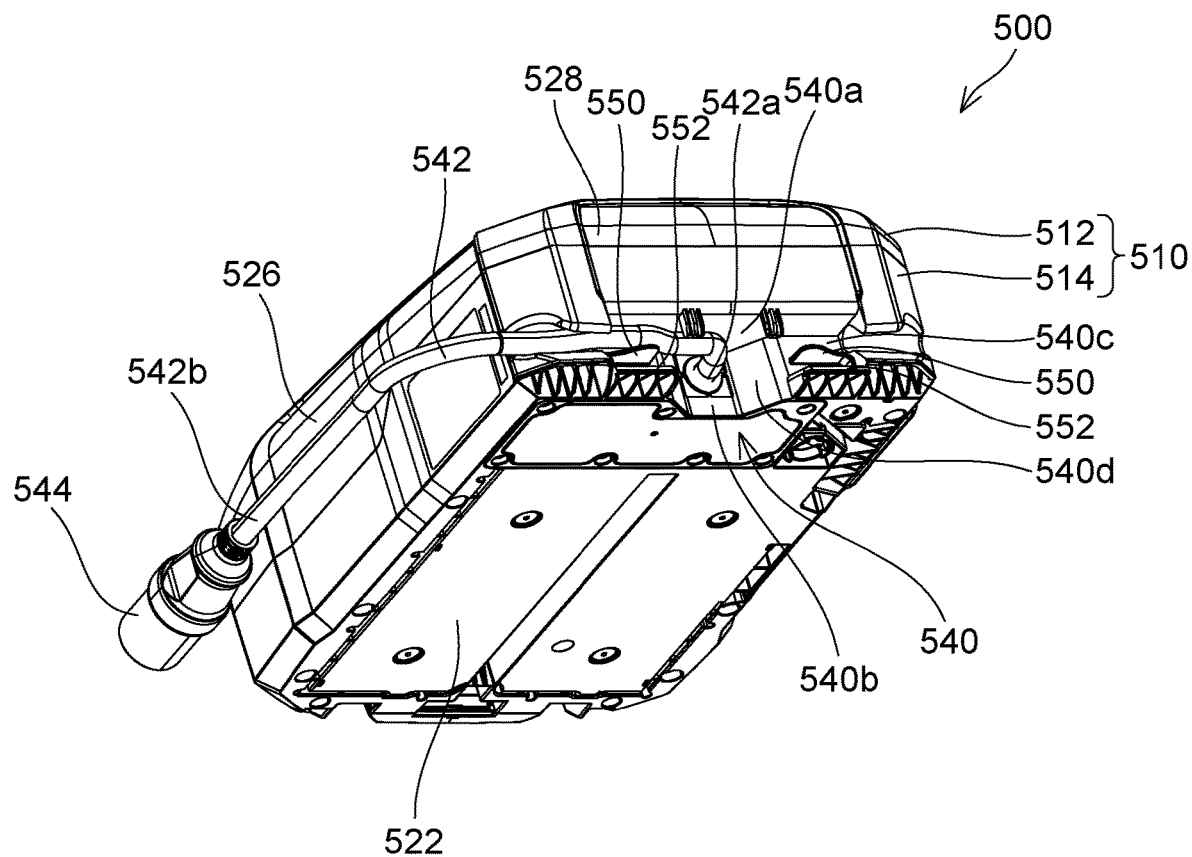
FIG. 20 illustrates a perspective view of the battery unit 500 according to the embodiment from a rear right lower side.
Figure 20:
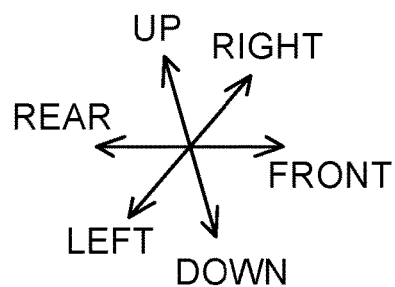

As shown in FIG. 20, a recessed part 540 recessed leftward is defined on a lower portion of the right surface 528. The recessed part 540 comprises an upper surface 540*a*, a first left surface 540*b*, second left surfaces 540*c* disposed both on the front and rear sides of the first left surface S40*b*, and connecting surfaces 540*d* connecting the first left surface 540*b* and the second left surfaces 540*c*. The upper surface 540*a* is along the front-rear direction and the left-right direction, and faces downward. The first left surface 540*b* and the second left surface 540*c* are along the front-rear direction and the up-down direction, and face rightward. The first left surface 540*b* is more on the left side than the second left surfaces 540*c* are. An end 542*a* of a cable 542 is connected to the first left surface 540*b*. The battery-side socket part 544 is connected to another end 542*b* of the cable 542. The recessed part 540 comprises protrusions 550 respectively protruding rightward from the second left surfaces 540*c*, and first engaged mechanisms 552 disposed below the protrusions 550 and projecting rightward from the second left surfaces 540*c*.

As shown in FIG. 1, a protrusion 560 protruding leftward is disposed on the left surface 530 of the battery case 510. The protrusion 560 has a locking mechanism 562 mounted thereto.

Figure 21:
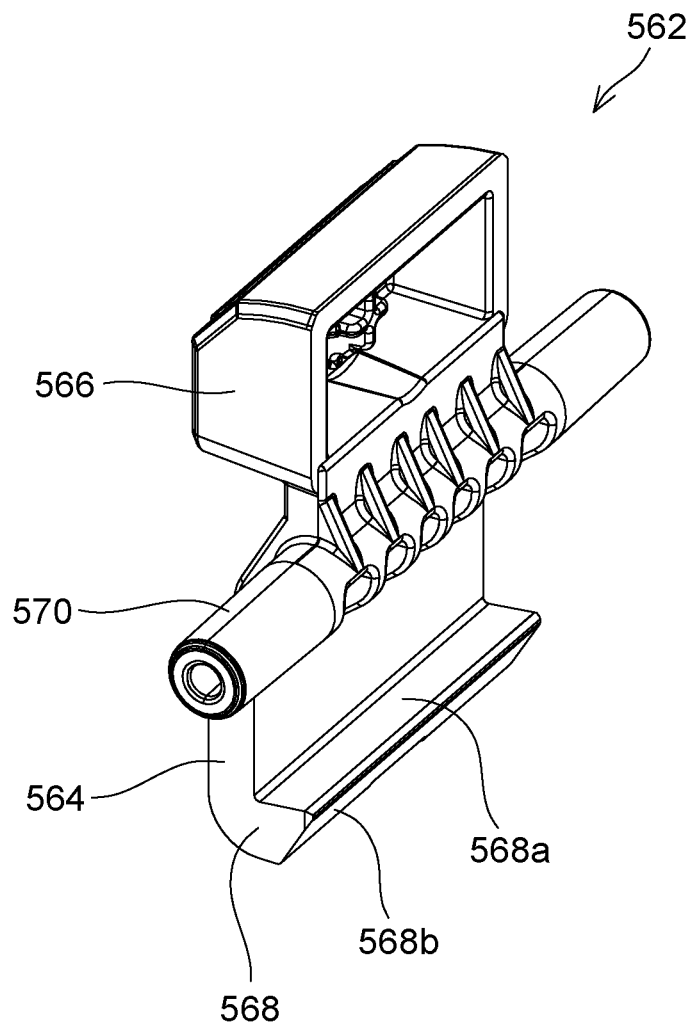
FIG. 21 illustrates a perspective view seeing a locking mechanism 562 according to the embodiment from the rear right upper side.
Figure 21:
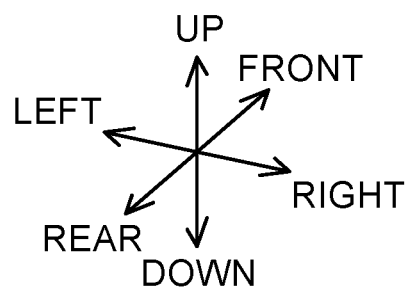

As shown in FIG. 21, the locking mechanism 562 comprises a base portion 564, an operation portion 566, a second engaged mechanism 568, and a rotation axis 570. The base portion 564 extends in the up-down direction. The operation portion 566 is connected to an upper portion of the base portion 564. The second engaged mechanism 568 extends rightward from a lower end of the base portion 564. An upper surface 568*a* of the second engaged mechanism 568 has its left side inclined downward. A lower surface 568*b* of the second engaged mechanism 568 has its left side inclined downward. An inclination angle of the lower surface S68*b* is greater than an inclination angle of the upper surface 568*a*. The rotation axis 570 extends in the front-rear direction. The rotation axis 570 is held by the battery case 510. The locking mechanism 562 is held by the battery case 510 rotatably around the rotation axis 570. The locking mechanism 562 is biased by not-shown torsion springs so that the base portion 564 is parallel to a plane including the up-down direction and the front-rear direction.

(Method of Coupling Power Supply Device 100 and Battery Unit 500)

Figure 22:
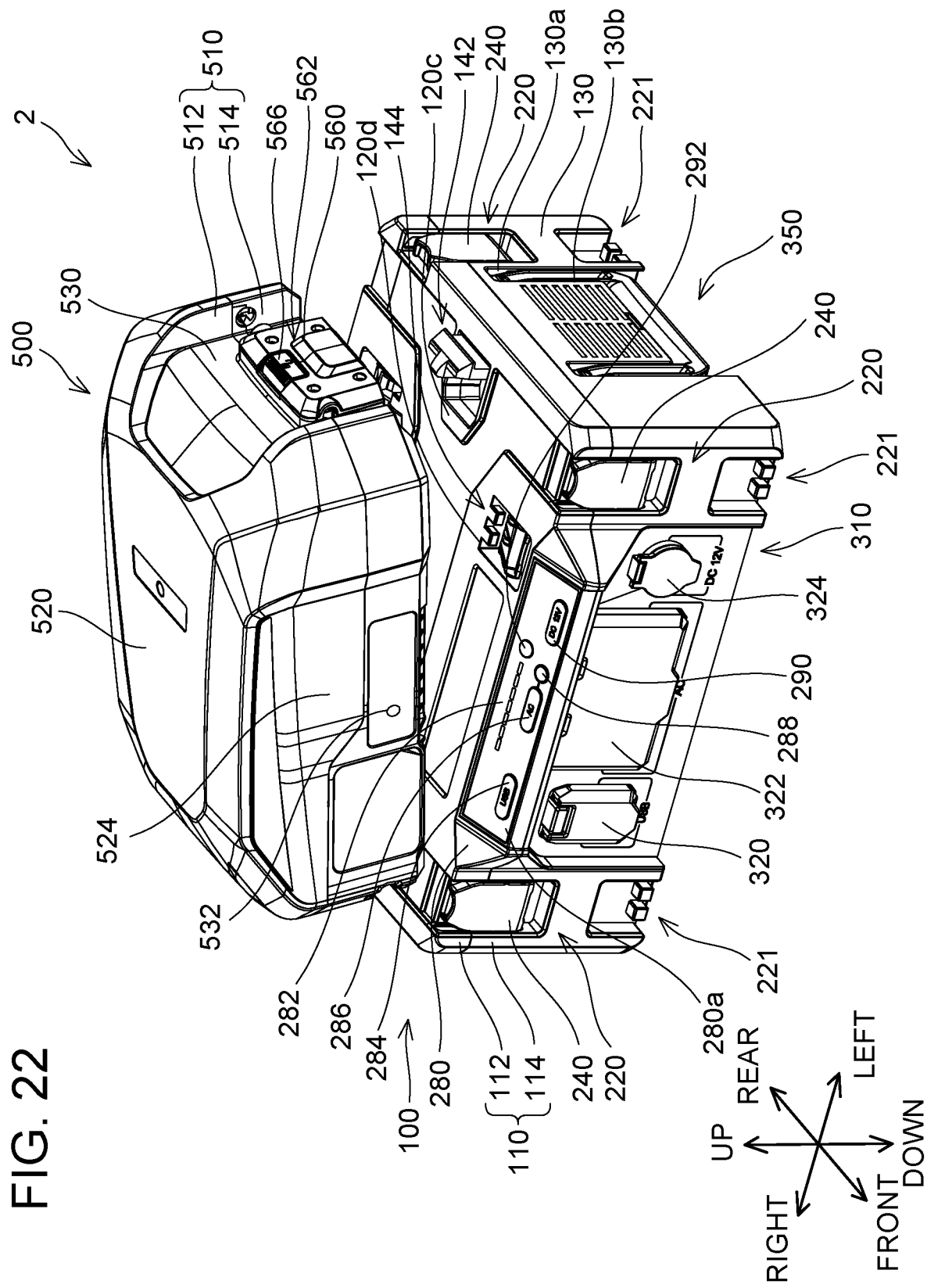
FIG. 22 illustrates a perspective view seeing from the front left upper side a midway state of the battery unit 500 being mounted to the power supply device 100 in the embodiment.
Figure 23:
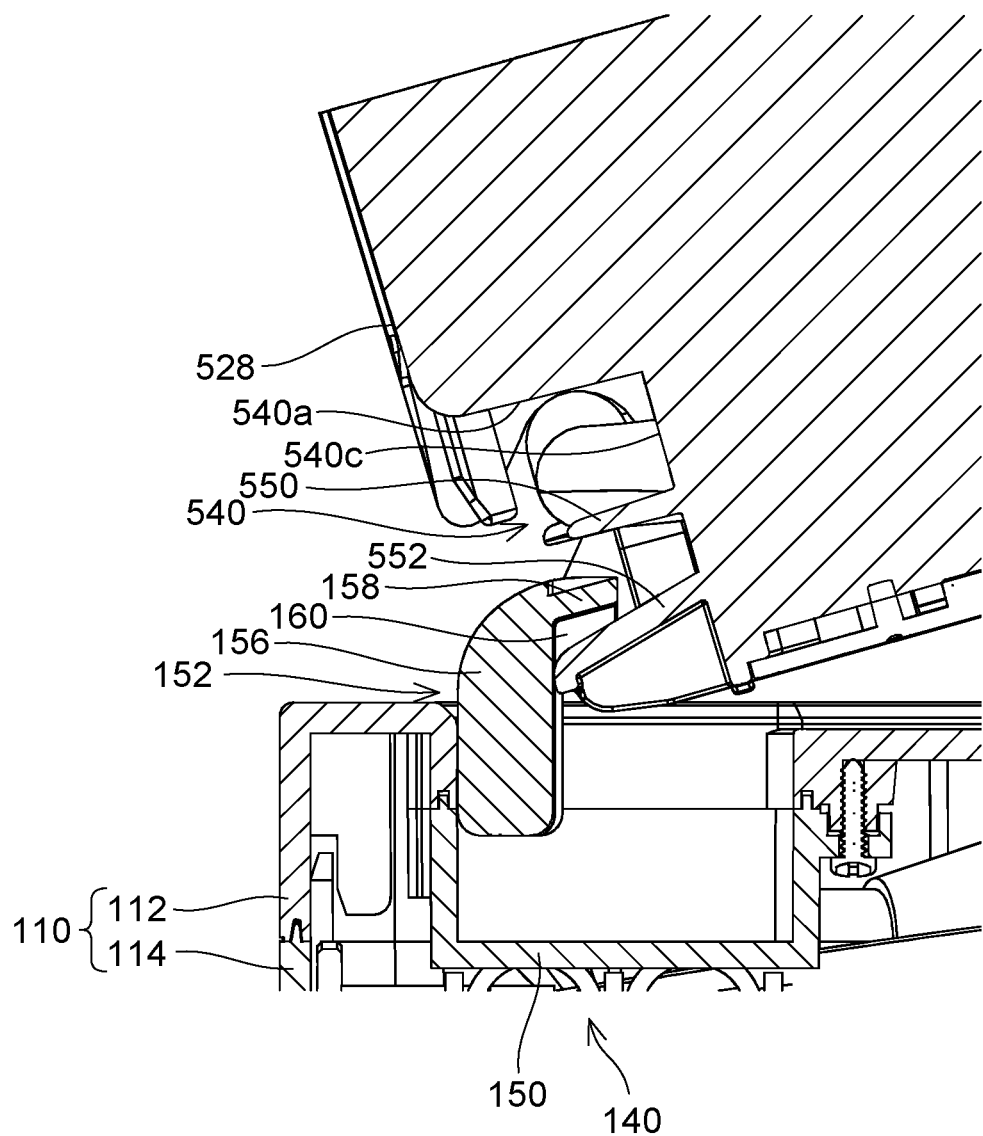
FIG. 23 illustrates a front cross-sectional view in vicinity of the first coupling mechanism 140 in the state of FIG. 22 in the embodiment.
Figure 24:
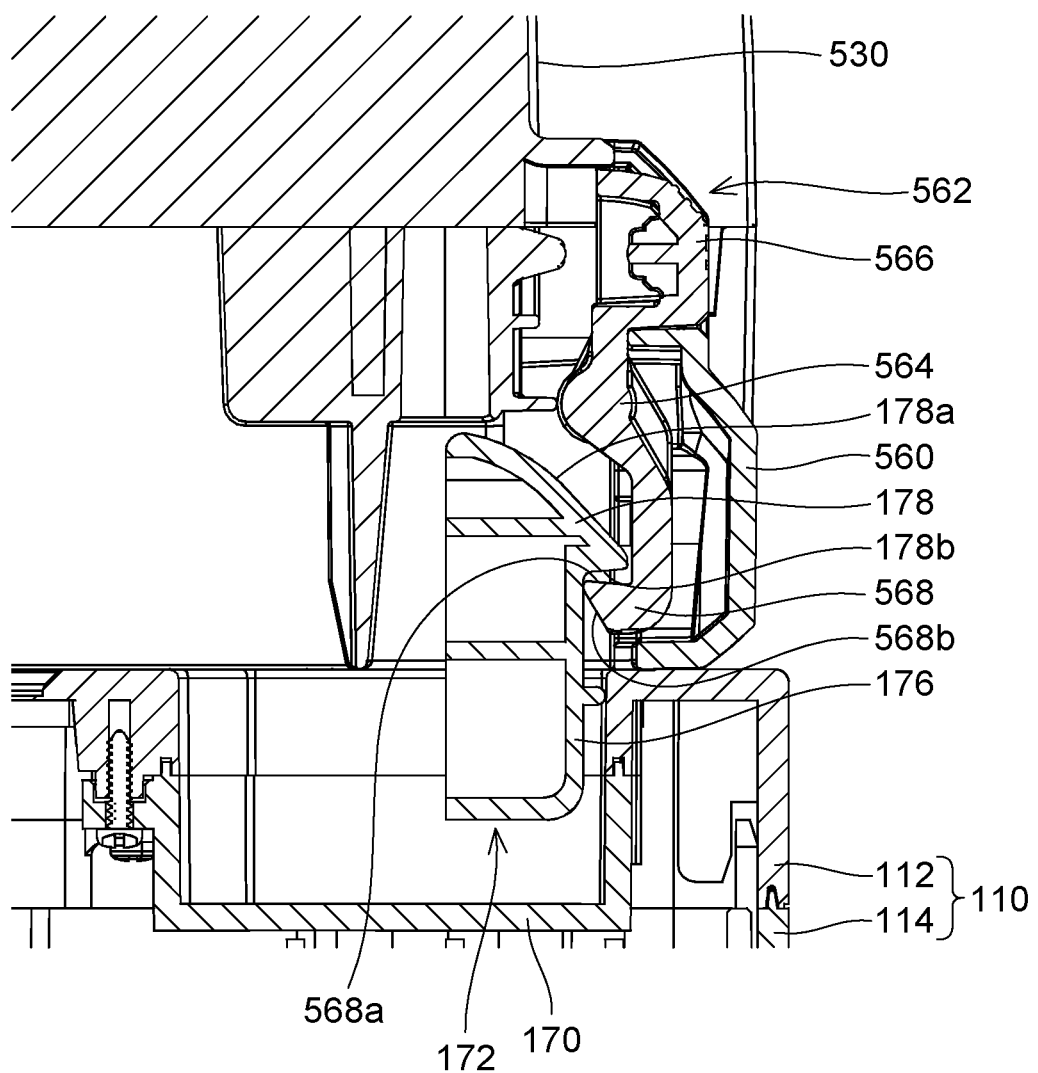
FIG. 24 illustrates a front cross-sectional view in vicinity of the second coupling mechanism 142 in the state of FIG. 1 in the embodiment.
Figure 24:
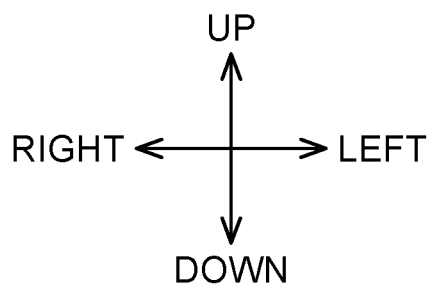
Figure 25:
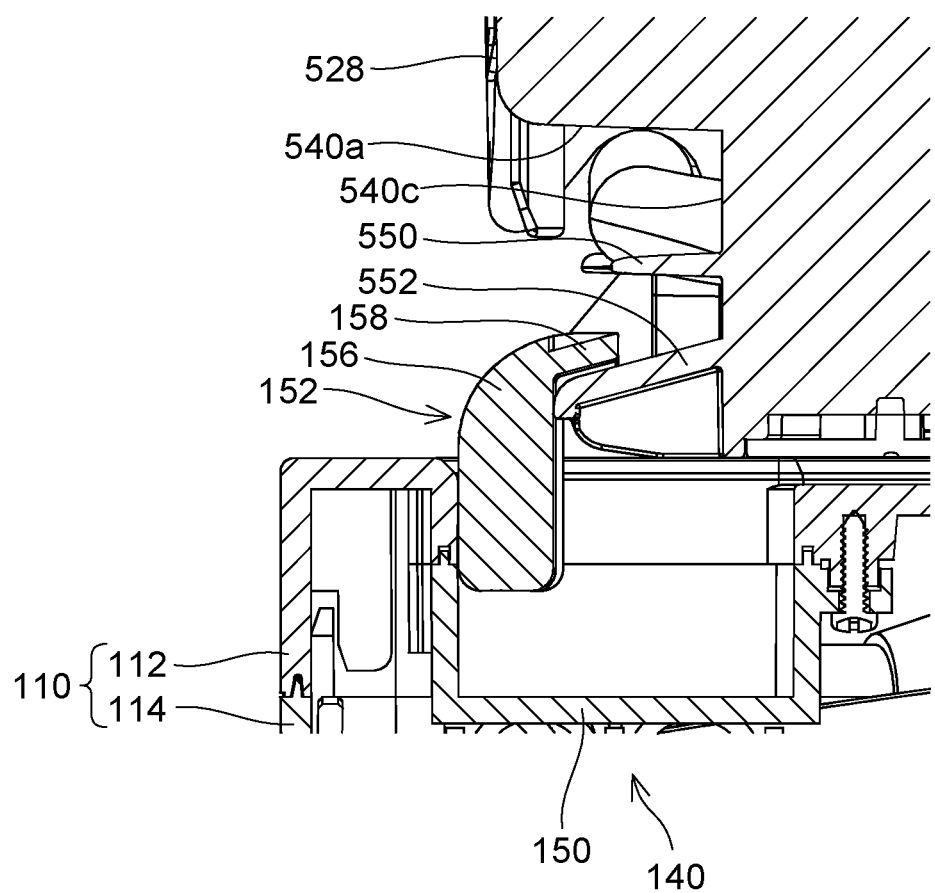
FIG. 25 illustrates a front cross-sectional view in vicinity of the first coupling mechanism 140 in the state of FIG. 1 in the embodiment.
Figure 25:
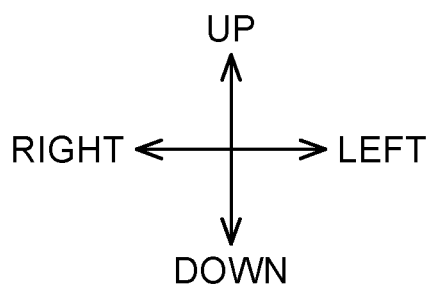

A method of coupling the power supply device 100 and the battery unit 500 will be described. Firstly, the battery unit 500 is tilted to a state where its right side is inclined downward as shown in FIG. 22. Then, the battery unit 500 is moved from left to right with respect to the power supply device 100 until the first engaged mechanisms 552 of the battery unit 500 touch the base portions 156 of the first engaging mechanisms 152 of the power supply device 100 as shown in FIG. 23. Due to this, the first engaged mechanisms 552 of the battery unit 500 come to be located under the first projections 158 of the first engaging mechanisms 152 of the power supply device 100. Thereafter, a left side of the battery unit 500 is pressed down. When the left side of the battery unit 500 has been pressed down, the lower surface S68*b* of the second engaged mechanism 568 of the battery unit 500 in FIG. 24 touches the upper surface 178*a* of the projection 178 of the second engaging mechanism 172 of the power supply device 100. When the battery unit 500 has been further pressed down, the second engaging mechanism 172 of the power supply device 100 is rotated rightward. Then, when the upper surface 568*a* of the second engaged mechanism 568 of the battery unit 500 has moved to a position lower than the projection 178 of the power supply device 100, the second engaging mechanism 172 of the power supply device 100 is rotated leftward by the torsion springs 174 (see FIG. 8). Due to this, the second engaging mechanism 172 of the power supply device 100 engages with the second engaged mechanism 568 of the battery unit 500. Further, as shown in FIG. 25, the first engaged mechanisms 552 of the battery unit 500 come to be placed slightly lower than the first projections 158 of the first engaging mechanisms 152 of the power supply device 100. Due to this, the first engaging mechanisms 152 of the power supply device 100 engage with the first engaged mechanisms 552 of the battery unit 500. Due to this, the power supply device 100 and the battery unit 500 are coupled. Then, as shown in FIG. 17, the battery-side socket part 544 of the battery unit 500 is connected to the device-side socket part 372 of the power supply device 100, by which the power supply device 100 and the battery unit 500 are electrically connected. Further, the user puts the cable 542 of the battery unit 500 in the cable accommodating part 380 of the power supply device 100. Due to this, the user is able to utilize the power supply device 100 and the battery unit 500 as the power supply system 2. Here, in the state where the power supply device 100 and the battery unit 500 are coupled, the third engaging mechanisms 192 (see FIG. 9) of the power supply device 100 are in the accommodated state, that is, they are respectively accommodated in the openings 120d, 120c (see FIG. 3).

As shown in FIG. 14, the user is able to switch the right handle 340 and the left handle 350 from the accommodated state to the non-accommodated state so as to carry the power supply system 2 while holding the right handle 340 and the left handle 350.

(Configuration of Battery Unit 700)

Subsequently, the battery unit 700 in FIG. 2 will be described. As shown in FIG. 2, a shape of the battery unit 700 differs from the shape of the battery unit 500 (see FIG. 1). Further, the battery unit 700 differs from the battery unit 500 (see FIG. 1) in that a plurality of battery packs (not shown) is accommodated within the battery unit 700. In the present embodiment, two battery packs, for example, are accommodated inside the battery unit 700. The battery unit 700 has an output voltage of for example, 36V.

The battery unit 700 comprises a battery case 710. The battery case 710 is divided into an upper case 712 and a lower case 714. The battery case 710 comprises an upper surface 720, a bottom surface 722 (see FIG. 26), a front surface 724, a rear surface 726 (see FIG. 27), a right surface 728 (see FIG. 26), and a left surface 730. A main power switch 732 and a lock operation part 734 are disposed on the front surface 724 of the battery case 710. The main power switch 732 is a switch for switching main power of the battery unit 700. The lock operation part 734 is a member configured to open and close the battery case 710. The user is able to change battery pack(s) (not shown) in the battery case 710 with the battery case 710 being open. A battery-side handle 740 is disposed on a lower portion of the left surface 730 of the battery case 710. The battery-side handle 740 comprises a front support portion 742, a rear support portion 744, and a grip portion 746. The front support portion 742 and the rear support portion 744 extend in the left-right direction. A right end of the front support portion 742 and a right end of the rear support portion 744 are fixed to the battery case 710. The grip portion 746 extends in the front-rear direction, and connects a left end of the front support portion 742 and a left end of the rear support portion 744.

Figure 26:
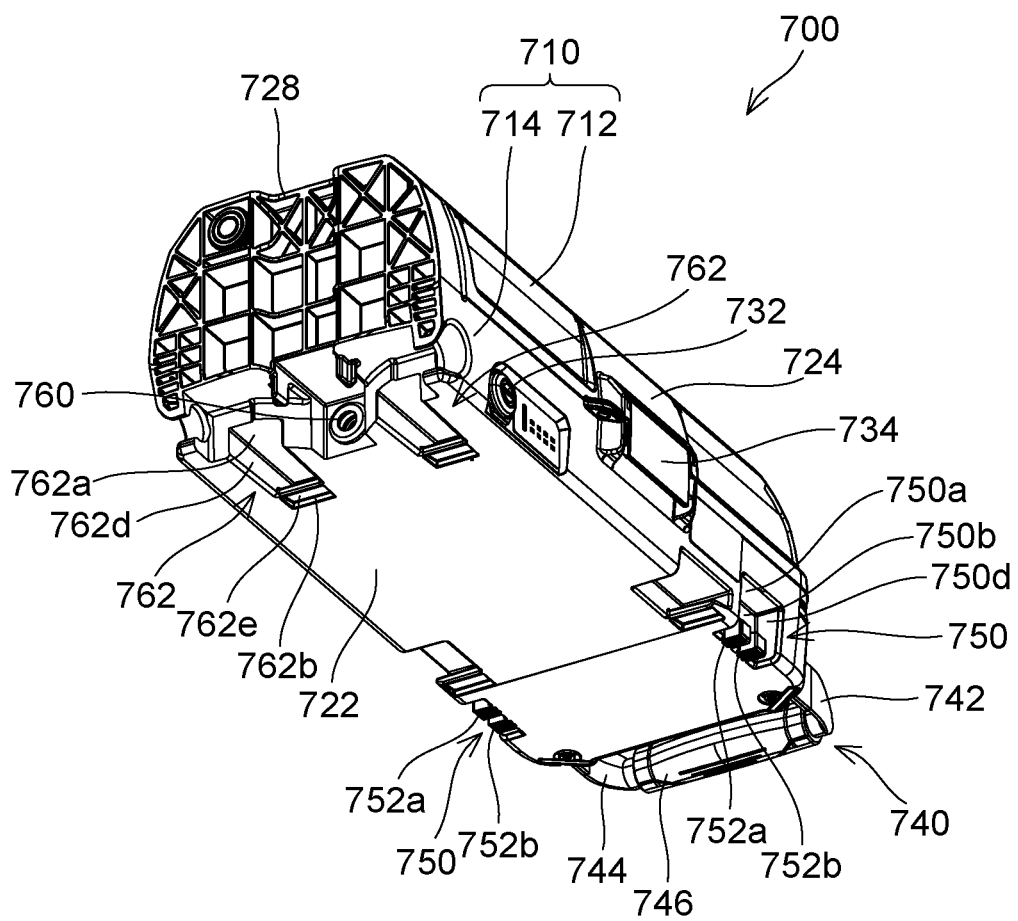
FIG. 26 illustrates a perspective view seeing the battery unit 700 in the embodiment from the front right lower side.

As shown in FIG. 26, third engaged mechanisms 750 are disposed respectively on a lower portion of a left end of the front surface 724 and a lower portion of a left end of the rear surface 726. The third engaged mechanisms 750 are arranged at positions corresponding to the two third coupling mechanisms 144 (see FIG. 3) of the power supply device 100. The third engaged mechanism 750 on the front side and the third engaged mechanism 750 on the rear side are positioned symmetrically in the front-rear direction and have shapes symmetrical in the front-rear direction. The front-side third engaged mechanism 750 has a concave shape of which front portion and lower portion are open. The front-side third engaged mechanism 750 comprises an upper surface 750a, a rear surface 750b, a right surface 750c (see FIG. 2), and a left surface 750d. The upper surface 750a is along the front-rear direction and the left-right direction, and faces downward. The rear surface 750b is along the up-down direction and the left-right direction, and faces frontward. As shown in FIG. 2, the right surface 750c is along the front-rear direction and the up-down direction, and faces leftward. As shown in FIG. 26, the left surface 750d is along the front-rear direction and the up-down direction, and faces rightward. Two projections 752a, 752b protruding frontward are disposed on the rear surface 750b. The projection 752a and the projection 752b are aligned side by side in the left-right direction.

Figure 27:
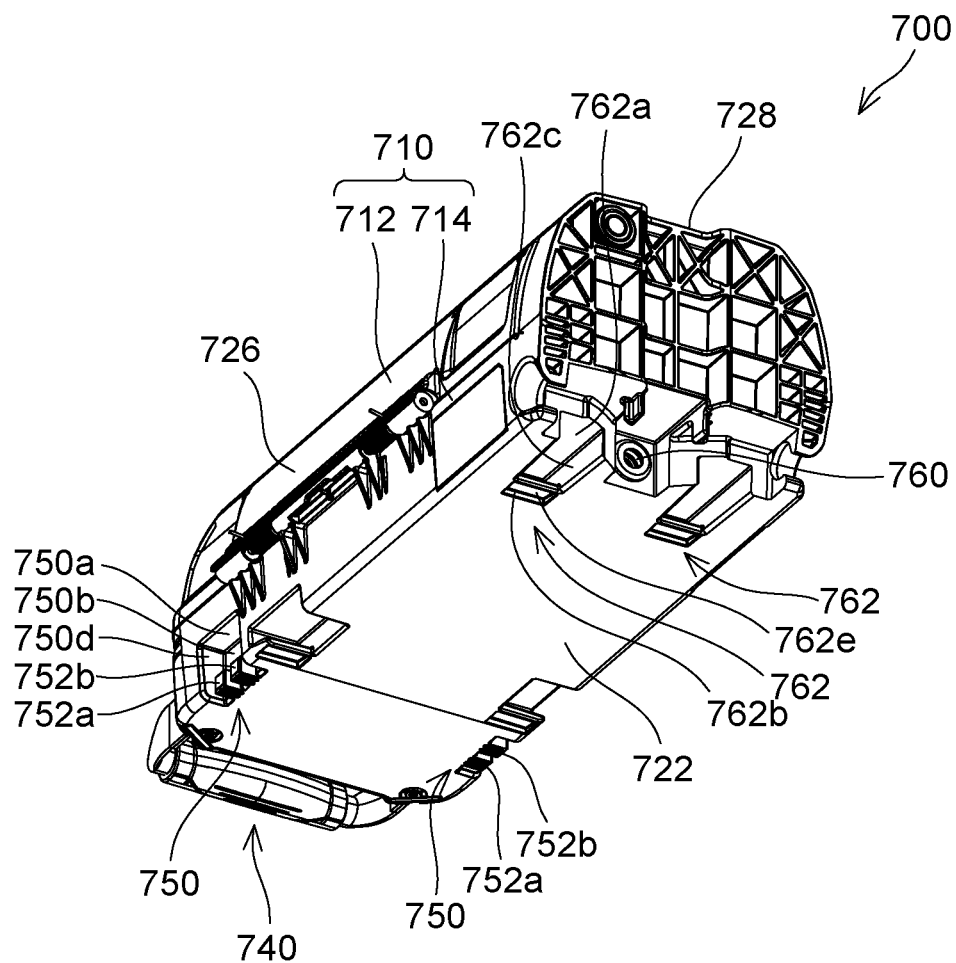
FIG. 27 illustrates a perspective view seeing the battery unit 700 according to the embodiment from the rear right lower side.
Figure 27:
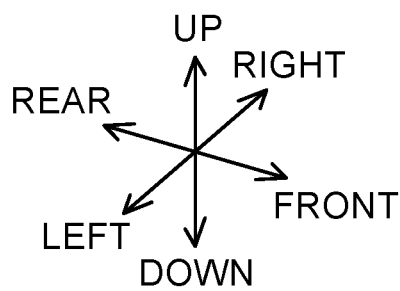

A cable connection part 760 and two first engaged mechanisms 762 are disposed on a lower portion of the right surface 728 of the battery case 710. The cable connection part 760 is more on the left side than the right surface 728 is. The two first engaged mechanisms 762 are on opposing front-rear directional sides of the cable connection part 760. The two first engaged mechanisms 762 are arranged at positions corresponding to the two first coupling mechanisms 140 (see FIG. 3) of the power supply device 100. The first engaged mechanism 762 on the front side and the first engaged mechanism 762 on the rear side have a same shape. The rear-side first engaged mechanism 762 has a concave shape of which lower portion and right portion are open. Each first engaged mechanism 762 comprises an upper surface 762a, a left surface 762b, a front surface 762c (see FIG. 27), and a rear surface 762d. The upper surface 762a is along the front-rear direction and the left-right direction, and faces downward. The left surface 762b is along the front-rear direction and the up-down direction, and faces rightward. As shown in FIG. 27, the front surface 762c is along the up-down direction and the left-right direction, and faces rearward. As shown in FIG. 26, the rear surface 762d is along the up-down direction and the left-right direction, and faces frontward. Each first engaged mechanism 762 further comprises an extension portion 762e extending rightward from a lower end of the left surface 762b. The extension portion 762e has its right side inclined downward. The extension portion 762e connects the front surface 762c (see FIG. 27) and the rear surface 762d.

(Coupling Method of Power Supply Device 100 and Battery Unit 700)

Figure 28:
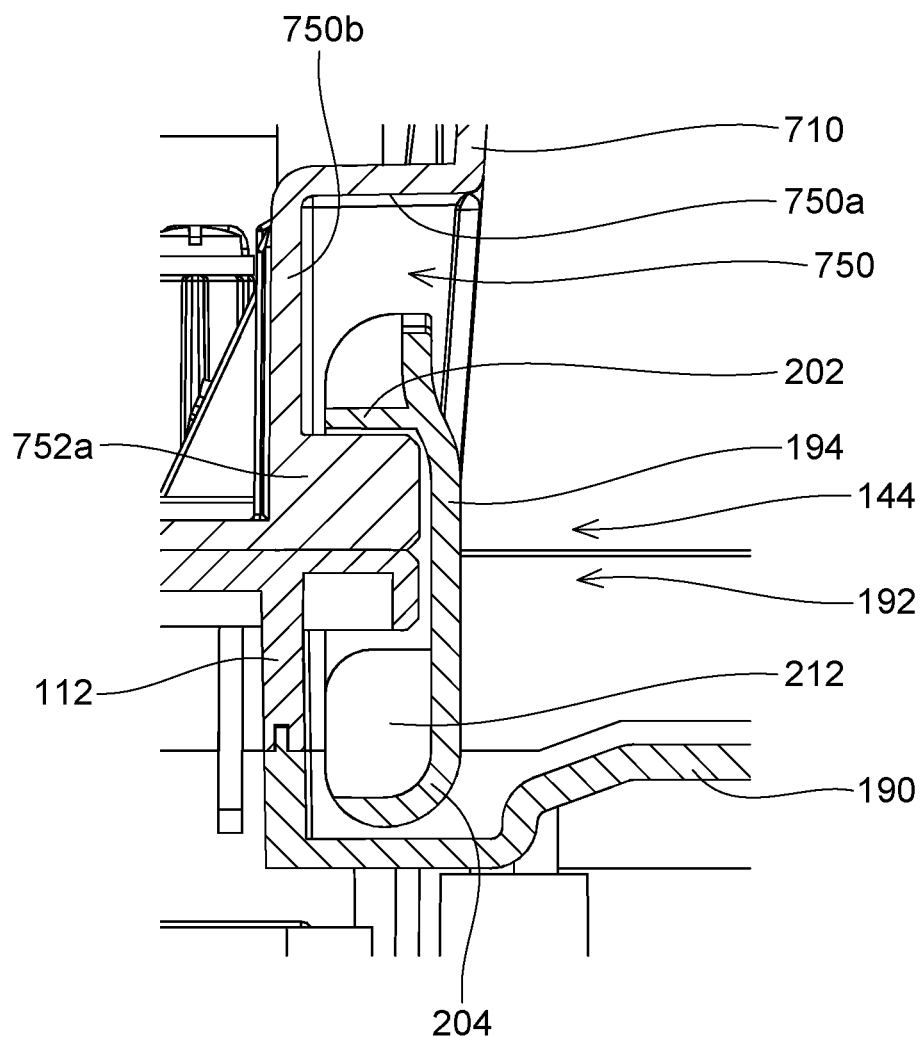
FIG. 28 illustrates a front cross-sectional view in vicinity of the first coupling mechanism 140 in the state of FIG. 2 in the embodiment.
Figure 29:
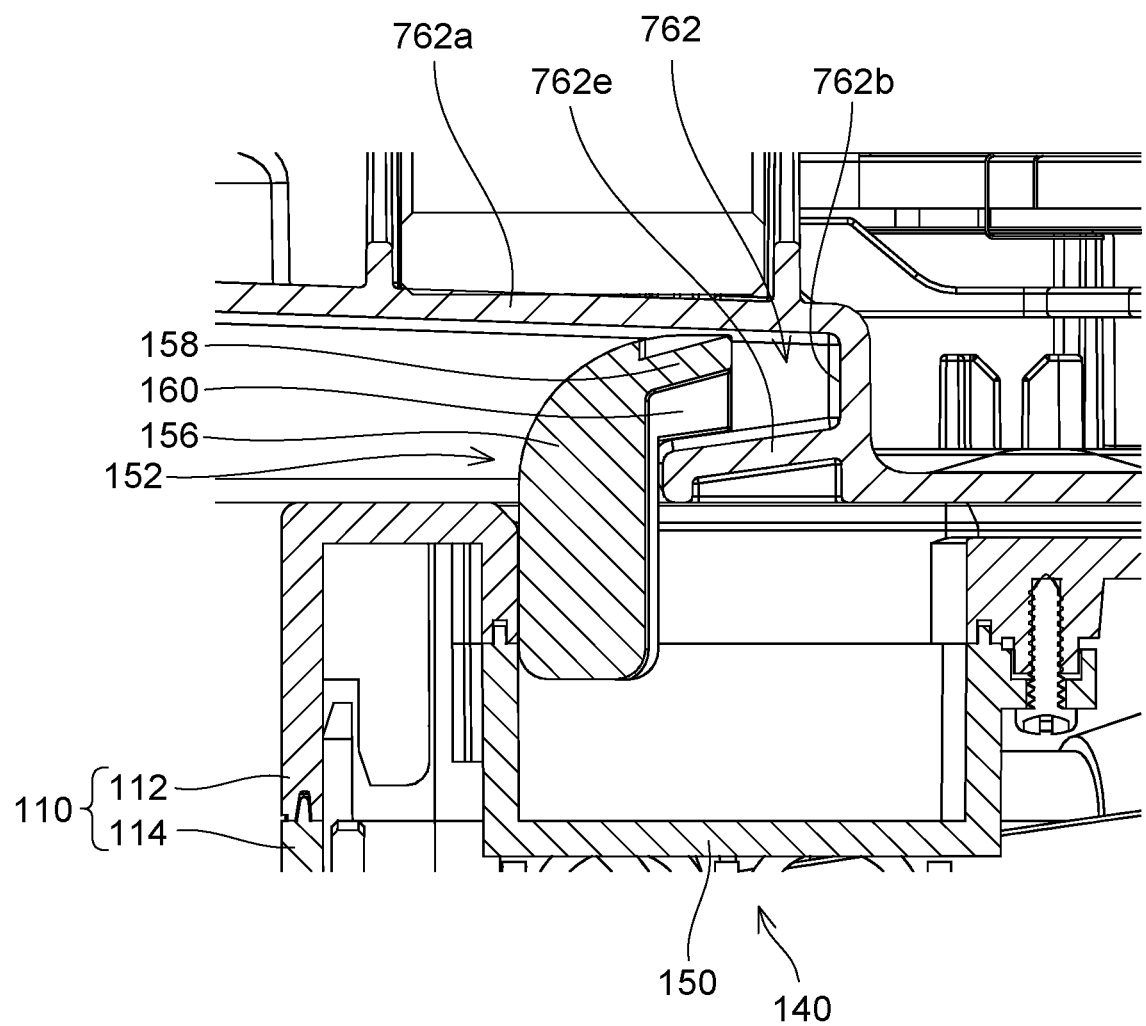
FIG. 29 illustrates a left cross-sectional view in vicinity of a third coupling mechanism 144 in the state of FIG. 2 in the embodiment.

Subsequently, a method of coupling the power supply device 100 and the battery unit 700 in FIG. 2 will be described. Firstly, similarly to the case of the battery unit 500 (see FIG. 22), the battery unit 700 is tilted to a state where its right side is inclined downward. Then, the battery unit 700 is moved from left to right with respect to the power supply device 100 until the extension portions 762e (see FIG. 26) of the first engaged mechanisms 762 of the battery unit 700 touch the base portions 156 of the first engaging mechanisms 152 of the power supply device 100. Thereafter, a left side of the battery unit 700 is pressed down and thus the battery unit 700 is placed on the power supply device 100. Due to this, the third engaged mechanisms 750 (see FIG. 26) of the battery unit 700 are positioned in vicinity of the third coupling mechanisms 144 (see FIG. 3) of the power supply device 100. Then the user lifts up the third engaging mechanisms 192 in FIG. 28 of the power supply device 100 to engage the third engaging mechanisms 192 of the power supply device 100 and the third engaged mechanisms 750 of the battery unit 700. In this case, the upper case 112 of the power supply device 100 as well as the projections 752a, 752b (see FIG. 26) of the third engaged mechanisms 750 of the battery unit 700 come to be placed between the upper plate portions 202 and the projecting plate portions 212, 214 (see FIG. 9) of the third engaging mechanisms 192 of the power supply device 100. Further, the engaging convex portions 196a, 198a (see FIG. 9) of the third engaging mechanisms 192 of the power supply device 100 are respectively pressed against the right surface 750c (see FIG. 2) and the left surface 750d (see FIG. 26) of the corresponding third engaged mechanism 750 of the battery unit 700. Due to this, the third engaging mechanisms 192 of the power supply device 100 engage with the third engaged mechanisms 750 of the battery unit 700. Further, as shown in FIG. 29, the extension portions 762e of the first engaged mechanisms 762 of the battery unit 700 come to be placed slightly lower than the second projections 160 of the first engaging mechanisms 152 of the power supply device 100. Due to this, the first engaging mechanisms 152 of the power supply device 100 engage with the first engaged mechanisms 762 of the battery unit 700. Due to this, the power supply device 100 and the battery unit 700 are coupled. Here, with the power supply device 100 and the battery unit 700 coupled as shown in FIG. 2, the second engaging mechanism 172 of the power supply device 100 is in the non-accommodated state, and arranged between the left surface 730 and the grip portion 746 of the battery-side handle 740 of the battery unit 700. Then, the battery-side socket part (not shown) of the battery unit 700 is connected to the device-side socket part 372 (see FIG. 17) of the power supply device 100, by which the power supply device 100 and the battery unit 700 are electrically connected.

Figure 30:
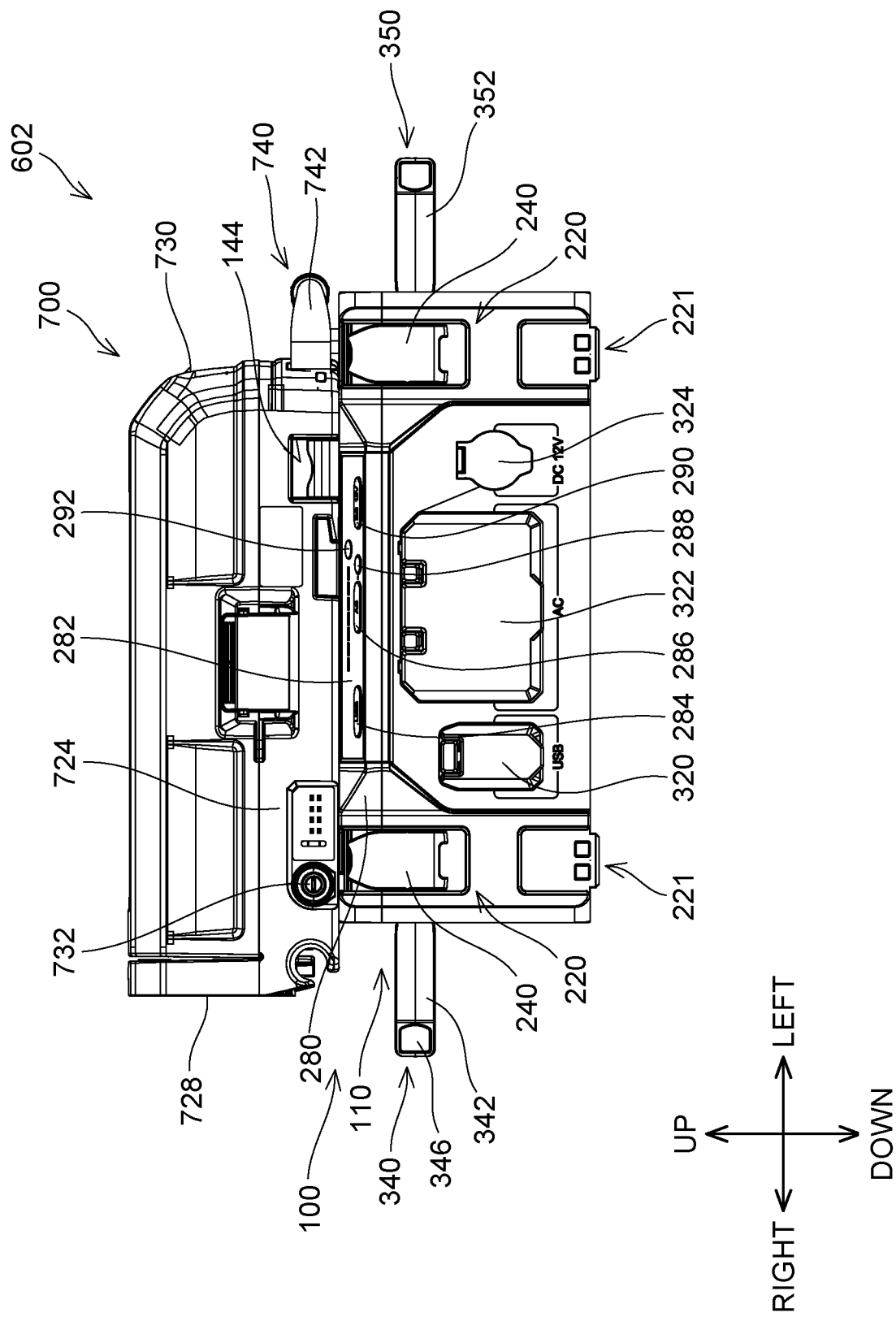
FIG. 30 illustrates a front view seeing from front the power supply system 2 with the right handle 340 and the left handle 350 in the non-accommodated state in the embodiment.

As shown in FIG. 30, the user is able to switch the right handle 340 and the left handle 350 from the accommodated state to the non-accommodated state so as to carry the power supply system 2 while holding the right handle 340 and the left handle 350. The right surface 728 of the battery unit 700 protrudes more rightward than the right surface 128 of the power supply device 100 does. In the present embodiment, the grip portion 346 of the right handle 340 in the non-accommodated state is positioned more on the right side than the right surface 728 of the battery unit 700 is. If the grip portion 346 of the right handle 340 in the non-accommodated state is positioned more on the left side than the right surface 728 of the battery unit 700 is, then the grip portion 346 would be below the battery unit 700. In this case, it becomes difficult for the user to hold the grip portion 346. According to the above configuration, the user is able to grasp the grip portion 346 more easily.

(Other Usages of Power Supply Device 100)

Figure 31:
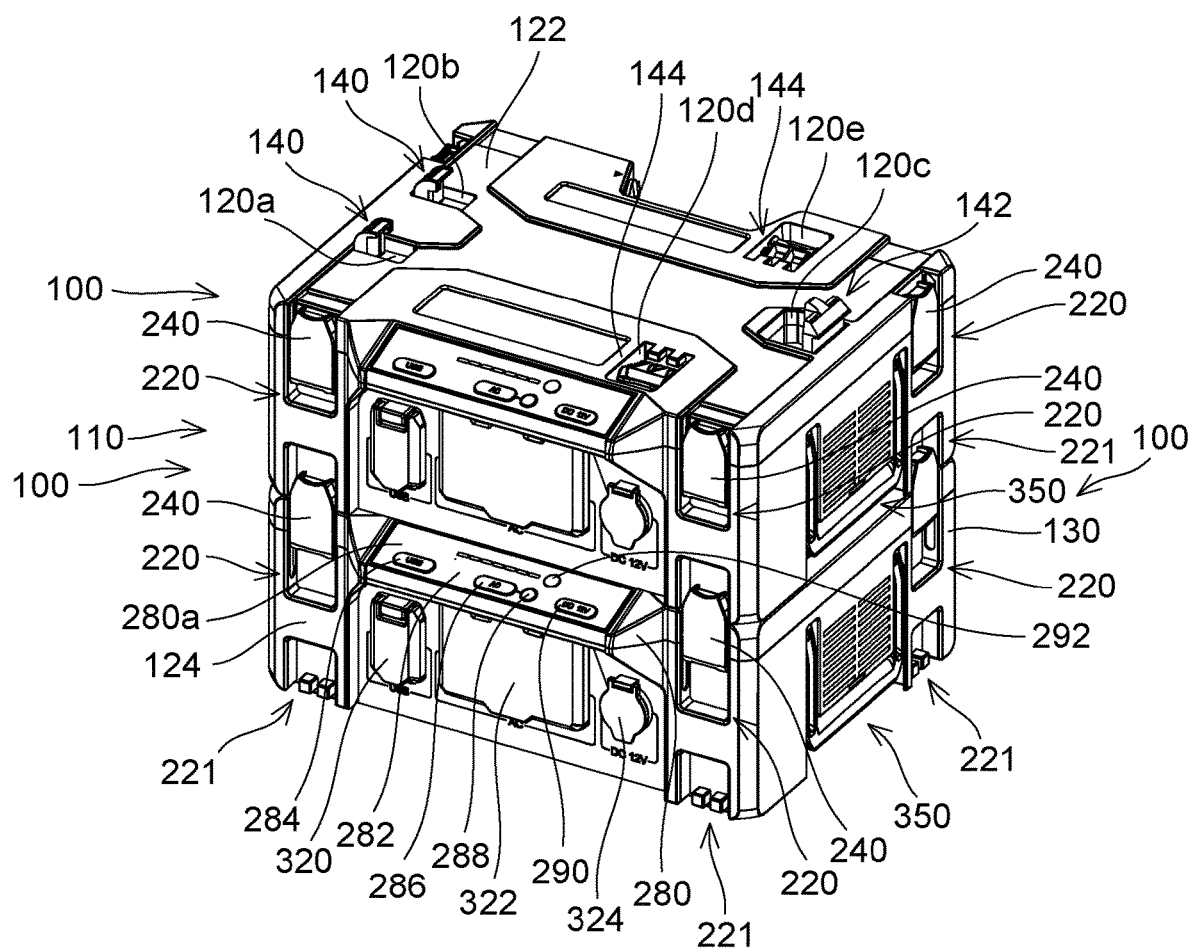
FIG. 31 illustrates a perspective view seeing two power supply devices 100 coupled to one another in an up-down direction from the front left upper side in the embodiment.
Figure 31:
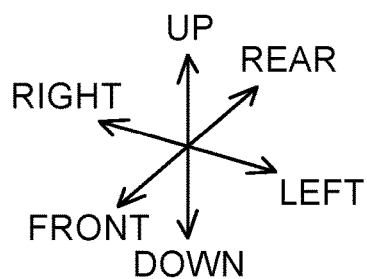
Figure 32:
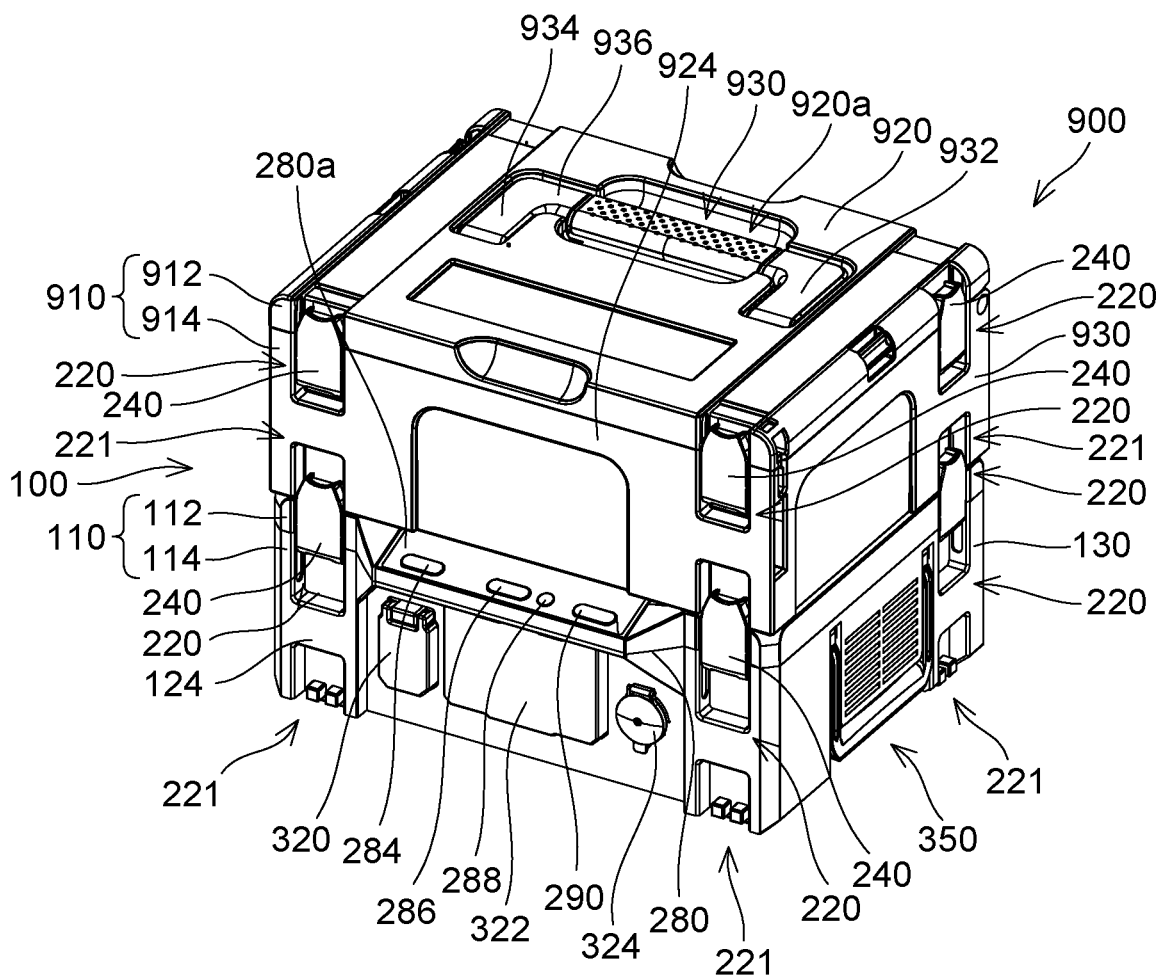
FIG. 32 illustrates a perspective view seeing the power supply device 100 and a tool box 900 that are coupled to one another in the up-down direction from the front left upper side in the embodiment.

Although in the examples shown in FIGS. 1 and 2, the configurations in which the battery unit 500, 700 is placed on the upper surface 120 of the power supply device 100 were described, another power supply device 100 in FIG. 31 or a tool box 900 in FIG. 32 can be placed on the upper surface 120 of the power supply device 100 in the present embodiment. The power supply device 100 can be placed on a trolley 1000 of FIG. 33 or on a cart 1200 of FIG. 34. Hereafter, other usages for the power supply device 100 will be described.

(Coupling of Two Power Supply Devices 100 in Up-Down Direction)

Figure 35:
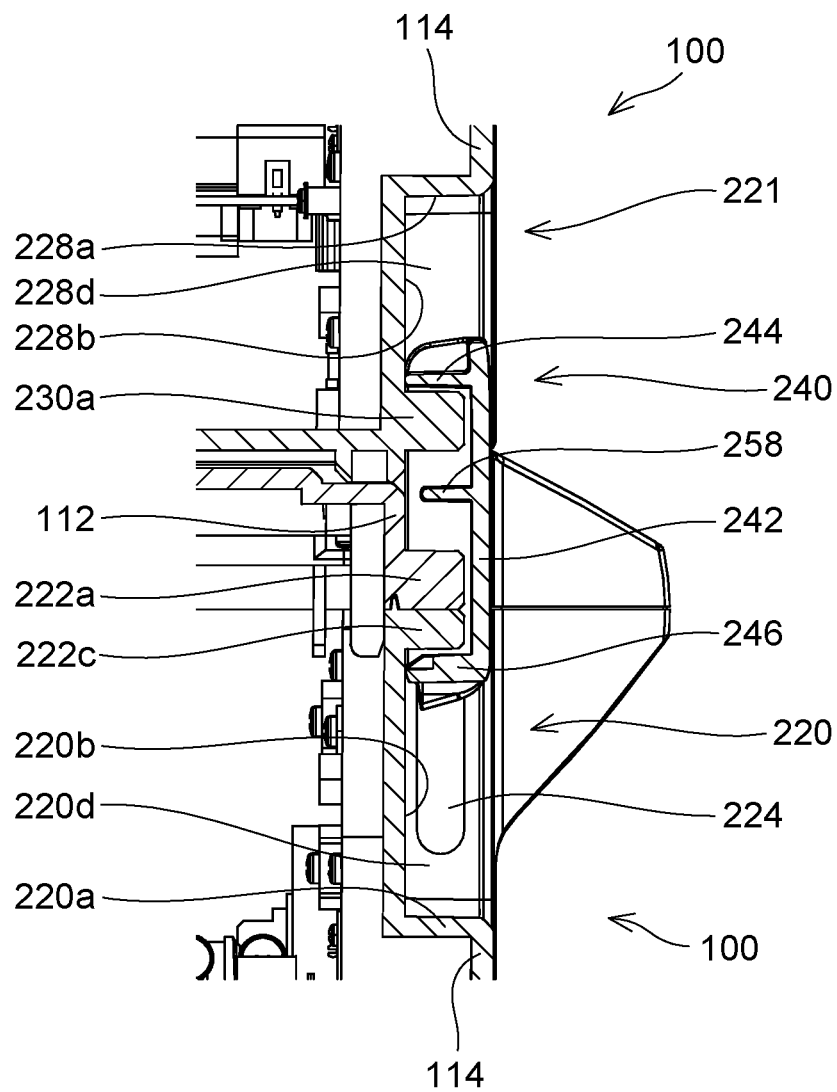
FIG. 35 illustrates a right cross-sectional view in vicinity of the fourth engaging mechanism 240 in FIG. 31.
Figure 35:
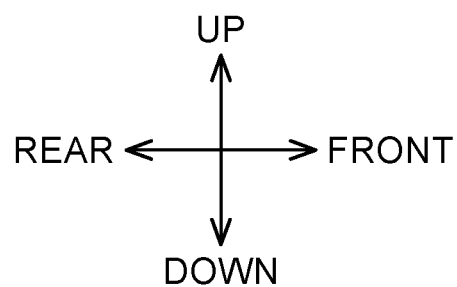

In FIG. 31, two power supply devices 100 are stacked on each other in the up-down direction. A sequence of coupling the two power supply devices 100 will be described. Firstly, the user places the above power supply device 100 on the below power supply device 100 so that the four recessed parts 121a to 121d of the upper surface 120 of the below power supply device 100 are positioned below the four protrusions 122a to 122d (see FIG. 4) of the bottom surface 122 of the above power supply device 100. Due to this, the four fourth engaging mechanisms 240 of the above power supply device 100 are positioned below the four lower coupling parts 221 of the above power supply device 100. Then the user pulls frontward out the upper portion of the fourth engaging mechanism 240 disposed on the right end of the front surface 124 of the below power supply device 100 and then lifts up the fourth engaging mechanism 240. Thereafter, the user pushes rearward the upper portion of the fourth engaging mechanism 240. Due to this, as shown in FIG. 35, the projections 230a, 230b (see FIG. 3) of the above power supply device 100 are positioned below the upper plate portion 244 of the fourth engaging mechanism 240, the projections 222a to 222d (see FIG. 10) of the below power supply device 100 are positioned above the bottom plate portion 246 of the fourth engaging mechanism 240. Further, the right convex portion 262 (see FIG. 12) of the fourth engaging mechanism 240 elastically deforms leftward and the left convex portion 264 (see FIG. 12) elastically deforms rightward. Due to this, the fourth engaging mechanism 240 of the power supply device 100 engages with the lower coupling part 221 of the above power supply device 100. Thereafter, the user performs the same actions for the fourth engaging mechanism 240 disposed on the left side of the front surface 124 of the below power supply device 100, the fourth engaging mechanism 240 disposed on the right surface 128 of the below power supply device 100, and the fourth engaging mechanism 240 disposed on the left surface 130 of the below power supply device 100. Due to this, the below power supply device 100 and the above power supply device 100 are coupled. According to the above configuration, the two power supply devices 100 can be carried in the state where the two power supply devices 100 are aligned in the up-down direction. Further, accommodation space can be effectively utilized as the two power supply devices 100 can be accommodated in the aligned state in the up-down direction. Here, when the two power supply devices 100 are coupled in the up-down direction, the first engaging mechanisms 152 (see FIG. 6), the second engaging mechanism 172 (see FIG. 8), and the third engaging mechanisms 192 (see FIG. 9) of the below power supply device 100 are respectively in the accommodated state.

(Placing Tool Box 900 on Power Supply Device 100)

Figure 36:
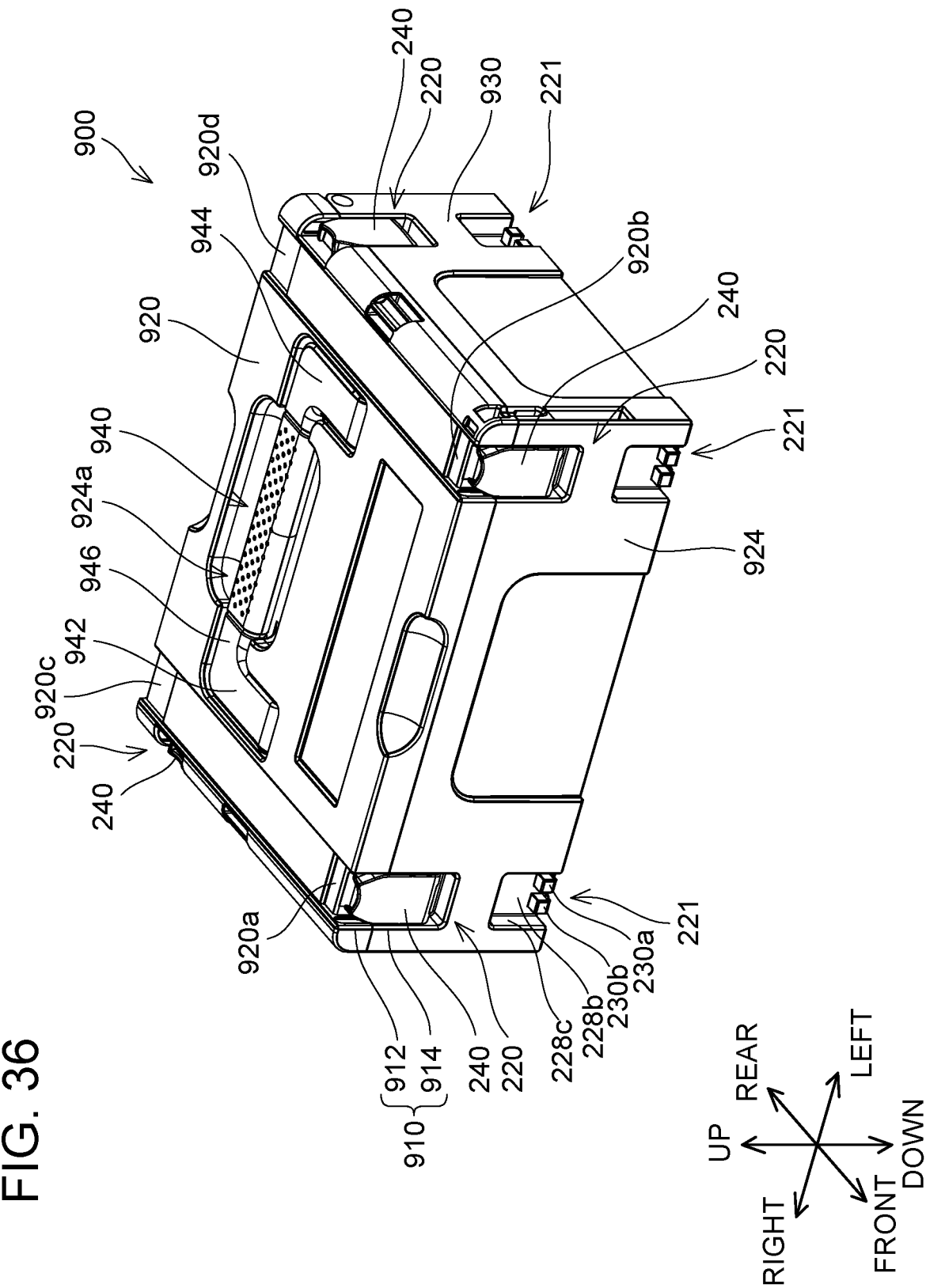
FIG. 36 illustrates the tool box 900 according to the embodiment from the front left upper side.
Figure 37:
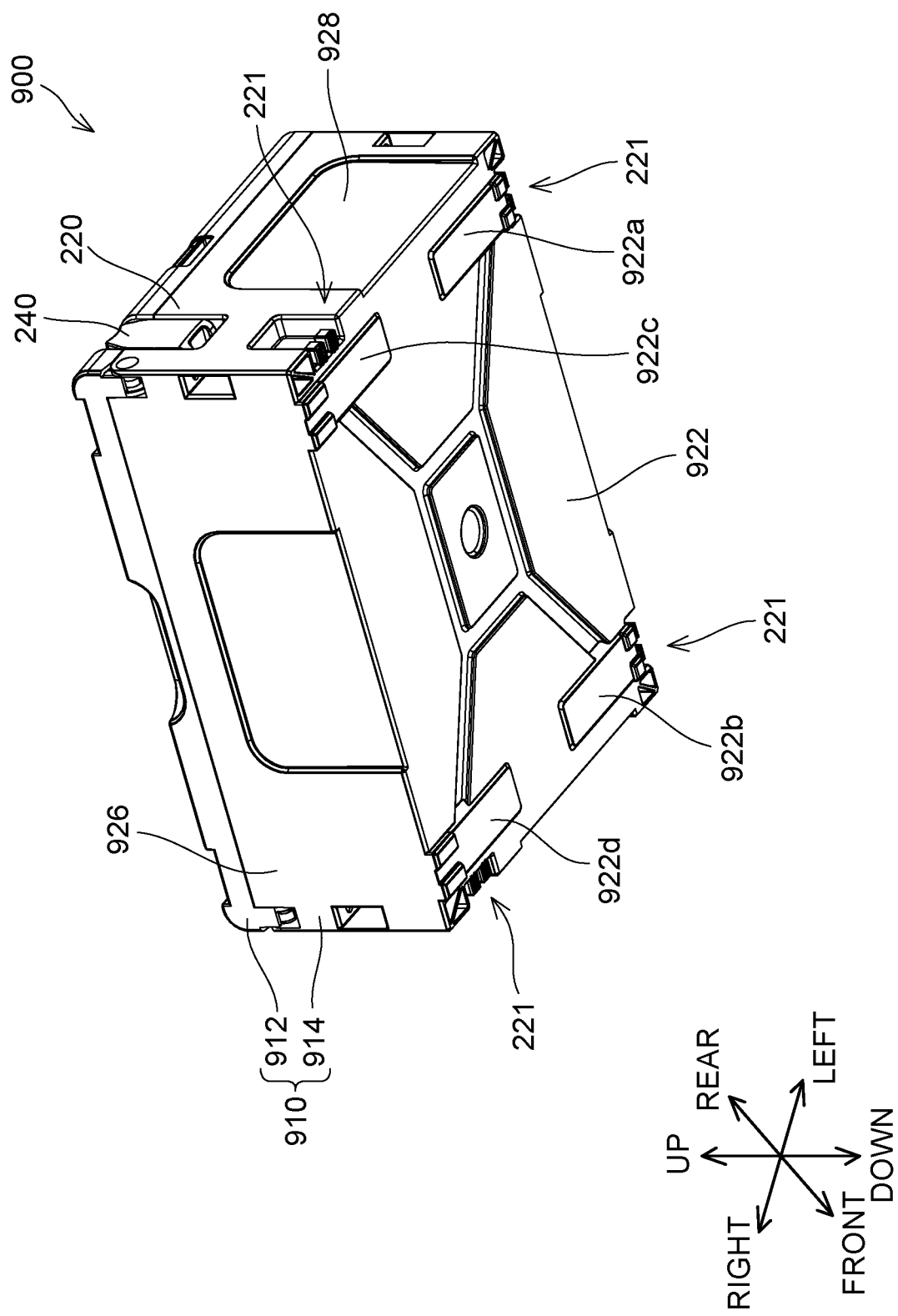
FIG. 37 illustrates the tool box 900 according to the embodiment from the rear right lower side.

In FIG. 32, the tool box 900 is placed on the power supply device 100. Power tools or the like are accommodated in the tool box 900. The tool box 900 comprises a tool case 910 having an upper case 912 and a lower case 914. The upper case 912 is detachably attached to the lower case 914. As shown in FIG. 36, the tool case 910 comprises an upper surface 920, a bottom surface 922 (see FIG. 37), a front surface 924, a rear surface 926 (see FIG. 37), a right surface 928 (see FIG. 37), and a left surface 930. Four recessed parts 921a to 921d recessed downward are disposed at four corners of the upper surface 920. A handle accommodating part 920a is disposed on the upper surface 920. The handle accommodating part 920a is recessed downward. A handle 940 is accommodated in the handle accommodating part 920a. The handle 940 comprises a right support portion 942, a left support portion 944, and a grip portion 946. The right support portion 942 and the left support portion 944 extend in the front-rear direction. A front end of the right support portion 942 and a front end of the left support portion 944 are attached to the tool case 910 rotatably around a rotation axis (not shown) extending through the tool case 910 in the left-right direction. The grip portion 946 extends in the left-right direction, and connects a rear end of the right support portion 942 and a rear end of the left support portion 944. The handle accommodating part 920a has a shape corresponding to the handle 940. The four upper coupling parts 220 are respectively disposed at left-right directional opposing ends of an upper portion of the front surface 924, at an upper portion of the right surface 928, and at an upper portion of the left surface 930 of the tool case 910. Four fourth engaging mechanisms 240 are respectively attached to the four upper coupling parts 220. Further, four lower coupling parts 221 are disposed at left-right directional opposing ends of a lower portion of the front surface 924, at a lower portion of the right surface 928 (see FIG. 37), and at a lower portion of the left surface 930 of the tool case 910. The four fourth engaging mechanisms 240 couple the upper case 912 and the lower case 914. The user is able to detach the lower case 914 from the upper case 912 by operating the four fourth engaging mechanisms 240. As shown in FIG. 37, four protrusions 922a to 922d protruding downward are disposed at four corners of the bottom surface 922. The four protrusions 922a to 922d are respectively below the four recessed parts 921a to 921d of the upper surface 920. The four protrusions 922a to 922d have shapes corresponding respectively to the four recessed parts 921a to 921d of the upper surface 920.

A sequence of coupling the power supply device 100 and the tool box 900 is similar to the sequence of coupling the two power supply devices 100 in the up-down direction in that both methods include operations of the four fourth engaging mechanisms 240 of the power supply device 100. Firstly, the user places the tool box 900 on the power supply device 100 so that the four recessed parts 121a to 121d of the upper surface 120 of the power supply device 100 are positioned below the four protrusions 922a to 922d (see FIG. 37) of the bottom surface 922 of the tool box 900. Due to this, the four fourth engaging mechanisms 240 of the power supply device 100 are positioned below the lower coupling parts 221 of the tool box 900. Subsequent operations by the user to the fourth engaging mechanisms 240 are the same as that in the above-mentioned sequence of coupling the two power supply devices 100 in the ap-down direction. Due to this, the four fourth engaging mechanisms 240 of the power supply device 100 engage with the four lower coupling parts 221 of the tool box 900, by which the power supply device 100 and the tool box 900 are coupled. According to the above configuration, the power supply device 100 and the tool box 900 can be carried in the state where the power supply device 100 and the tool box 900 are aligned in the up-down direction. Further, accommodation space can be effectively utilized as the power supply device 100 and the tool box 900 can be accommodated in the aligned state in the up-down direction. Although in the present embodiment the tool box 900 is placed on the power supply device 100, the power supply device 100 may be placed on the tool box 900. In this case, the four fourth engaging mechanisms 240 of the tool box 900 engage with the four lower coupling parts 221 of the power supply device 100. Here, in the case where the power supply device 100 and the tool box 900 are coupled, the first engaging mechanisms 152 (see FIG. 6), the second engaging mechanism 172 (see FIG. 8), and the third engaging mechanisms 192 (see FIG. 9) of the power supply device 100 are in the accommodated state.

(Placing Power Supply Device 100 on Trolley 1000)

Figure 33:
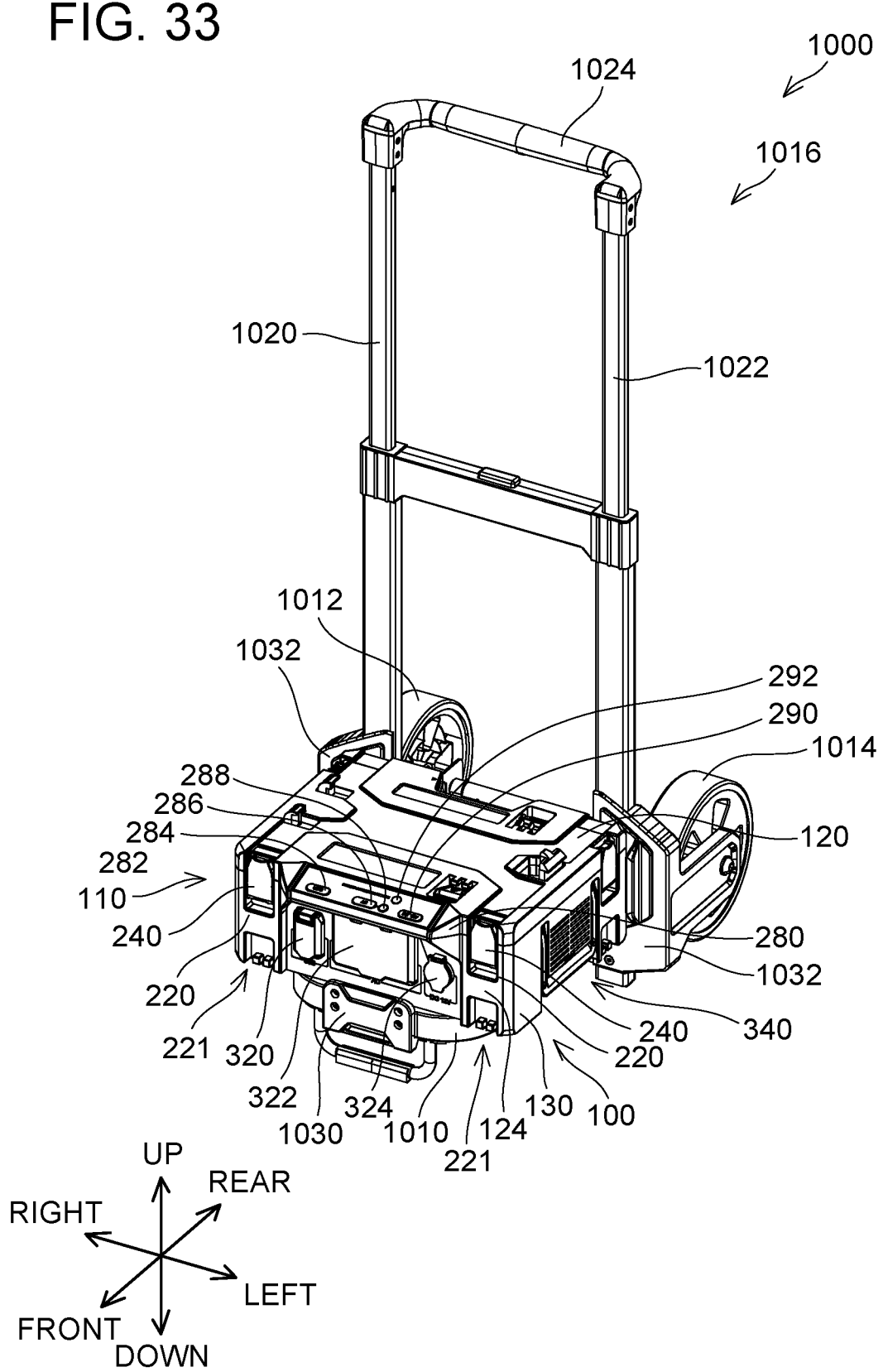
FIG. 33 illustrates a perspective view seeing from the front left upper side the power supply device 100 in a state of being placed on a trolley 1000 in the embodiment.
Figure 38:
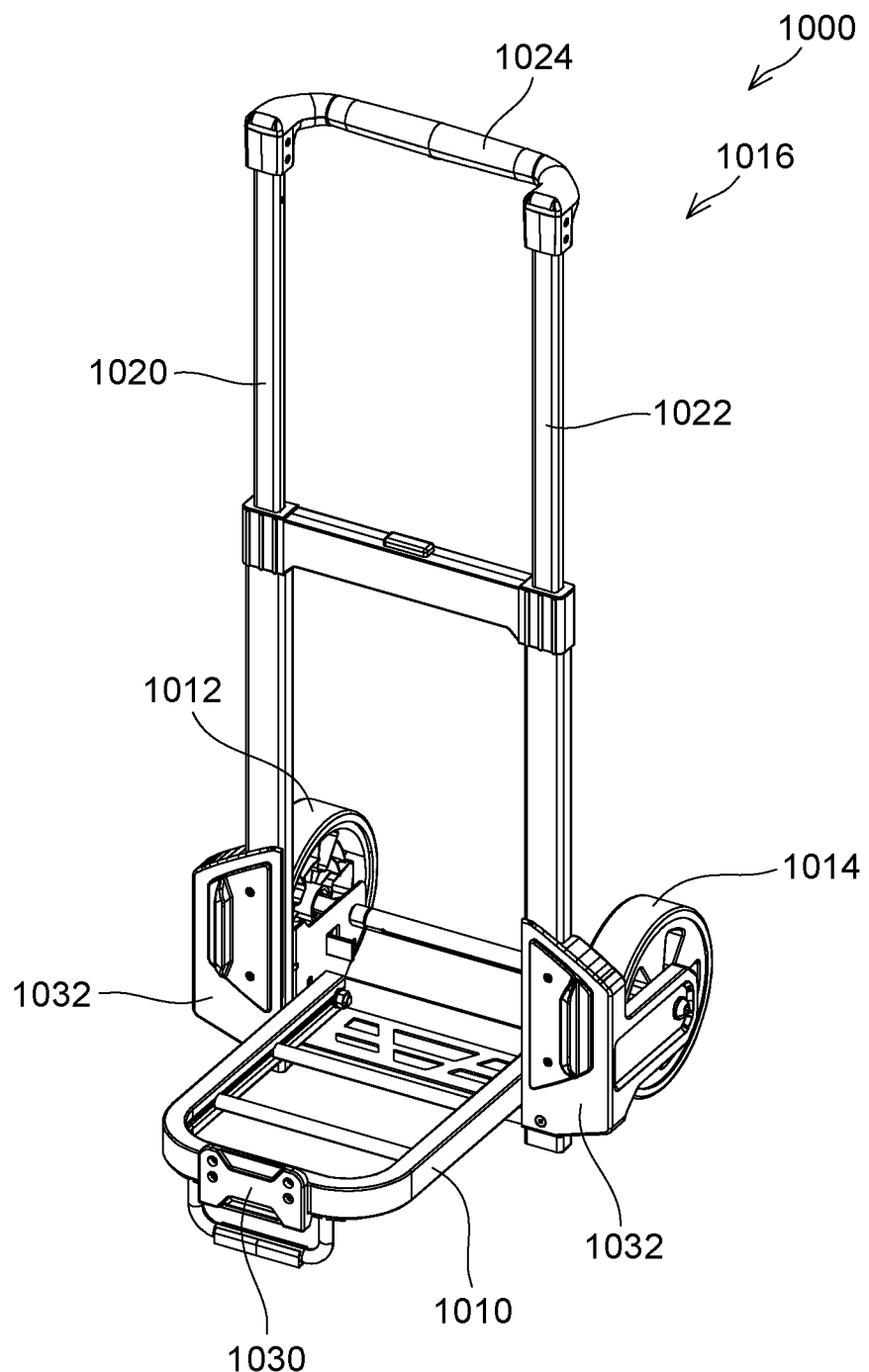
FIG. 38 illustrates a perspective view seeing the trolley 1000 according to the embodiment from the front left upper side.

In FIG. 33, the power supply device 100 is placed on the trolley 1000. The trolley 1000 comprises a support frame 1010 (see FIG. 38), a right wheel 1012, a left wheel 1014, and a handle 1016. A width of the support frame 1010 in the left-right direction is slightly smaller than a distance between the protrusion 122a (see FIG. 4) and the protrusion 122b (see FIG. 4) of the bottom surface 122 of the power supply device 100. The handle 1016 comprises a right pipe 1020 extending upward from a right end of the support frame 1010, a left pipe 1022 extending upward from a left end of the support frame 1010, and a grip portion 1024 connecting an upper end of the right pipe 1020 and an upper end of the left pipe 1022. A front support plate 1030 is disposed at a front portion of the support frame 1010. Rear support plates 1032 are disposed below the right pipe 1020 and below the left pipe 1022. A distance between the front support plate 1030 and the rear support plate 1032 in the front-rear direction is slightly greater than a length of the bottom surface 122 (see FIG. 4) of the power supply device 100 in the front-rear direction.

When the bottom surface 122 (see FIG. 4) of the power supply device 100 is placed on the support frame 1010 of the trolley 1000, the support frame 1010 is positioned between the protrusions 122a, 122c (see FIG. 4) on the right side of the bottom surface 122 and the protrusions 122b, 122d (see FIG. 4) on the left side of the bottom surface 122 of the power supply device 100. Then, the lower portion of the front surface 124 of the power supply device 100 abuts the front support plate 1030 of the trolley 1000, and the rear surface 126 (see FIG. 5) of the power supply device 100 abuts the rear support plate 1032 of the trolley 1000. Due to this, the power supply device 100 may be suppressed from falling off the trolley 1000 while the trolley 1000 is being moved.

(Placing Power Supply Device 100 on Cart 1200)

Figure 34:
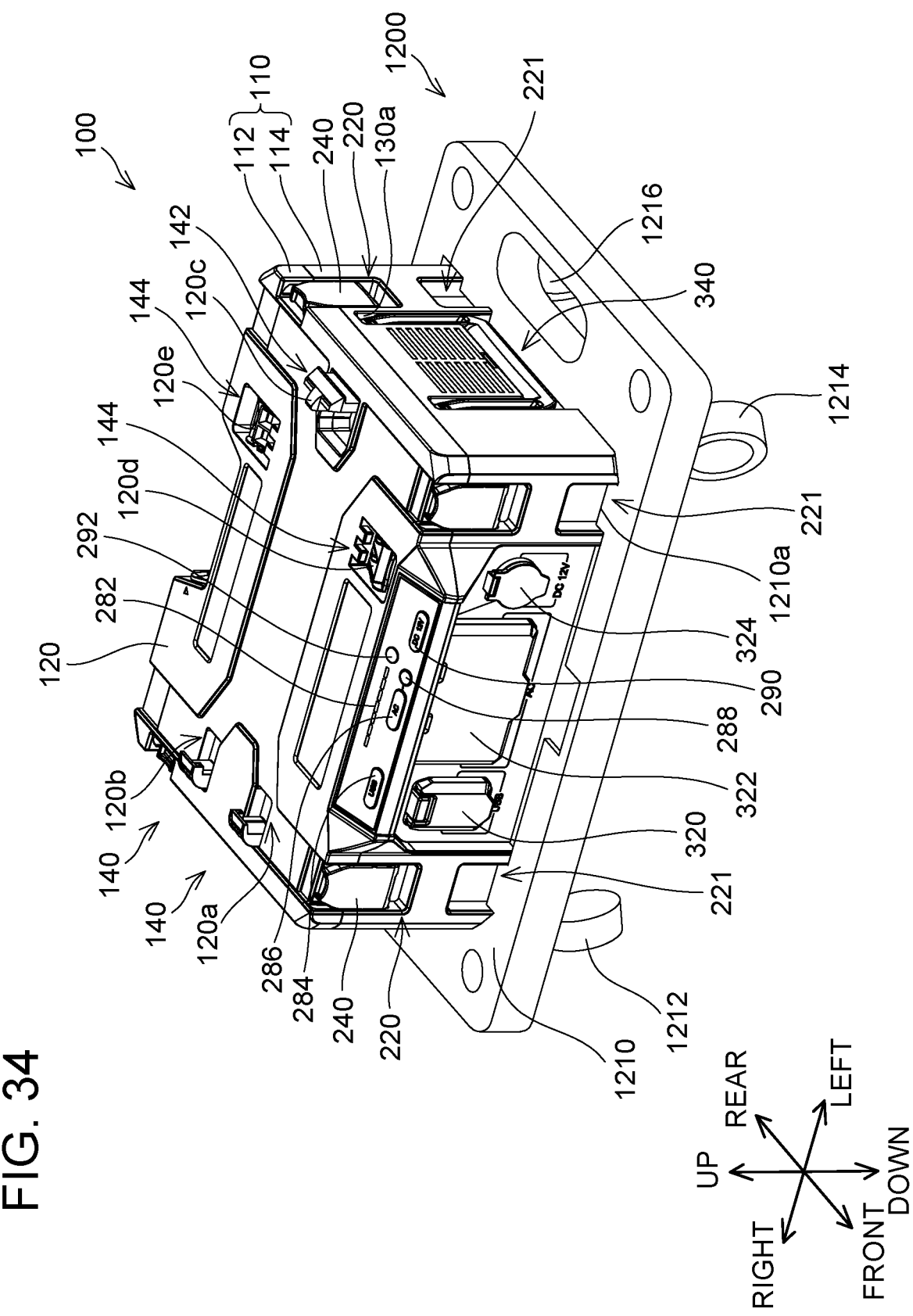
FIG. 34 illustrates a perspective view seeing the power supply device 100 in a state of being placed on a cart 1200 from the front left upper side in the embodiment.

In FIG. 34, the power supply device 100 is placed on the cart 1200. The cart 1200 comprises a support frame 1210, a right-front wheel 1212, a left-front wheel 1214, a right-rear wheel (not shown), and a left-rear wheel 1216. A concave part 1210a having a shape corresponding to the bottom surface 122 (see FIG. 4) of the power supply device 100 is defined on an upper surface of the support frame 1210, and the power supply device 100 is placed within the concave part 1210a. Due to this, the power supply device 100 may be suppressed from falling off the cart 1200 while the cart 1200 is being moved.

In one or more embodiments, as shown in FIGS. 1, 3, and 17, the power supply device 100 comprises the body case 110, the first engaging mechanism 152 (example of "first device-side engaging part") disposed on the body case 110, the AC output part 314 (example of "first output part") disposed on the body case 110, and the device-side socket part 372 (example of "device-side connector") configured to be connected with the battery-side socket part 544 (example of "battery-side connector") of the battery unit 500 (example of "first battery unit"). The body case 110 comprises the bottom surface 122 and the upper surface 120. The first engaging mechanisms 152 are configured to be engaged with the first engaged mechanisms 552 (example of "first unit-side engaged part") of the battery unit 500, and the AC output part 314 is configured to output power supplied from the battery unit 500 to an electrical tool power tool ("first external apparatus") different from the battery unit 500. According to the above configuration, the first engaging mechanisms 152 of the power supply device 100 and the first engaged mechanisms 552 of the battery unit 500 are engaged in the state where the battery unit 500 is placed on the upper surface of the power supply device 100. Due to this, the power supply device 100 and the battery unit 500 are coupled. Further, the AC output part 314 is electrically connected to an external apparatus in the state the battery-side socket part 544 and the device-side socket part 372 are connected, power supplied from the battery unit 500 is outputted to the external apparatus via the power supply device 100. Accordingly, the power supply device 100 can output power to the external apparatus by using the power supplied from the battery unit 500.

In one or more embodiments, as shown in FIGS. 31 and 32, the power supply device 100 is configured to allow another power supply device 100 and the tool box 900 (examples of "second external apparatus") to be placed on the upper surface 120 of the body case 110. According to the above configuration, when the battery unit 500 is not placed on the upper surface 120 of the body case 110, another power supply device 100/the tool box 900 can be placed on the upper surface 120 of the body case 110. Also, the body case 110 is configured to be placed on the upper surface 120 of the other power supply device 100 and the upper surface 920 of the tool box 900. According to the above configuration, the power supply device 100 can be placed on the upper surface 120 of the other power supply device 100/the upper surface 920 of the tool box 900. In this case, the power supply device 100 and the other power supply device 100/the tool box 900 may be carried around and/or stored in the state of being stacked in the up-down direction. Accordingly, user convenience can be improved.

In one or more embodiments, as shown in FIGS. 3, 12, and 35, the power supply device 100 further comprises the fourth engaging mechanisms 240 (example of "second device-side engaging part") configured to be engaged with the lower coupling parts 221 (example of "apparatus-side engaged part") of another power supply device 100 and the tool box 900, and the lower coupling parts 221 (example of "device-side engaged part") configured to be engaged with the fourth engaging mechanisms 240 (example of "apparatus-side engaging part") of the other power supply device 100 and the tool box 900. According to the above configuration, the power supply device 100 and the other power supply device 100/the tool box 900 are coupled by the fourth engaging mechanisms 240 of the power supply device 100 and the lower coupling parts 221 of the other power supply device 100/the tool box 900 being engaged, or, the fourth engaging mechanisms 240 of the other power supply device 100/the tool box 900 and the lower coupling parts 221 of the power supply device 100 being engaged. Due to this, the power supply device 100 and the other power supply device 100/the tool box 900 may be suppressed from being displaced from each other while the power supply device 100 and the other power supply device 100/the tool box 900 are carried in the state of being stacked in the up-down direction.

In one or more embodiments, as shown in FIOS. 3 and 6, the upper surface 120 of the body case 110 may comprise the openings 120a, 120b (example of "first groove part") configured to accommodate the first engaging mechanisms 152. The first engaging mechanisms 152 are each configured to move between the non-accommodated state of protruding upward from the upper surface 120 and the accommodated state of being accommodated in the openings 120a, 120b. The first engaging mechanisms 152 are configured to be engaged with the first engaged mechanisms 552 of the battery unit 500 when the first engaging mechanisms 152 are in the non-accommodated state, and the first engaging mechanisms 152 are in the accommodated state when the other power supply device 100/the tool box 900 is placed on the upper surface 120 of the body case 110. For example, if the first engaging mechanisms 152 are fixed in the non-accommodated state, and the other power supply device 100/the tool box 900 is placed on the upper surface 120 of the body case 110, the first engaging mechanisms 152 and the lower surface of the other power supply device 100/the tool box 900 may contact each other, thereby the lower surface of the other power supply device 100/the tool box 900 may possibly be damaged. According to the above configuration, the first engaging mechanisms 152 are accommodated in the openings 120a, 120b when the other power supply device 100/the tool box 900 is placed on the upper surface 120 of the body case 110. Accordingly, the lower surface of the other power supply device 100/the tool box 900 can be suppressed from being damaged.

In one or more embodiments, as shown in FIG. 6, the power supply device 100 further comprises the torsion springs 154 (example of "biasing member") biasing each first engaging mechanism 152 from the accommodated state to the non-accommodated state. According to the above configuration, the user does not need to perform operation for switching each first engaging mechanism 152 from the accommodated state to the non-accommodated state upon when coupling the power supply device 100 and the battery unit 500. Thus, user convenience can be improved.

In one or more embodiments, as shown in FIGS. 2, 3, and 9, the power supply device 100 further comprises the third engaging mechanisms 192 (example of "third device-side engaging part") configured to engaged with the third engaged mechanisms 750 (example of "second unit-side engaged part") of the battery unit 700 different from the battery unit 500. According to the above configuration, by using the third engaging mechanisms 192, the battery unit 700 having a shape different from the battery unit 500 and the power supply device 100 can be coupled. Thus, user convenience can be improved.

In one or more embodiments, as shown in FIGS. 3, 6, and 9, the upper surface 120 of the body case 110 comprises the openings 120a, 120b configured to accommodate the first engaging mechanisms 152 and the openings 120c (example of "second groove part") configured to accommodate the third engaging mechanisms 192. The first engaging mechanisms 152 are each configured to move between the non-accommodated state and the accommodated state. The third engaging mechanisms 192 are each configured to move between the non-accommodated state (example of "third state") of protruding upward from the upper surface 120 and the accommodated state (example of "fourth state") of being accommodated in the opening 120c. The first engaging mechanisms 152 are configured to be engaged with the first engaged mechanisms 552 of the battery unit 500 when the first engaging mechanisms 152 are in the non-accommodated state. The third engaging mechanisms 192 are configured to be engaged with the third engaged mechanisms 750 of the battery unit 700 when the third engaging mechanisms 192 are in the non-accommodated state, and the third engaging mechanisms 192 are configured to be in the accommodated state when the first engaging mechanisms 152 are engaged with the first engaged mechanisms 552 of the battery unit 500. For example, if the third engaging mechanisms 192 are fixed in the non-accommodated state of protruding upward from the upper surface 120 of the body case 110, and the battery unit 500 is placed on the upper surface 120 of the body case 110, the third engaging mechanisms 192 and the lower surface of the battery unit 500 may contact each other, thereby the lower surface of the battery unit 500 may possibly be damaged. According to the above configuration, the third engaging mechanisms 192 are accommodated in the openings 120c when the battery unit 500 is placed on the upper surface 120 of the body case 110.

Accordingly, the lower surface of the battery unit 500 can be suppressed from being damaged.

In one or more embodiments, as shown in FIG. 6, the power supply device 100 further comprises the torsion springs 154 biasing each first engaging mechanism 152 from the accommodated state to the non-accommodated state. According to the above configuration, the user does not need to perform operation for switching each first engaging mechanism 152 from the accommodated state to the non-accommodated state upon when coupling the power supply device 100 and the battery unit 500. Thus, user convenience can be improved.

In one or more embodiments, as shown in FIG. 13, the power supply device 100 further comprises the AC circuit portion 430 (example of "first conversion circuit") connected to the AC output part 314 and configured to convert the power supplied from the battery unit 500; the DC output part 316 (example of "second output part"); and the DC circuit portion 432 (example of "second conversion circuit") connected to the DC output part 316 and configured to convert the power supplied from the battery unit 500. According to the above configuration, power outputted from the power supply device 100 can be used so as to operate plural kinds of electrical apparatuses. Accordingly, user convenience can be improved.

In one or more embodiments, as shown in FIG. 13, the power supply device 100 further comprises the AC circuit portion 430 connected to the AC output part 314 and configured to convert direct current supplied from the battery unit 500 to alternating current. According to the above configuration, the user is able to use an electrical apparatus configured to operate using alternating current by using the power supply device 100. Thus, user convenience can be improved.

In one or more embodiments, as shown in FIG. 17, the body case 110 further comprises the rear surface 126 (example of "first side surface") disposed between the upper surface 120 and the bottom surface 122. The device-side socket part 372 is disposed on the rear surface 126. For example, if the device-side socket part 372 is disposed on the upper surface 120 of the body case 110, presence of the battery unit 500 fixed to the upper surface 120 of the body case 110 would make it difficult to connect the device-side socket part 372 and the battery-side socket part 544. According to the above configuration, the user is able to easily connect the device-side socket part 372 and the battery-side socket part 544.

In one or more embodiments, as shown in FIG. 17, in a top view of the power supply device 100 seen from above under a state where the battery-side socket part 544 of the battery unit 500 is connected to the device-side socket part 372, the battery-side socket part 544 is disposed inside an outer peripheral edge of the body case 110. If the battery-side socket part 544 is disposed outside the outer peripheral edge of the body case 110 in the top view of the power supply device 100 seen from above, the battery-side socket part 544 could collide with a wall for example, and be damaged. According to the above configuration, the battery-side socket part 544 may be suppressed from colliding with the wall, for example. Accordingly, the battery-side socket part 544 may be suppressed from being damaged.

In one or more embodiments, as shown in FIG. 17, the body case 110 further includes the cable accommodating part 380 mounted on the rear surface 126 and configured to accommodate the cable 542 extending from the battery-side socket part 544. The cable 542 of the battery unit 500 may sometimes touch the user while the power supply device 100 is being carried with the battery unit 500 fixed to the power supply device 100. According to the above configuration, the cable 542 can be accommodated within the cable accommodating part 380, with the battery unit 500 fixed to the power supply device 100. Accordingly, the cable 542 of the battery unit 500 may be suppressed from touching the user while the power supply device 100 is being carried, for example.

In one or more embodiments, as shown in FIGS. 3 and 4, the body case 110 further comprises the right surface 128 and the left surface 130 (examples of "a second side surface") disposed between the upper surface 120 and the bottom surface 122; and the right handle 340 and the left handle 350 configured to be gripped by a user. The right handle accommodating part 128*a* and the left handle accommodating part 130*a* recessed inward of the body case 110 and configured to accommodate the right handle 340 and the left handle 350 are disposed on the right surface 128 and the left surface 130. The right handle 340 and the left handle 350 are each configured to move between an accommodated state of being accommodated in the right handle accommodating part 128*a* and the left handle accommodating part 130*a* and a non-accommodated state of being not accommodated in the right handle accommodating part 128*a* and the left handle accommodating part 130*a*. According to the above configuration, the user is able to move the right handle 340 and the left handle 350 to the non-accommodated state when the user carries the power supply device 100, and the user is able to move the right handle 340 and the left handle 350 to the accommodated state when the power supply device 100 is placed on a ground, for example. In the accommodated state, the right handle 340 and the left handle 350 are accommodated within the right handle accommodating part 128*a* and the left handle accommodating part 130*a*. Accordingly, the right handle 340 and the left handle 350 may be suppressed from touching the user while the power supply device 100 is placed on the ground, for example.

In one or more embodiments, as shown in FIG. 4, the exhaust holes 128*b* (example of "vent hole") are defined on the right surface 128 of the body case 110. As the power supply 100 is viewed along a direction orthogonal to the right surface 128, the exhaust holes 128*b* may be defined on an inner side of the right handle 340. According to the above configuration, the flow of air discharged outside from the body case 110 is not hindered by the right handle 340. Thus, air may easily be discharged outside from the body case 110.

In one or more embodiments, as shown in FIG. 4, the body case 110 may further comprise the waterproof wall 280 (example of "inclined part") protruding frontward (example of "in a first direction") from the front end (example of "a first end") of the upper surface 120, wherein the waterproof wall 280 is inclined such that an end on the front side of the waterproof wall 280 is inclined downward. The display unit 282 and the AC power supply switch 286 (example of "output operation unit") for operating the AC output part 314 are disposed on the waterproof wall 280. The display unit 282 can more easily be recognized by the user with the configuration in which the display unit 282 is disposed on the waterproof wall 280 than with the configuration in which the display unit 282 is disposed on the upper surface 120 of the body case 110 or on a side surface perpendicular to the upper surface 120. Further, operability of the AC power supply switch 286 by the user can be improved at a greater degree with the configuration in which the display unit 282 is disposed on the waterproof wall 280 than with the configuration in which the display unit 282 is disposed on the upper surface 120 of the body case 110 or on the side surface perpendicular to the upper surface 120.

Further, in one or more embodiments, as shown in FIG. 4, the body case 110 further comprises the front surface 124 (example of "third side surface") extending downward from the front end of the upper surface 120, wherein the AC output part 314 is disposed on the front surface 124. The AC output part 314 is disposed lower than the display unit 282 and the AC power supply switch 286. According to the above configuration, the waterproof wall 280 is disposed higher than the AC output part 314. Further, the waterproof wall 280 protrudes more to the front side than the AC output part 314 does. Accordingly, the waterproof wall 280 can suppress water from above the power supply device 100 from reaching the AC output part 314.

Further, in one or more embodiments, as shown in FIG. 1, under a state where the battery unit 500 is placed on the upper surface 120 of the body case 110, the main power switch 532 (example of "power operation part") is disposed on the front surface 524 of the battery unit 500. Power is supplied from the battery unit 500 to the power supply device 100 when the main power switch 532 is operated by the user. According to the above configuration, under the state where the battery unit 500 is placed on the upper surface 120 of the body case 110, the AC power supply switch 286 of the power supply device 100 and the main power switch 532 of the battery unit 500 are both positioned on the front side. Thus, user operability can be improved.

Further, in one or more embodiments, as shown in FIG. 4, the AC output part 314 comprises the AC protector part 322 for protecting the AC output part 314. According to the above configuration, water can be suppressed from reaching the AC output part 314.

(Variant 1)

In the above embodiments, the battery unit 500 comprises the cable 542 as shown in FIG. 20. However, the power supply device 100 may comprise a cable instead.

(Variant 2)

The upper surface 120 of the power supply device 100 may be configured to allow only the battery unit 500, 700 to be placed thereon, and may not be configured to allow another power supply device 100 or the tool box 900, for example, to be placed thereon. In the present variant, the upper coupling parts 220 (more specifically, the fourth engaging mechanisms 240) and the lower coupling parts 221 may be omitted. Further, in another variant, the upper surface 120 of the power supply device 100 may be configured to allow another power supply device 100, the tool box 900 for example to be placed thereon, but the power supply device 100 may not be configured placeable on the upper surface 120 of another power supply device 100 and the upper surface 920 of the tool box 900.

(Variant 3)

The power supply device 100 may not comprise either of the upper coupling parts 220 (specifically the fourth engaging mechanisms 240) and the lower coupling parts 221. If the power supply device 100 does not comprise the upper coupling parts 220, another power supply device 100, the tool box 900 may not comprise the lower coupling parts 221, and if the power supply device 100 does not comprise the lower coupling parts 221, another power supply device 100, the tool box 900 may not comprise the upper coupling parts 220 (more specifically, the fourth engaging mechanisms 240).

(Variant 4)

Figure 39:
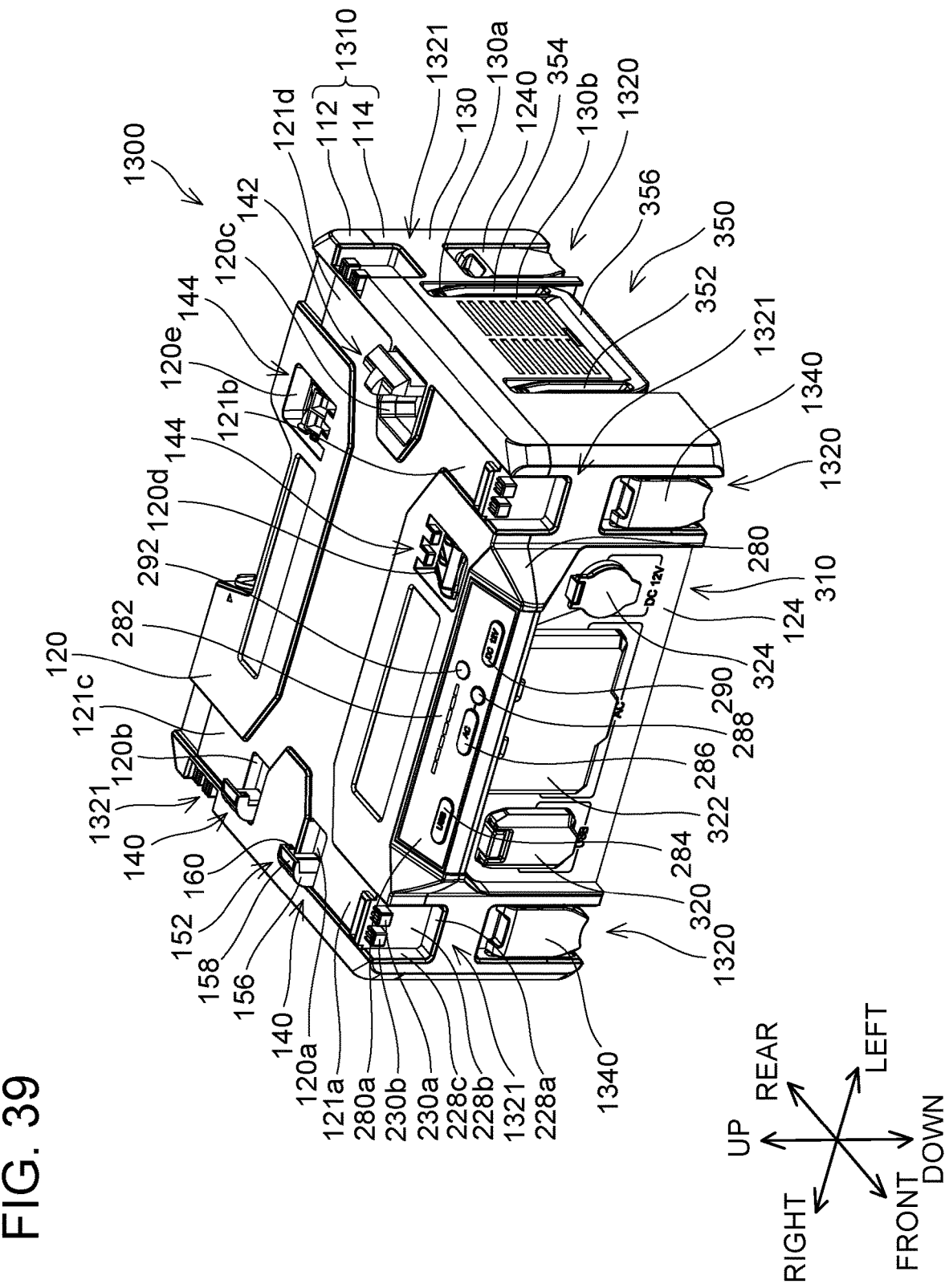
FIG. 39 illustrates a perspective view seeing from the front left upper side a power supply device 1300 according to a variant.
Figure 40:
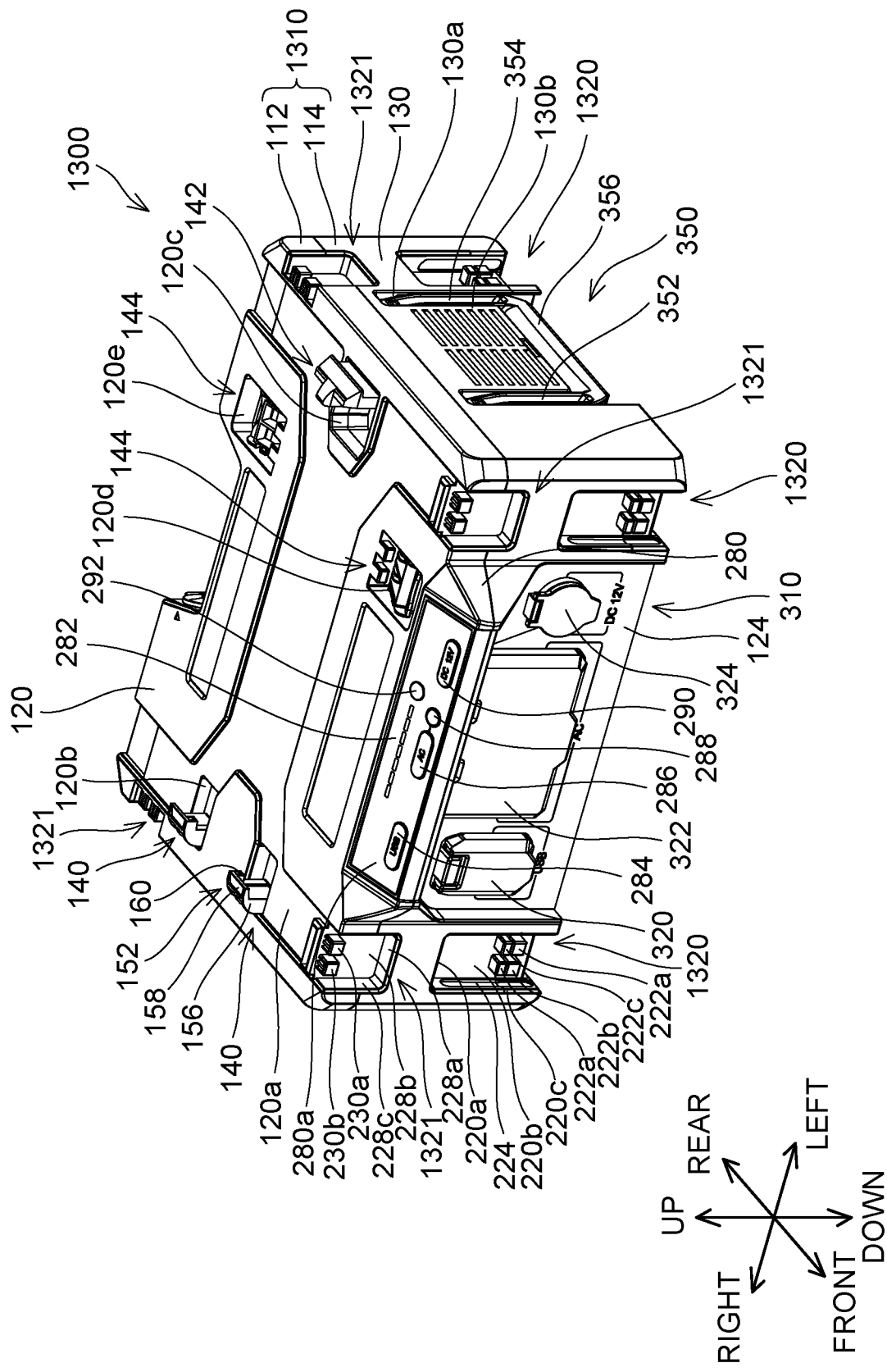
FIG. 40 illustrates a perspective view seeing from the front left upper side the power supply device 1300 with fourth engaging mechanisms 1340 detached therefrom in the variant.

As shown in FIG. 40, in a power supply device 1300 according to a variant, four lower coupling parts 1320 are disposed at a lower end of a body case 1310, and four upper coupling parts 1321 are disposed at an upper end of the body case 1310. The four lower coupling parts 1320 are disposed respectively at left-right directional opposing ends of the front surface 124, at a rear end of the right surface 128, and at a rear end of the left surface 130. The four lower coupling parts 1320 have a same shape although their arranged positions and orientations vary. The lower coupling parts 1320 according to the present variant and the upper coupling parts 220 (see FIG. 10) according to the embodiments have positions and shapes symmetrical to each other in the up-down direction. Each of the four upper coupling parts 1321 is arranged above a corresponding one of the four lower coupling parts 1320. The four upper coupling parts 1321 have a same shape although their arranged positions and orientations vary. The upper coupling parts 1321 according to the present variant and the lower coupling parts 221 (see FIG. 10) according to the embodiments have positions and shapes symmetrical to each other in the up-down direction. As shown in FIG. 39, a fourth engaging mechanism 1340 is to be attached to each of the four lower coupling parts 1320. The four fourth engaging mechanisms 1340 have a same shape although their arranged positions and orientations vary. The fourth engaging mechanisms 1340 according to the present variant and the fourth engaging mechanisms 240 (see FIG. 3) according to the embodiments have positions and shapes symmetrical to each other in the up-down direction. In the present variant, the fourth engaging mechanisms 1340, the upper coupling parts 1321 are respectively examples of "second device-side engaging part", "device-side engaged part". In yet another variant, the power supply device 1300 may not comprise either of the lower coupling parts 1320 (more specifically, the fourth engaging mechanisms 1340) and the upper coupling parts 1321.

(Variant 5)

The first engaging mechanisms 152 configured to couple the power supply device 100 and the battery unit 500 may be used to couple the power supply device 100 and another power supply device 100/the tool box 900.

(Variant 6)

At least one of the first engaging mechanisms 152, the second engaging mechanism 172, and the third engaging mechanisms 192 may be fixed in the non-accommodated state. For example, if the first engaging mechanisms 152 are fixed in the engaged state, the upper surface 120 may not comprise the openings 120*a*, 120*b*. In this case, the first engaging mechanisms 152 may be configured to be used to couple the power supply device 100 and another power supply device 100/the tool box 900.

(Variant 7)

At least either of the first engaging mechanisms 152 and the second engaging mechanism 172 may not comprise the torsion springs 154, 174.

(Variant 8)

The upper surface 120 of the power supply device 100 may be configured to allow only one of the battery unit 500 and the battery unit 700 to be placed thereon. For example, if the upper surface 120 is configured to allow only the battery unit 500 to be placed thereon, the third engaging mechanisms 192 may be omitted. For example, if the upper surface 120 is configured to allow only the battery unit 700 to be placed thereon, the second engaging mechanism 172 may be omitted.

(Variant 9)

The power supply device 100 may comprise only one output part, or comprise four or more output parts. For example, the power supply device 100 may only comprise the DC output part 316.

(Variant 10)

The device-side socket part 372 of the power supply device 100 may be disposed on the front surface 124, on the right surface 128, or on the left surface 130 of the body case 110. Further, in yet another variant, the device-side socket part 372 of the power supply device 100 may be disposed on the upper surface 120 of the body case 110.

(Variant 11)

The power supply device 100 may not comprise the cable accommodating part 380.

(Variant 12)

The power supply device 100 may not comprise at least one of the right handle accommodating part 128a and the left handle accommodating part 130a.

(Variant 13)

The exhaust holes 128b may be defined on the outer side of the right handle 340.

(Variant 14)

The power supply device 100 may not comprise the waterproof wall 280. In the present variant, the display unit 282, the USB power supply switch 284, the AC power supply switch 286, the frequency shifter switch 288, and the DC power supply switch 290 may be arranged on the upper surface 120, the front surface 124, the rear surface 126, the right surface 128, or the left surface 130 of the body case 110. Further, in another variant, the AC output part 314 may be disposed higher than the display unit 282, the USB power supply switch 284, the AC power supply switch 286, the frequency shifter switch 288, and the DC power supply switch 290.

(Variant 15) The main power switch 532 may be arranged on the upper surface 520, the rear surface 526, the right surface 528, or the left surface 530 of the battery unit 500.

(Variant 16)

The power supply device 100 may comprise a main power switch for switching on/off of the power supply device 100.

(Variant 17)

The power supply device 100 may not comprise at least one of the USB protector part 320, the AC protector part 322, and the DC protector part 324.

(Variant 18)

The "first external apparatus" may not be limited to a power tool, but may comprise an electrical apparatus configured placeable on the power supply device 100 and/or an electrical apparatus (such as a microwave) configured to allow the power supply device 100 to be placed on its upper surface thereof.

What is claimed is:

1. A power supply device comprising:
    a body case;
    a first device-side engaging part disposed on the body case;
    a first output part disposed on the body case; and
    a device-side connector configured to be connected with a battery-side connector of a first battery unit,
    wherein the body case comprises:
        a bottom surface; and
        an upper surface configured to allow the first battery unit to be placed thereon,
    the first device-side engaging part is configured to be engaged with a first unit-side engaged part of the first battery unit, and
    the first output part is configured to output power supplied from the first battery unit to a first external apparatus different from the first battery unit,
    wherein the upper surface of the body case is configured to allow a second external apparatus different from the first battery unit to be placed thereon, and/or the body case is configured to be placed on an upper surface of the second external apparatus,
    wherein the power supply device further comprises:
        a second device-side engaging part configured to be engaged with an apparatus-side engaged part of the second external apparatus and different from the first device-side engaging part; and/or
        a device-side engaged part configured to be engaged with an apparatus-side engaging part of the second external apparatus.

2. The power supply device according to claim 1, wherein
    the upper surface of the body case comprises a first groove part configured to accommodate the first device-side engaging part,
    the first device-side engaging part is configured to move between a first state of protruding upward from the upper surface of the body case and a second state of being accommodated in the first groove part,
    wherein the first device-side engaging part is configured to be engaged with the first unit-side engaged part of the first battery unit when the first device-side engaging part is in the first state, and
    the first device-side engaging part is configured to be in the second state when the second external apparatus is placed on the upper surface of the body case.

3. The power supply device according to claim 2, further comprising
    a biasing member biasing the first device-side engaging part from the second state to the first state.

4. The power supply device according to claim 1, further comprising
    a first conversion circuit connected to the first output part and configured to convert the power supplied from the first battery unit;
    a second output part different from the first output part; and
    a second conversion circuit connected to the second output part and configured to convert the power supplied from the first battery unit, the second conversion circuit being different from the first conversion circuit.

5. The power supply device according to claim 1, further comprising
    a first conversion circuit connected to the first output part and configured to convert direct current supplied from the first battery unit to alternating current.

6. The power supply device according to claim 1, wherein
    the body case further comprises a first side surface disposed between the upper surface and the bottom surface, and
    the device-side connector is disposed on the first side surface.

7. The power supply device according to claim 6, wherein
    in a top view of the power supply device seen from above under a state where the battery-side connector of the first battery unit is connected to the device-side connector, the battery-side connector is disposed inside an outer peripheral edge of the body case.

8. The power supply device according to claim 6, wherein the body case further includes a cable accommodating part mounted on the first side surface and configured to accommodate a cable extending from the battery-side connector.

9. The power supply device according to claim 1, wherein the body case further comprises:
a second side surface disposed between the upper surface and the bottom surface; and
a handle disposed on the second side surface and configured to be gripped by a user,
wherein a handle accommodating part recessed inward of the body case and configured to accommodate the handle is disposed on the second side surface, and
the handle is configured to move between an accommodated state of being accommodated in the handle accommodating part and a non-accommodated state of being not accommodated in the handle accommodating part.

10. The power supply device according to claim 9, wherein
a vent hole is defined on the second side surface of the body case,
as the power supply is viewed along a direction orthogonal to the second side surface, the vent hole is defined on an inner side of the handle.

11. The power supply device according to claim 1, further comprising
an inclined part protruding in a first direction from a first end of the upper surface,
wherein the inclined part is inclined such that an end on a first direction side of the inclined part is inclined downward, and
a display unit and an output operation unit for operating the first output part are disposed on the inclined part.

12. The power supply device according to claim 11, further comprising
a third side surface extending downward from the first end of the upper surface,
wherein the first output part is disposed on the third side surface, and
the first output part is disposed lower than the display unit and the output operation unit.

13. The power supply device according to claim 11, wherein
under a state where the first battery unit is placed on the upper surface of the body case, a power operation part of the first battery unit is disposed on a battery side surface on the first direction side of the first battery unit, and
power is supplied from the first battery unit to the power supply device when the power operation part is operated by a user.

14. The power supply device according to claim 1, further comprising
a protecting part for protecting the first output part disposed at the first output part.

15. A power supply device comprising:
a body case;
a first device-side engaging part disposed on the body case;
a first output part disposed on the body case; and
a device-side connector configured to be connected with a battery-side connector of a first battery unit,
wherein the body case comprises:
a bottom surface; and
an upper surface configured to allow the first battery unit to be placed thereon,
the first device-side engaging part is configured to be engaged with a first unit-side engaged part of the first battery unit, and
the first output part is configured to output power supplied from the first battery unit to a first external apparatus different from the first battery unit,
wherein the power supply device further comprises a third device-side engaging part configured to be engaged with a second unit-side engaged part of a second battery unit different from the first battery unit, the third device-side engaging part being different from the first device-side engaging part,
wherein the upper surface comprises a first groove part configured to accommodate the first device-side engaging part and a second groove part configured to accommodate the third device-side engaging part,
the first device-side engaging part is configured to move between a first state of protruding upward from the upper surface and a second state of being accommodated in the first groove part,
the third device-side engaging part is configured to move between a third state of protruding upward from the upper surface and a fourth state of being accommodated in the second groove part,
wherein the first device-side engaging part is configured to be engaged with the first unit-side engaged part of the first battery unit when the first device-side engaging part is in the first state,
wherein the third device-side engaging part is configured to be engaged with the second unit-side engaged part of the second battery unit when the third device-side engaging part is in the third state, and
the third device-side engaging part is configured to be in the fourth state when the first device-side engaging part is engaged with the first unit-side engaged part of the first battery unit.

16. The power supply device according to claim 15, further comprising
a biasing member biasing the first device-side engaging part from the second state to the first state.

17. A power supply system comprising:
a power supply device; and
a first battery unit,
wherein the first battery unit comprises:
a battery case;
a battery-side connector; and
a first unit-side engaged part,
the power supply device comprises:
a body case;
a first device-side engaging part disposed on the body case and configured to be engaged with the first unit-side engaged part;
a first output part disposed on the body case and configured to output power supplied from the first battery unit to a first external apparatus different from the first battery unit; and
a device-side connector configured to be connected to the battery-side connector,
wherein an upper surface of the body case is configured to allow a second external apparatus different from the first battery unit to be placed thereon, and/or the body case is configured to be placed on an upper surface of the second external apparatus, wherein the power supply device further comprises:
a second device-side engaging part configured to be engaged with an apparatus-side engaged part of the second external apparatus and different from the first device-side engaging part; and/or
a device-side engaged part configured to be engaged with an apparatus-side engaging part of the second external apparatus.

* * * * *